(12) United States Patent
Leggette et al.

(10) Patent No.: US 9,613,052 B2
(45) Date of Patent: Apr. 4, 2017

(54) ESTABLISHING TRUST WITHIN A CLOUD COMPUTING SYSTEM

(71) Applicant: CLEVERSAFE, INC., Chicago, IL (US)

(72) Inventors: Wesley Leggette, Chicago, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 547 days.

(21) Appl. No.: 13/868,988

(22) Filed: Apr. 23, 2013

(65) Prior Publication Data

US 2013/0326215 A1 Dec. 5, 2013

Related U.S. Application Data

(60) Provisional application No. 61/655,736, filed on Jun. 5, 2012.

(51) Int. Cl.
*G06F 17/30* (2006.01)
*G06F 21/33* (2013.01)
(Continued)

(52) U.S. Cl.
CPC .......... *G06F 17/3023* (2013.01); *G06F 21/33* (2013.01); *G06F 21/57* (2013.01);
(Continued)

(58) Field of Classification Search
CPC .................................................. H04L 63/0823
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(Continued)

*Primary Examiner* — Harunur Rashid
*Assistant Examiner* — Thanh Le
(74) *Attorney, Agent, or Firm* — Garlick & Markison; Timothy W. Markison; Bruce E. Stuckman

(57) ABSTRACT

A cloud computing system includes a cloud system managing unit, a plurality of sets of devices, where a set of devices includes one or more devices having a common aspect, and a plurality of authentication servers, where an authentication server is associated with one of the plurality of sets of devices based on the common aspect. The cloud computing system functions to establish trust between a corresponding one of the plurality of authentication servers and the one or more devices of one of the plurality of sets of devices, between the corresponding one of the plurality of authentication servers and the cloud system managing unit, and between the cloud system managing unit and the one or more devices. The cloud system managing unit configures the cloud computing system based on the trust between the cloud system managing unit and devices of the plurality of sets of devices.

20 Claims, 52 Drawing Sheets

(51) Int. Cl.
*G06F 21/57* (2013.01)
*G06F 21/60* (2013.01)
*H04L 29/06* (2006.01)

(52) U.S. Cl.
CPC .......... *G06F 21/604* (2013.01); *H04L 63/101* (2013.01); *H04L 63/0823* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,510,236 | B1 * | 1/2003 | Crane et al. .................. 382/116 |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,726,347 | B2 * | 5/2014 | Hamilton et al. ............ 709/229 |
| 8,813,186 | B2 * | 8/2014 | Hegg et al. ........................ 726/2 |
| 8,869,259 | B1 * | 10/2014 | Udupa et al. .................. 726/10 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

\* cited by examiner

| DST allocation info 242 | data partition info 320: 🖼data ID; No. of partitions; Addr. info for each partition; format conversion indication | | | | | | |
|---|---|---|---|---|---|---|---|
| | task execution info 322 | | | | intermediate result info 324 | | |
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4 2_5 - 2_z | 1_1, 2_1, 3_1, 4_1, & 5_1 1_2, 2_2, 3_2, 4_2, & 5_2 | R1-3 | DST unit 2 | DST unit 2 | DST units 2-6 |
| 1_4 | after 1_3 | R1-3_1 - R1-3_4 R1-3_5 - R1-3_z | 1_1, 2_1, 3_1, 4_1, & 5_1 1_2, 2_2, 6_1, 7_1, & 7_2 | R1_4 | DST unit 3 | DST unit 3 | DST units 3-7 |
| 1_5 | after 1_4 | R1-4_1 - R1-4_z & 2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z & R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z & R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

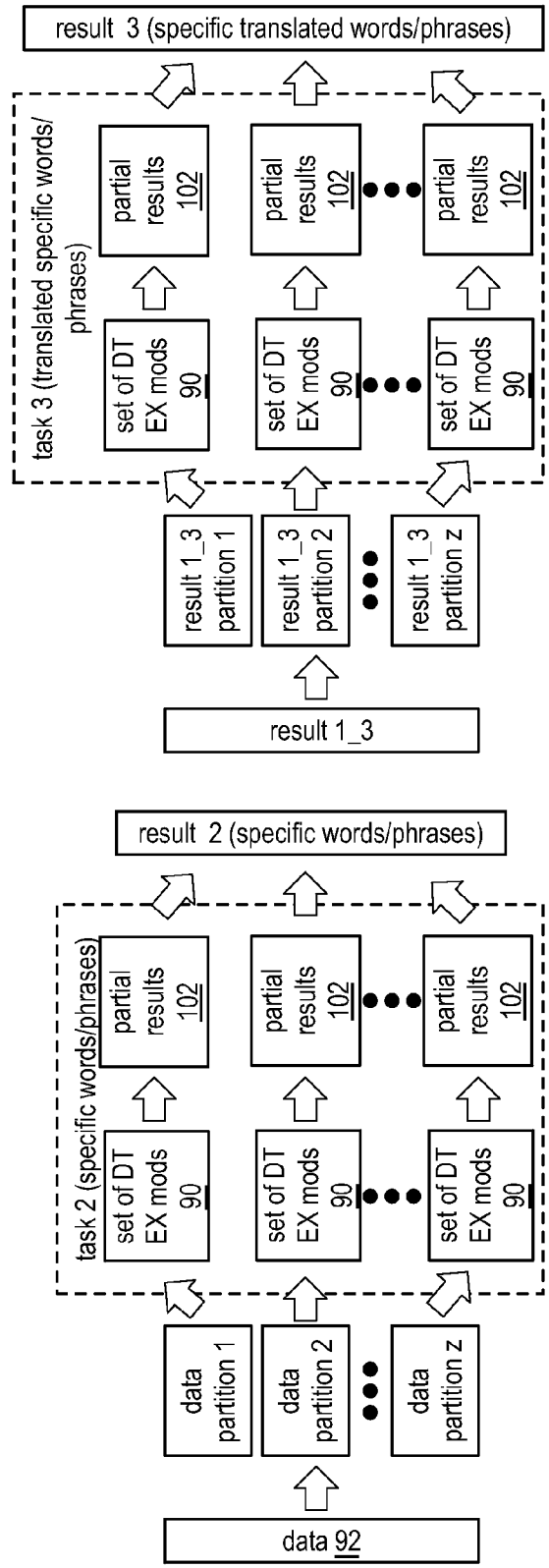
FIG. 38
FIG. 37
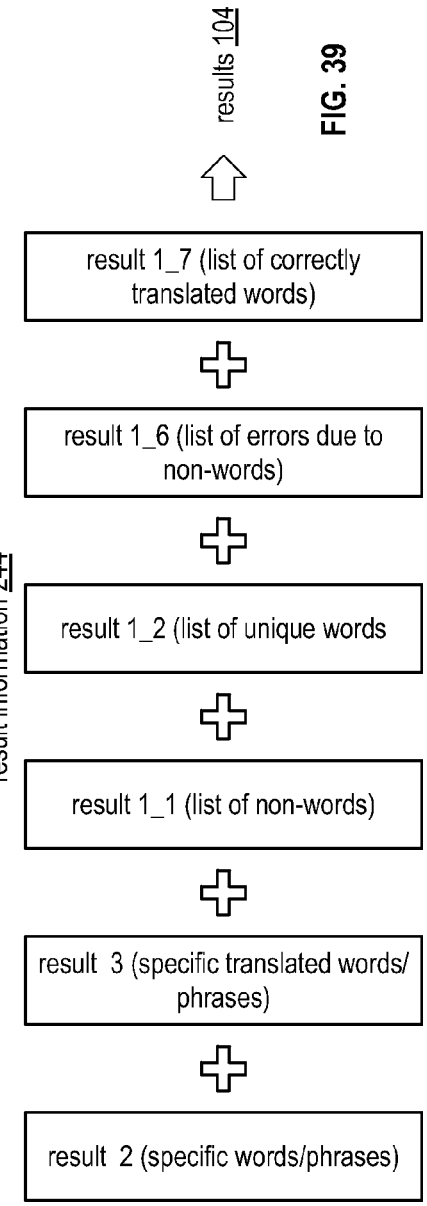
FIG. 39

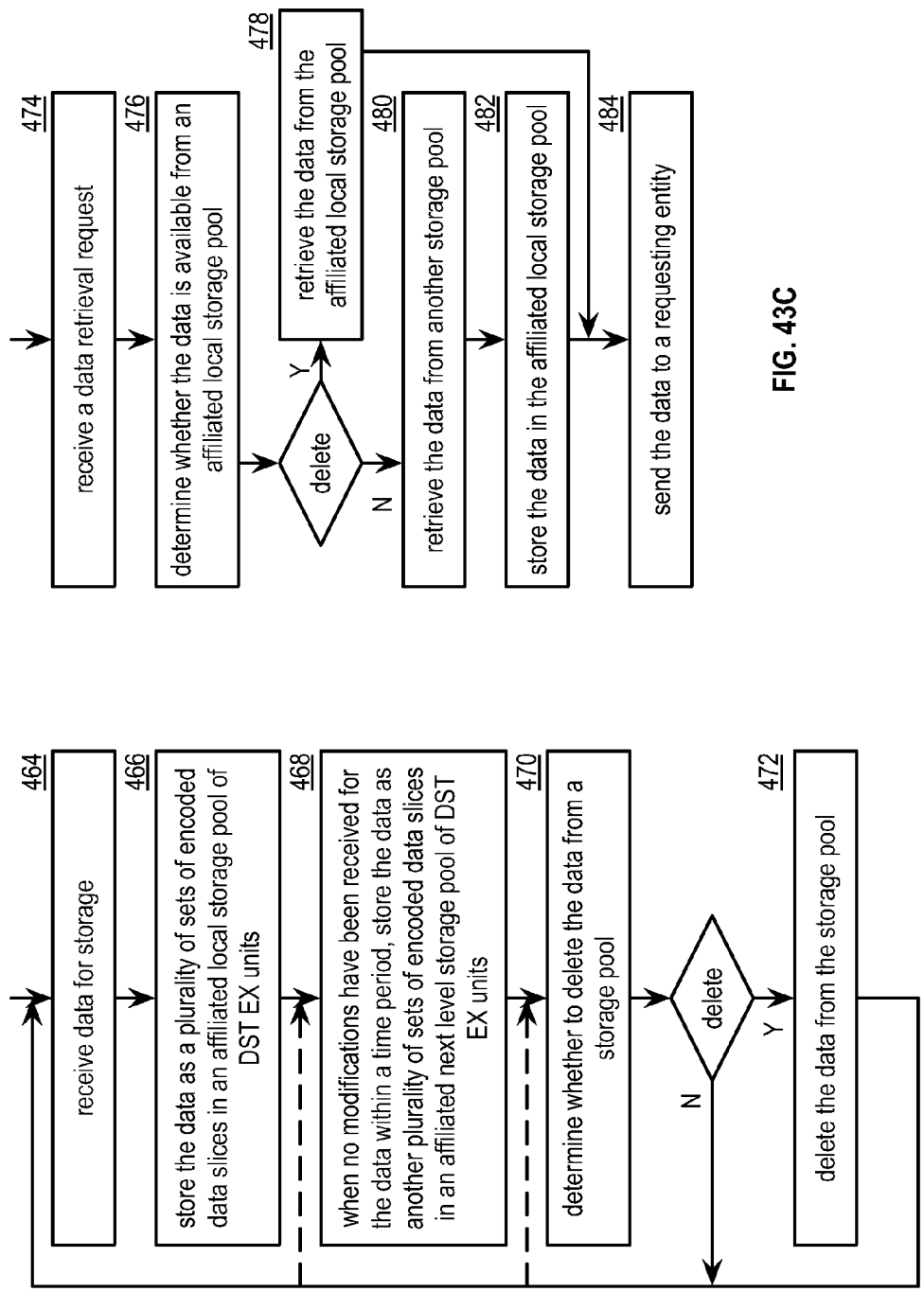

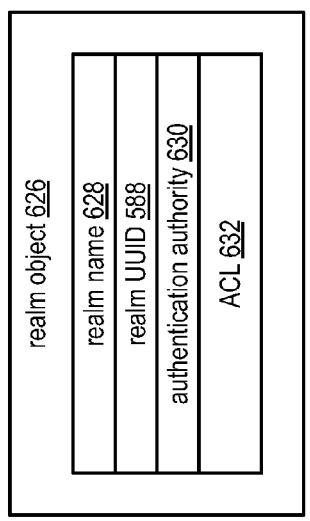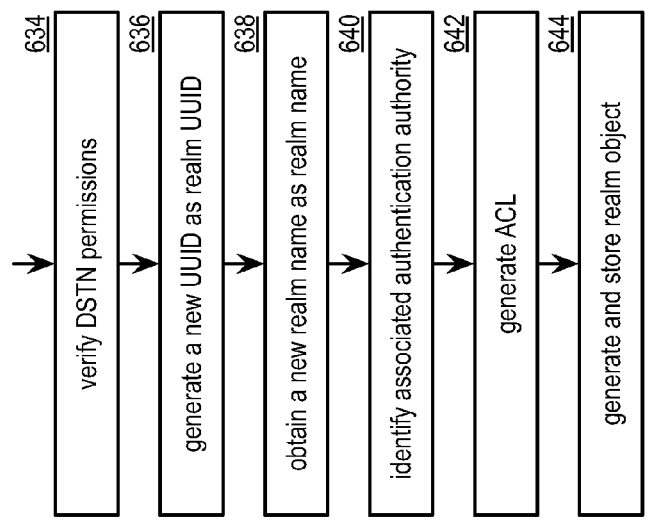

ESTABLISHING TRUST WITHIN A CLOUD COMPUTING SYSTEM

CROSS REFERENCE TO RELATED PATENTS

The present U.S. Utility patent application claims priority pursuant to 35 USC §119(e) to a provisionally filed patent application entitled STORING DATA IN A LAYERED DISTRIBUTED STORAGE AND TASK NETWORK having a provisional filing date of Jun. 5, 2012, and a provisional Ser. No. 61/655,736, which is incorporated herein by reference in its entirety.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 43B is a flowchart illustrating an example of writing data in accordance with the present invention;

FIG. 43C is a flowchart illustrating an example of reading data in accordance with the present invention;

FIG. 47A is a diagram illustrating an example of a realm object structure in accordance with the present invention;

FIG. 47B is a flowchart illustrating an example of generating a realm object in accordance with the present invention; and FIG. 47C is a flowchart illustrating an example of the deleting a realm object in accordance with the present invention.

DETAILED DESCRIPTION OF THE INVENTION

Figure 1:
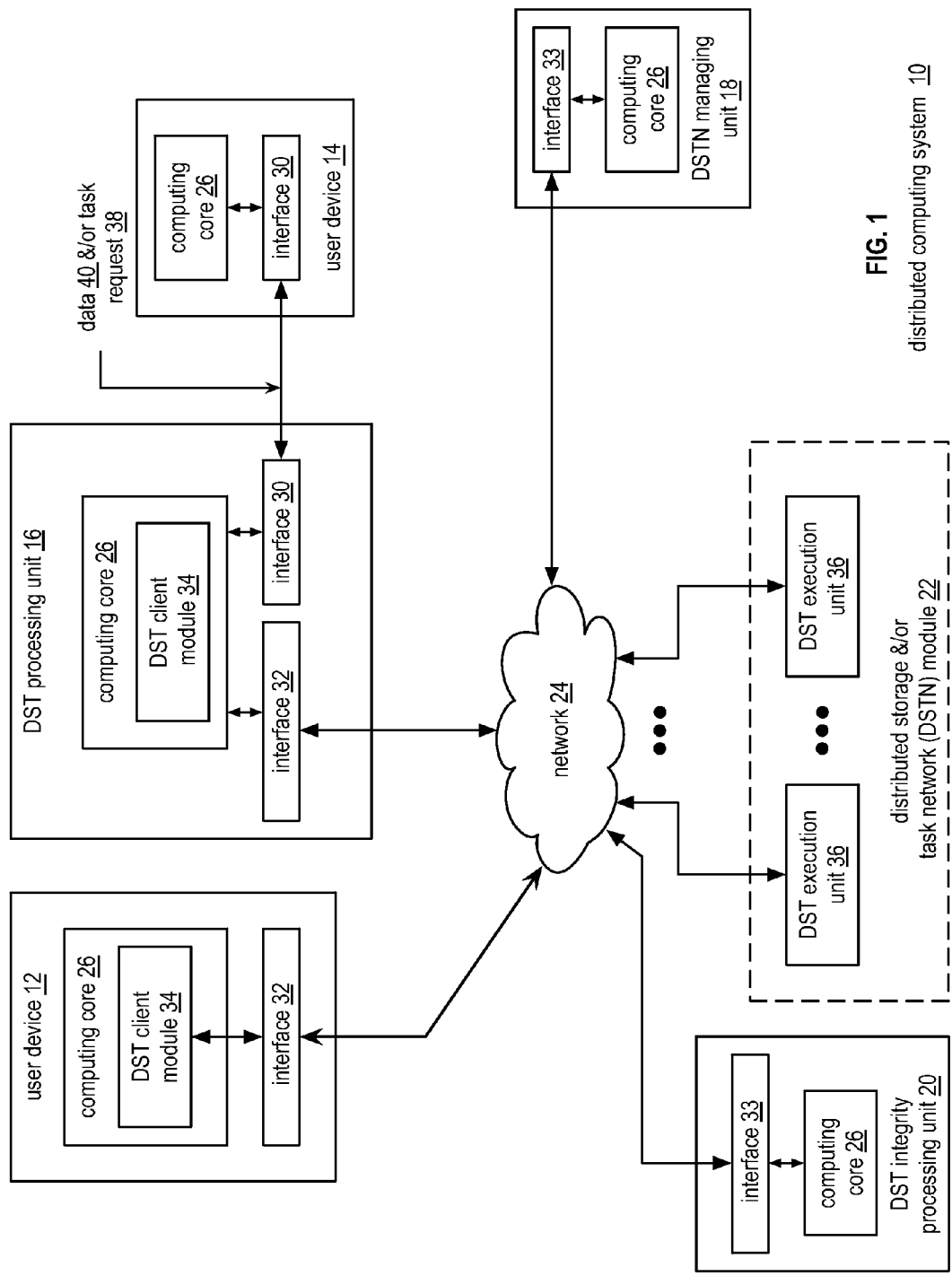
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
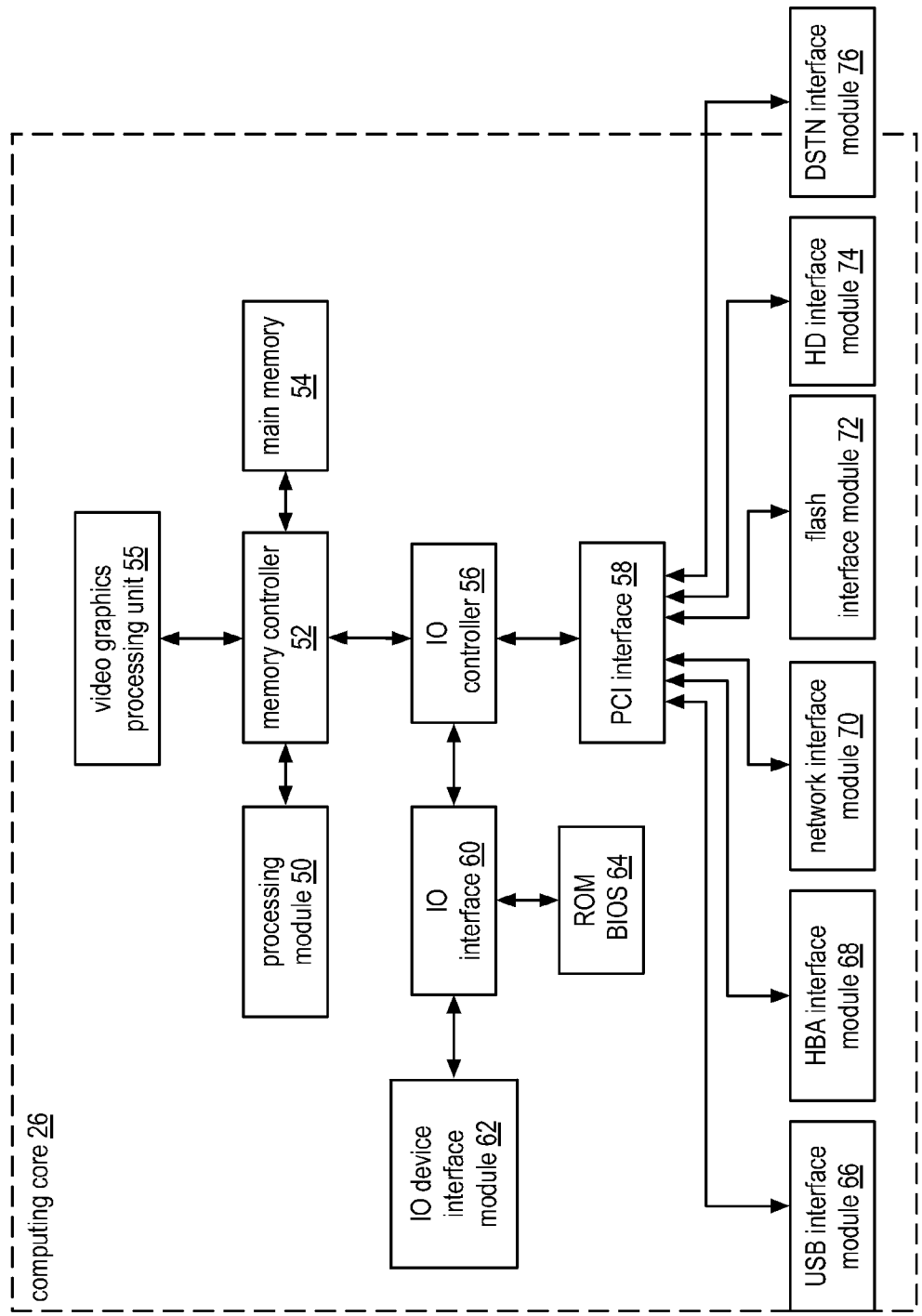
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
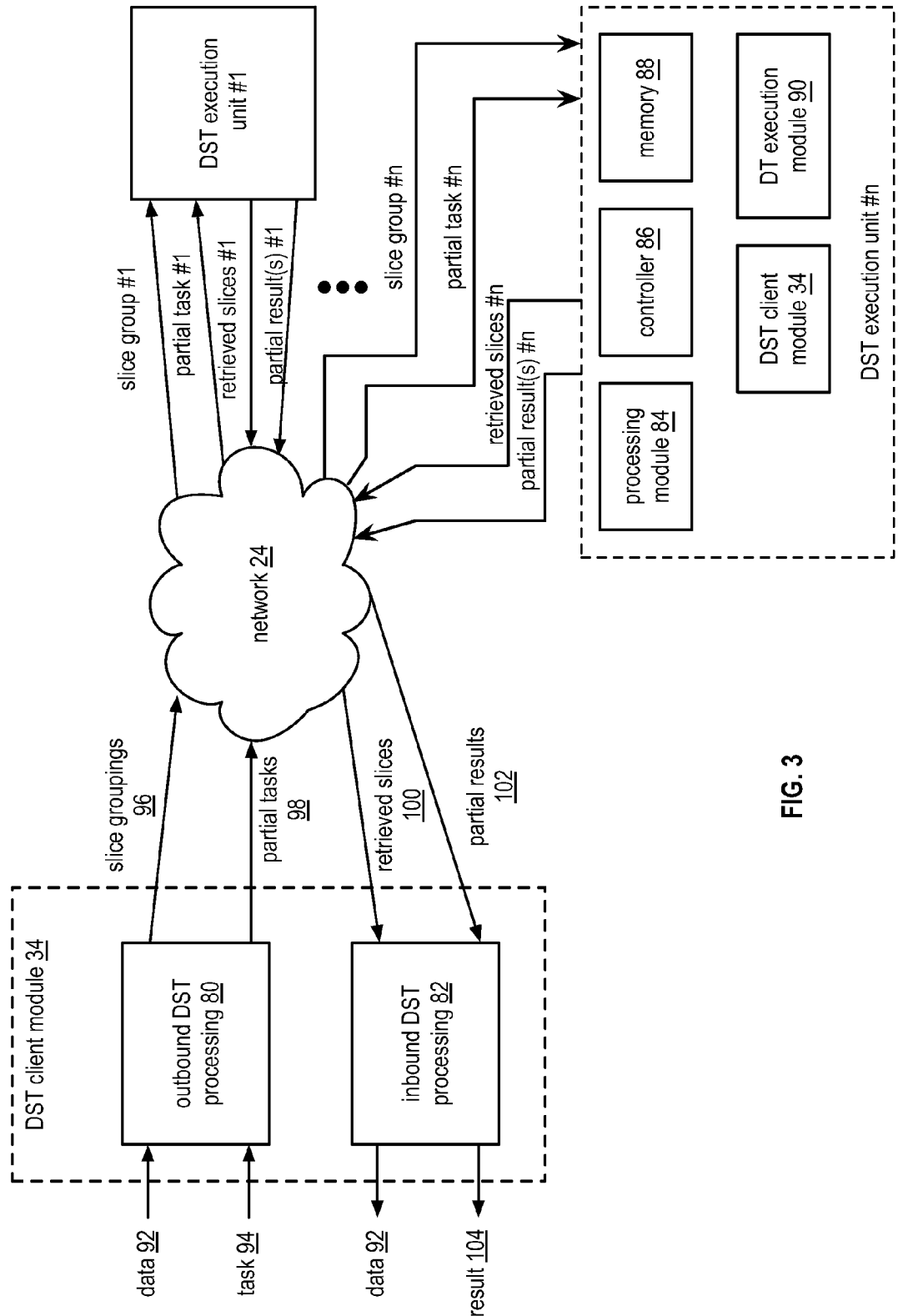
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-*n*.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
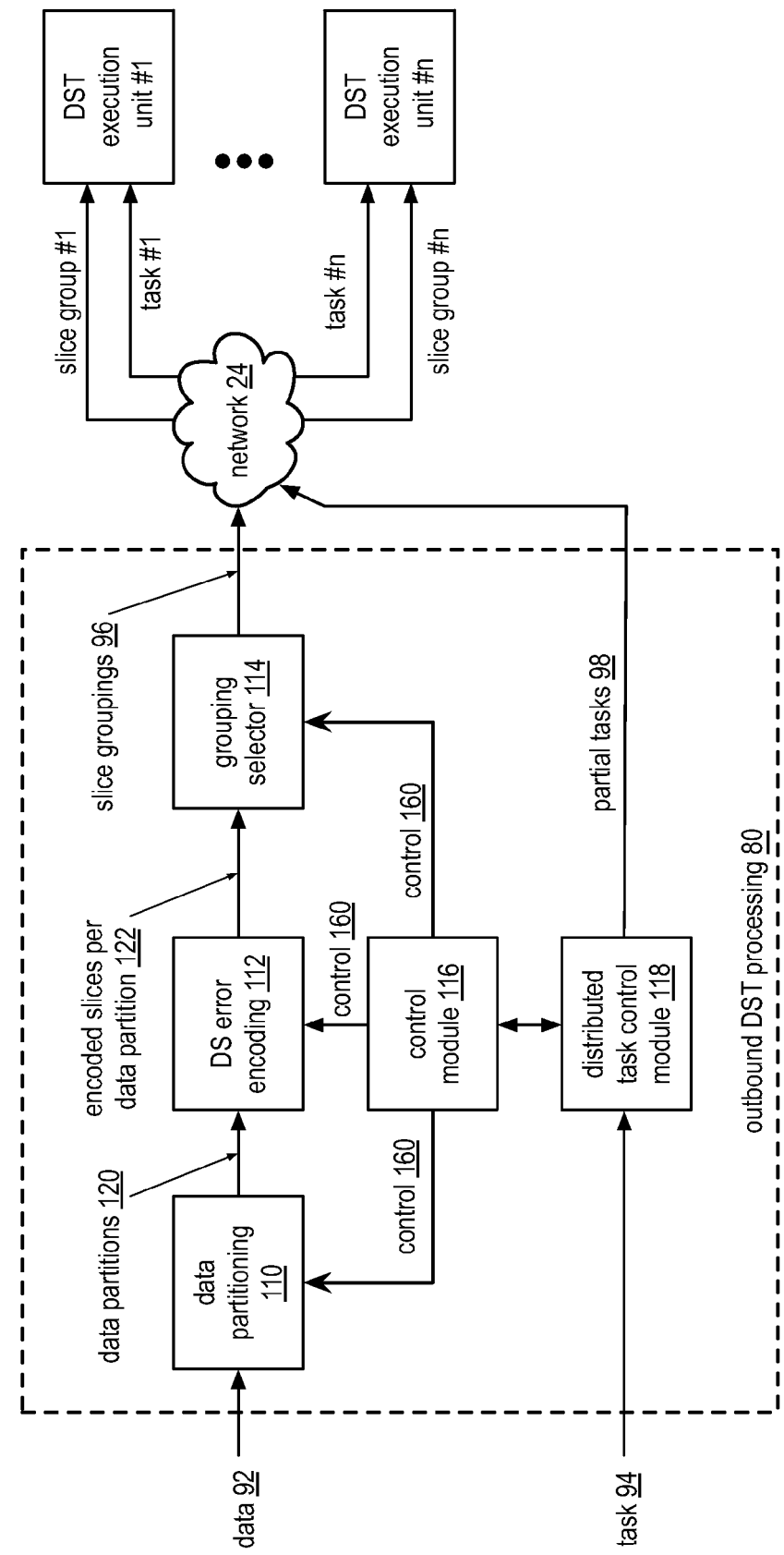
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
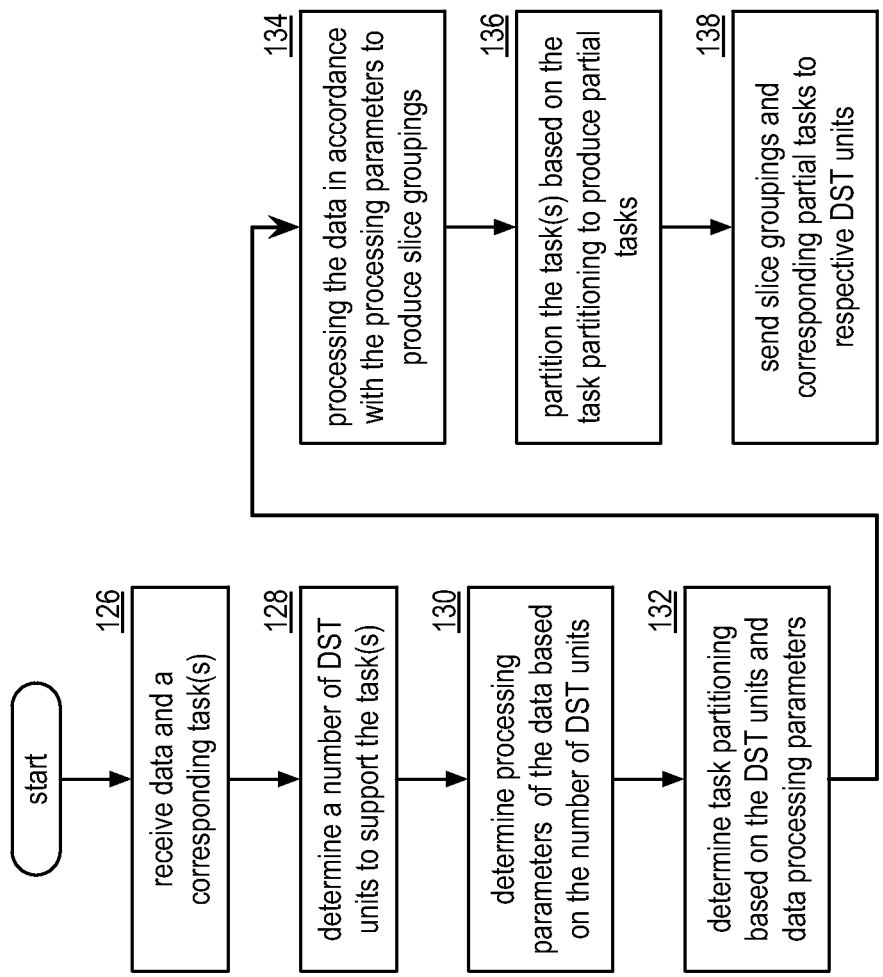
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
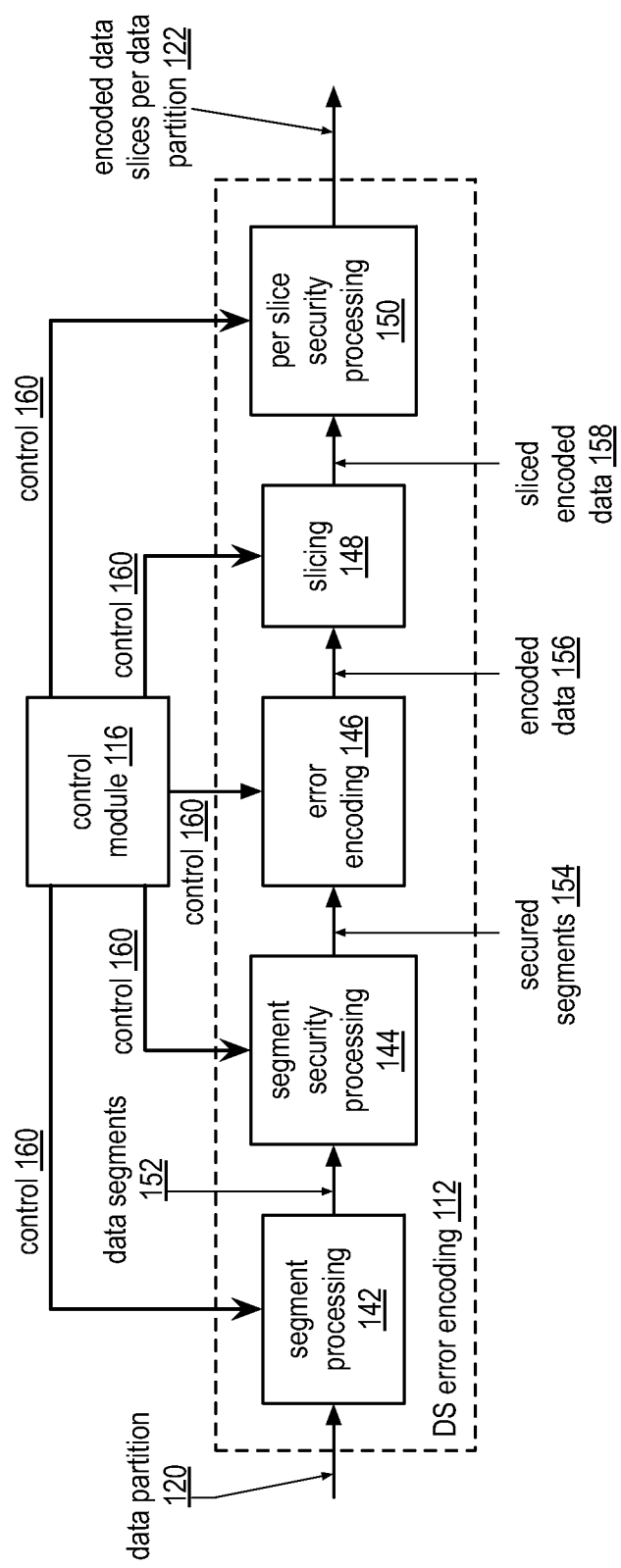
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
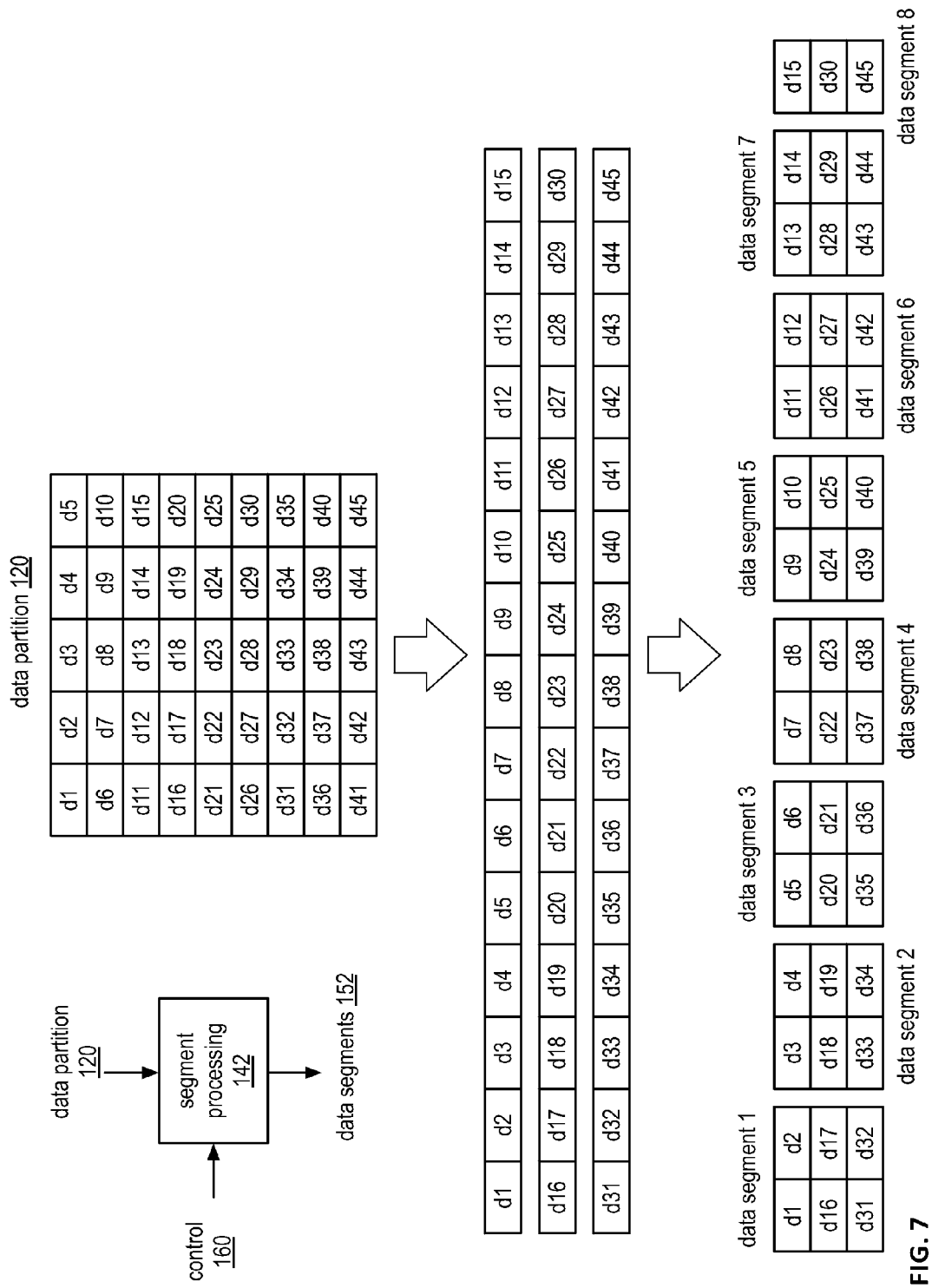
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
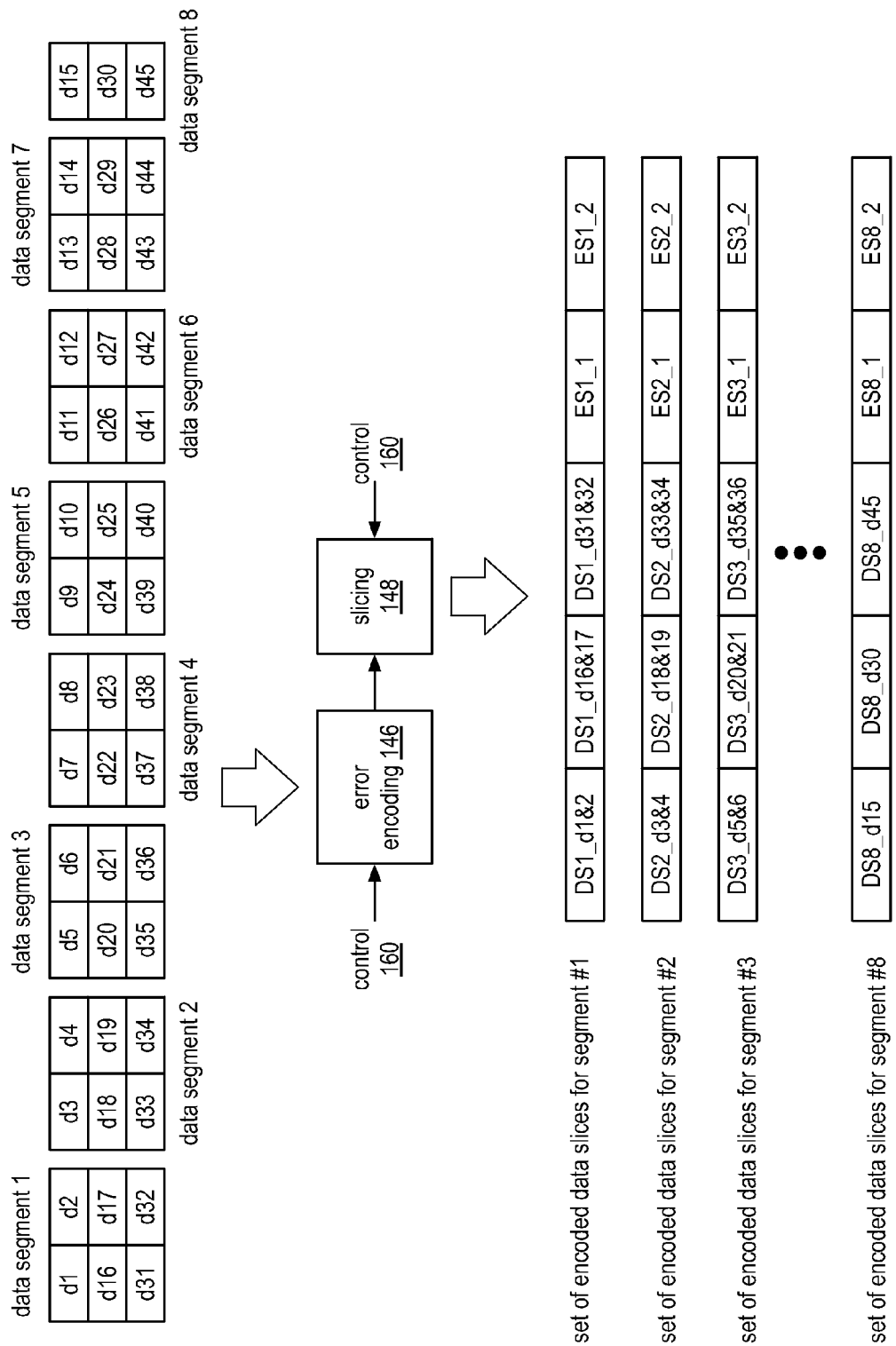
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
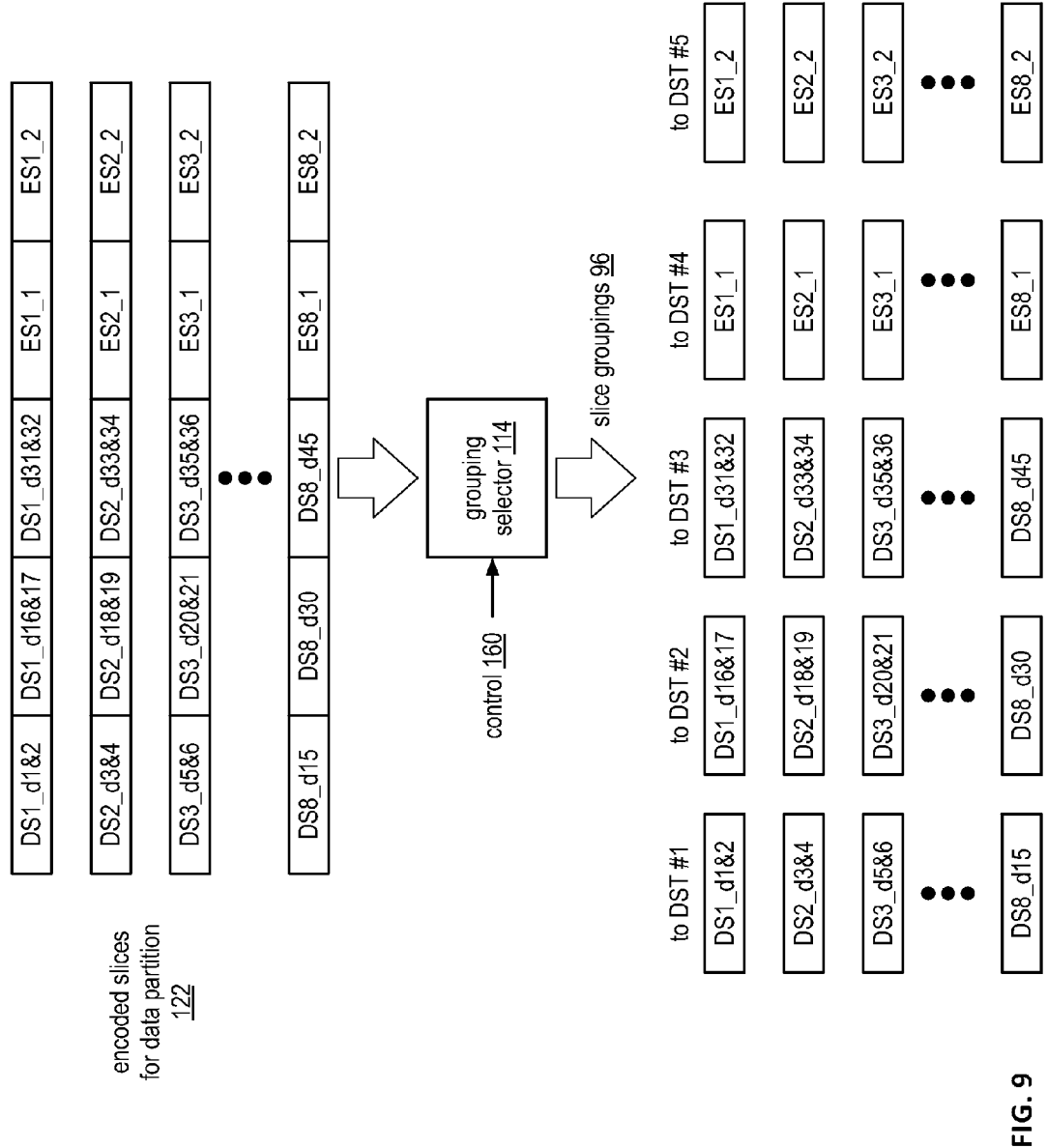
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
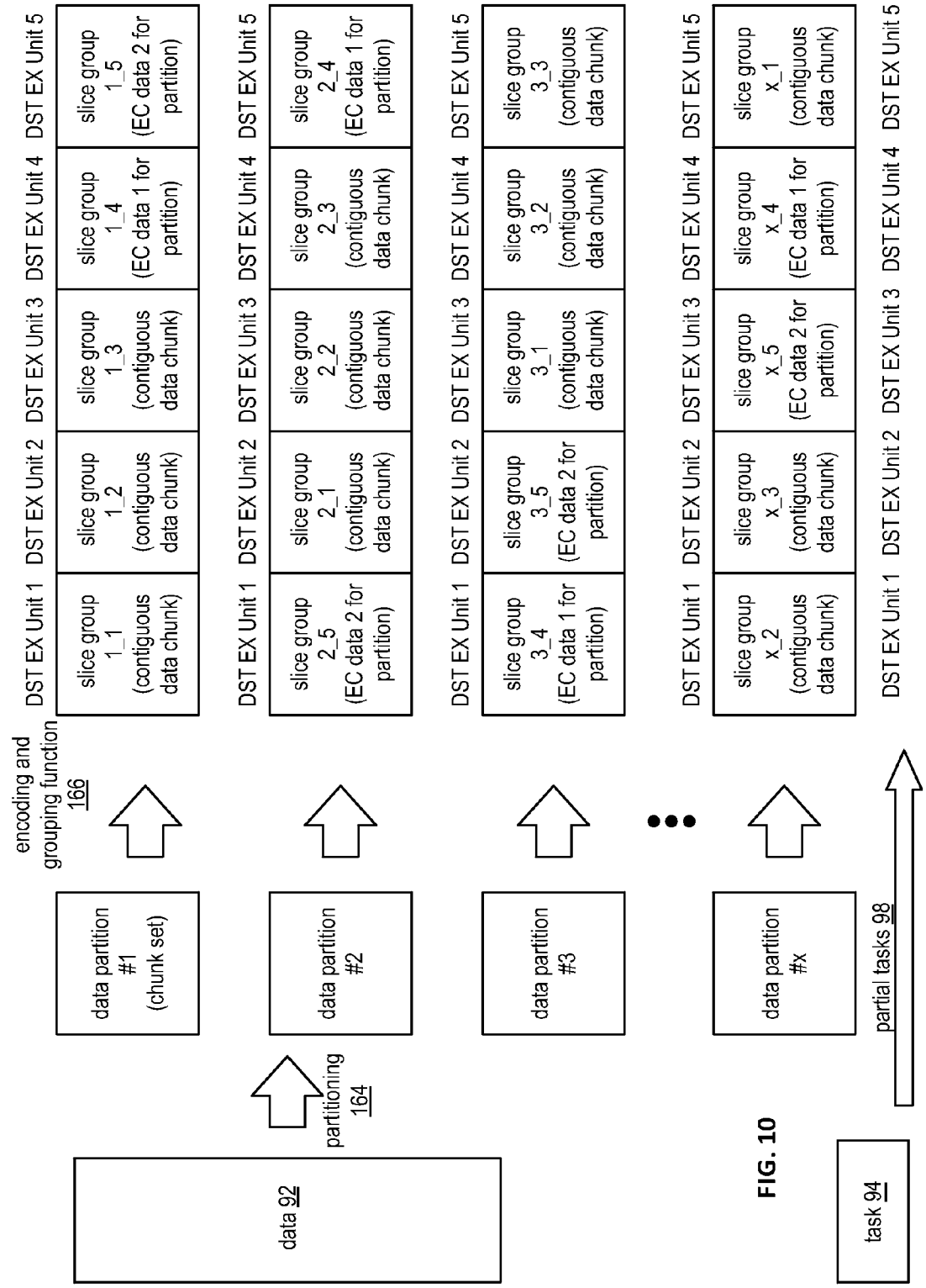
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1–x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
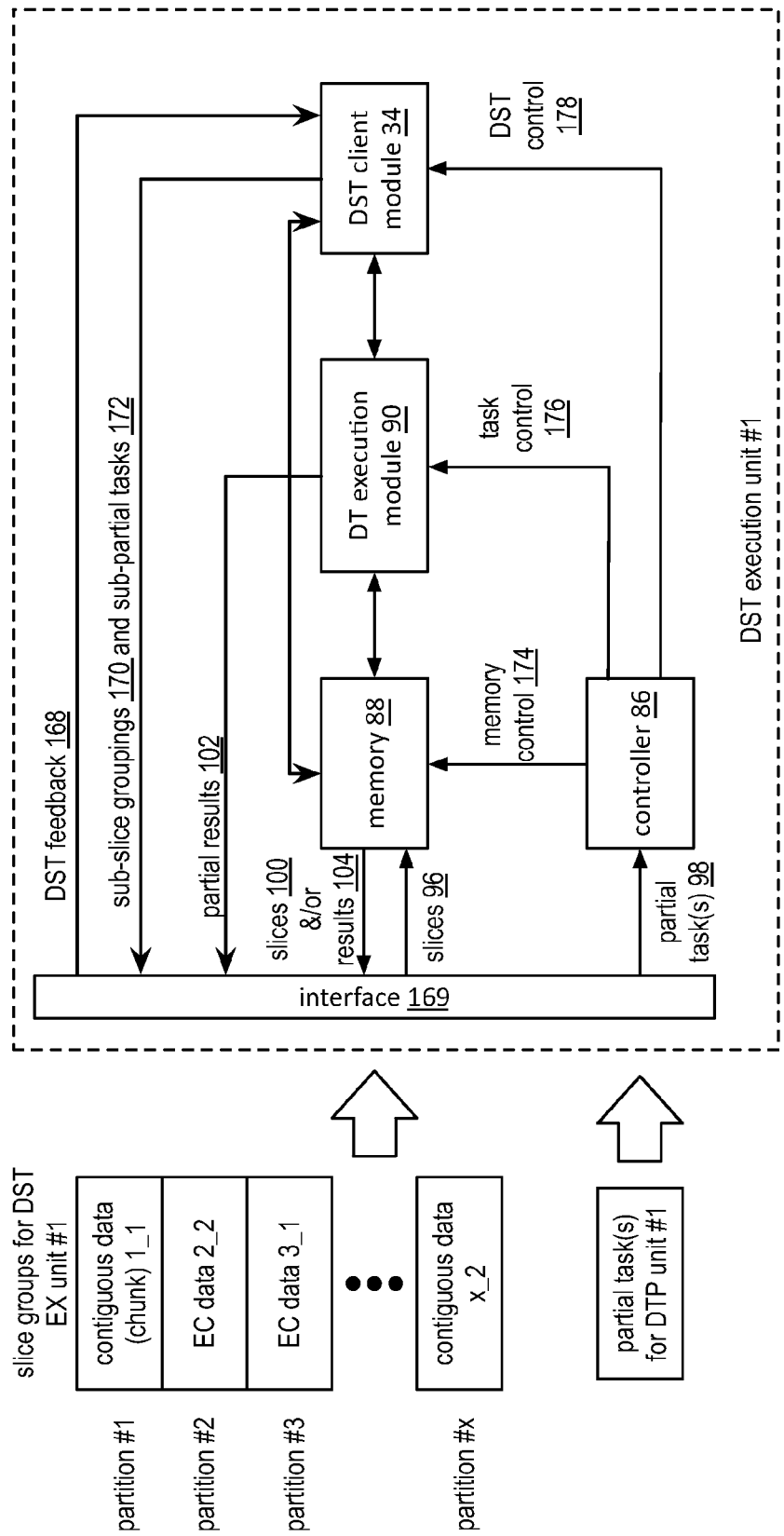
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
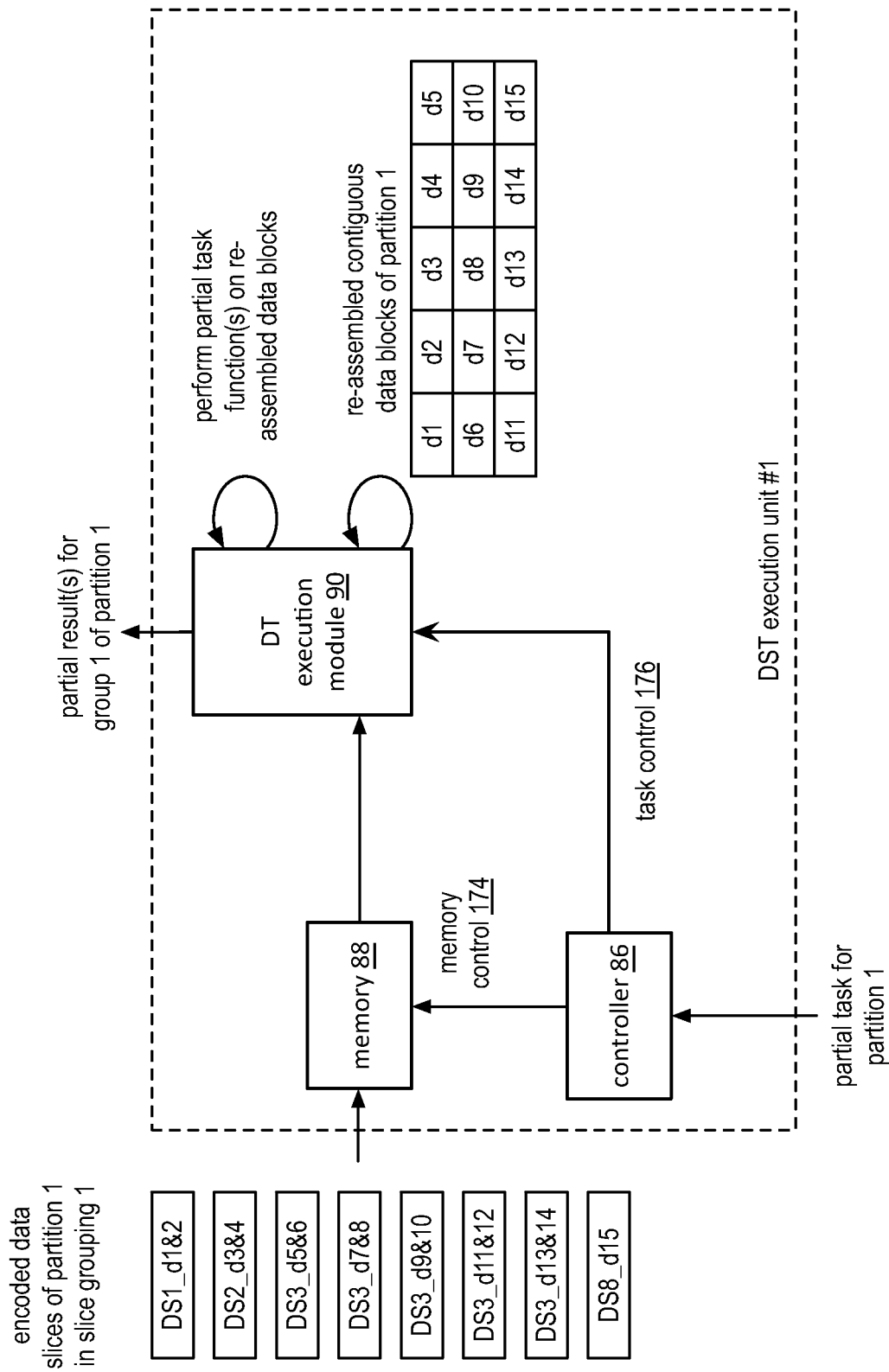
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
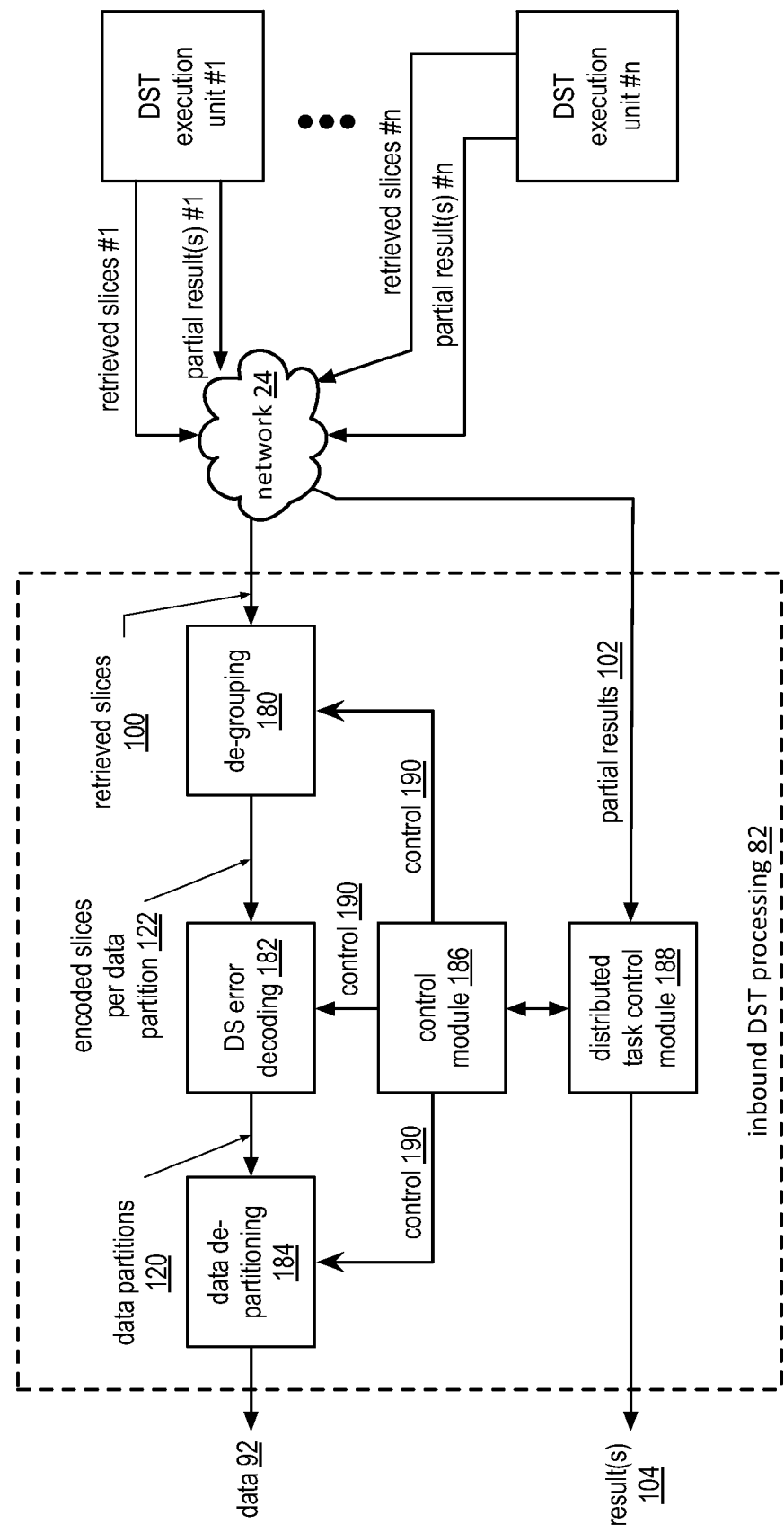
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
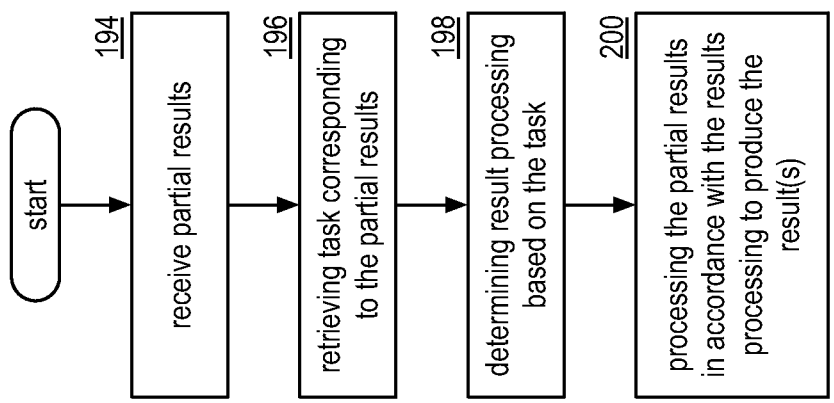
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
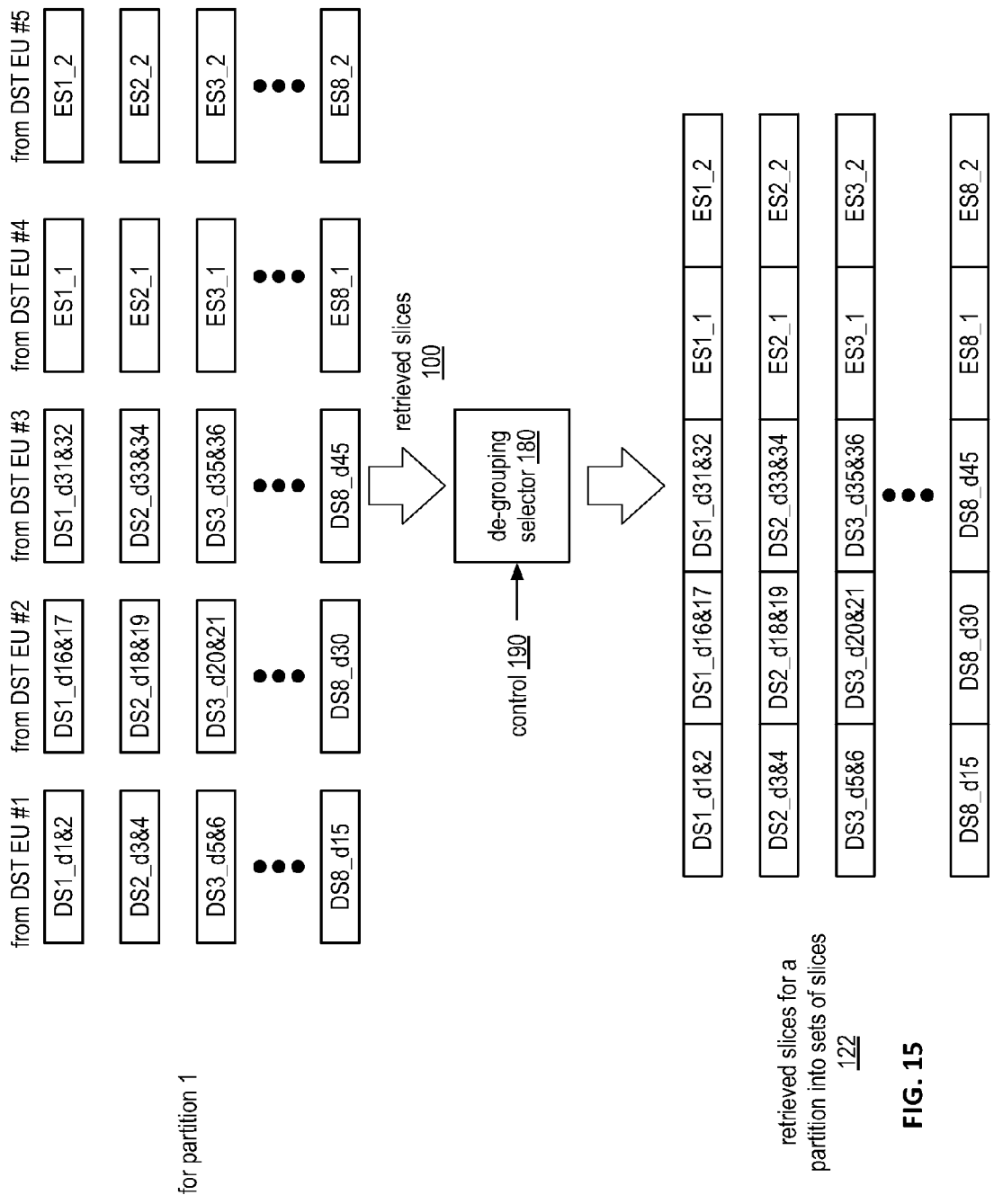
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
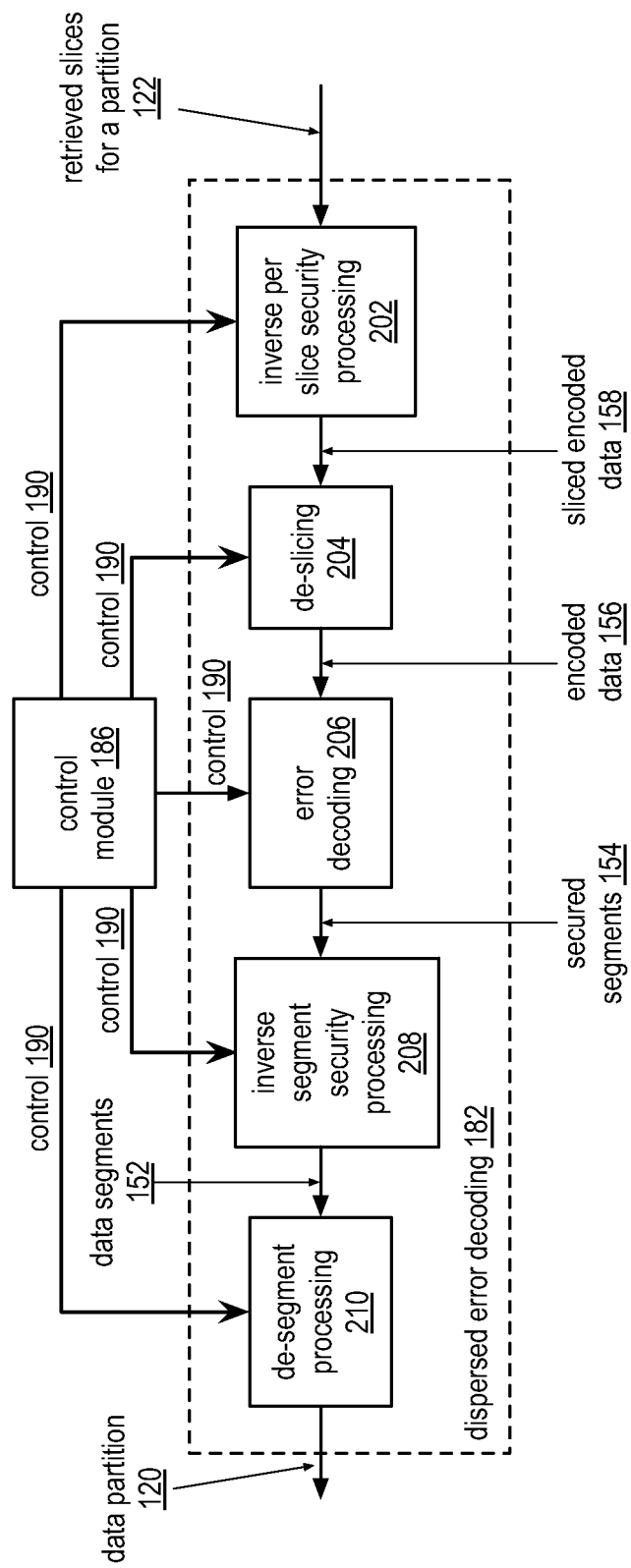
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
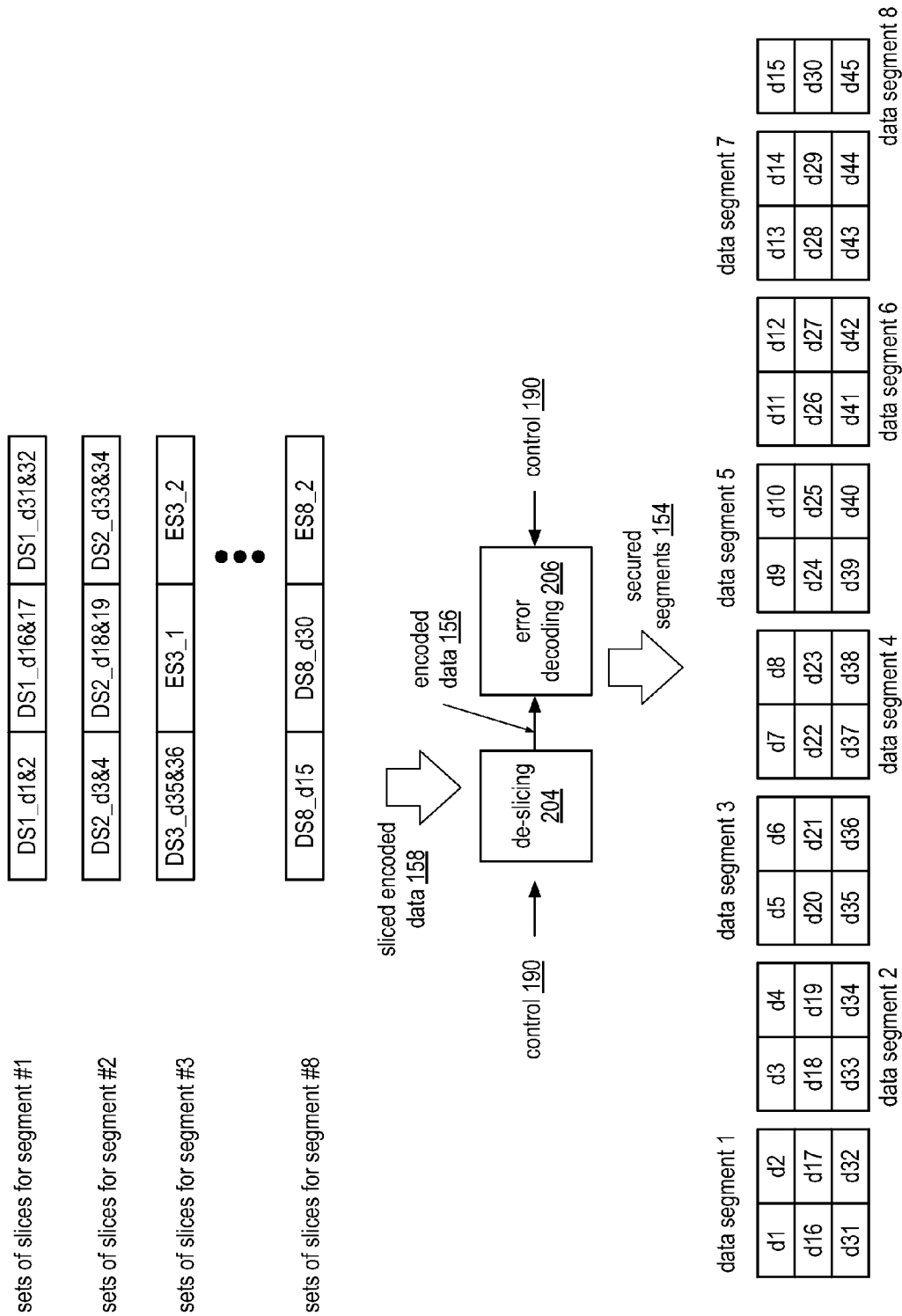
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
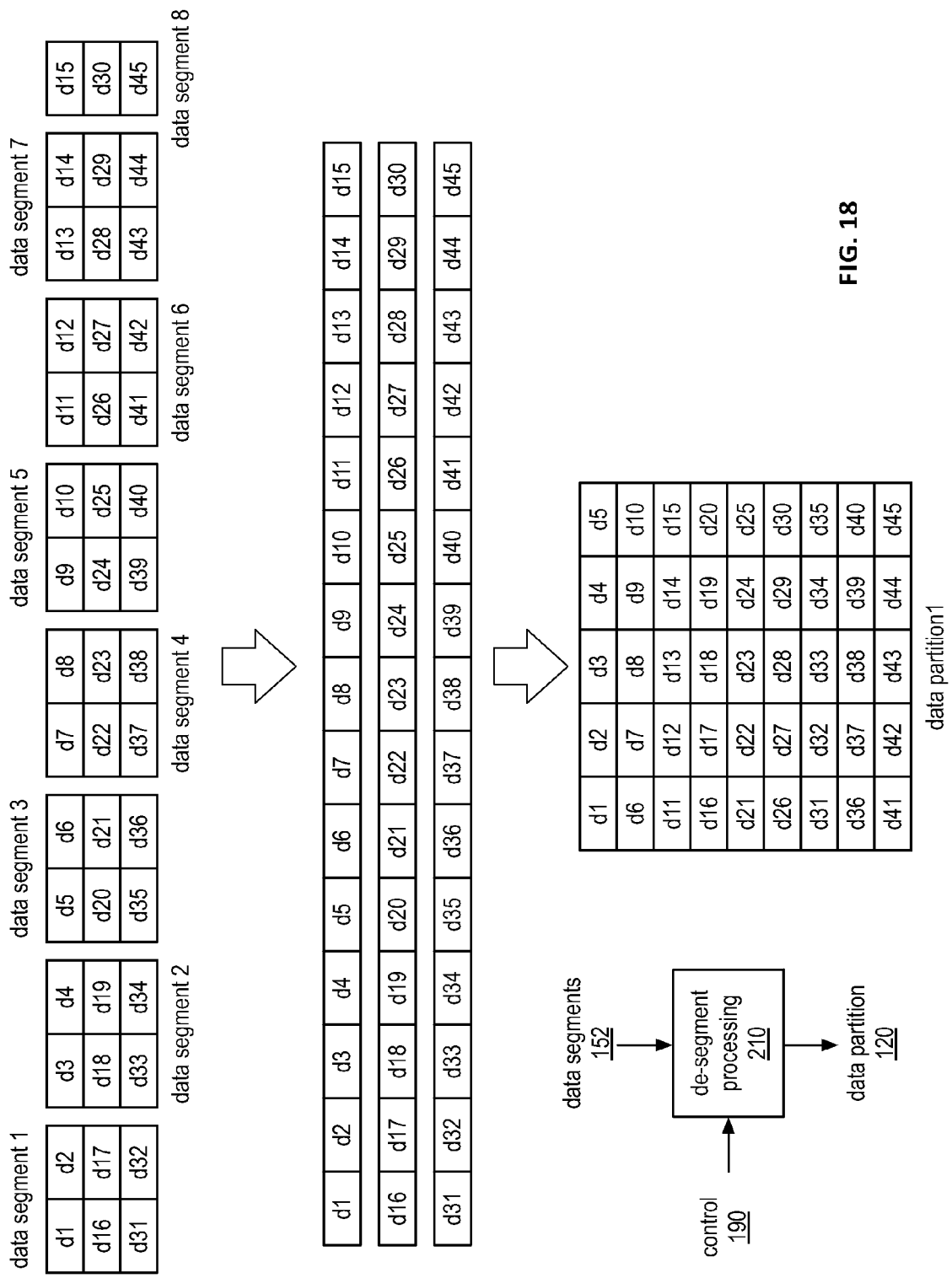
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
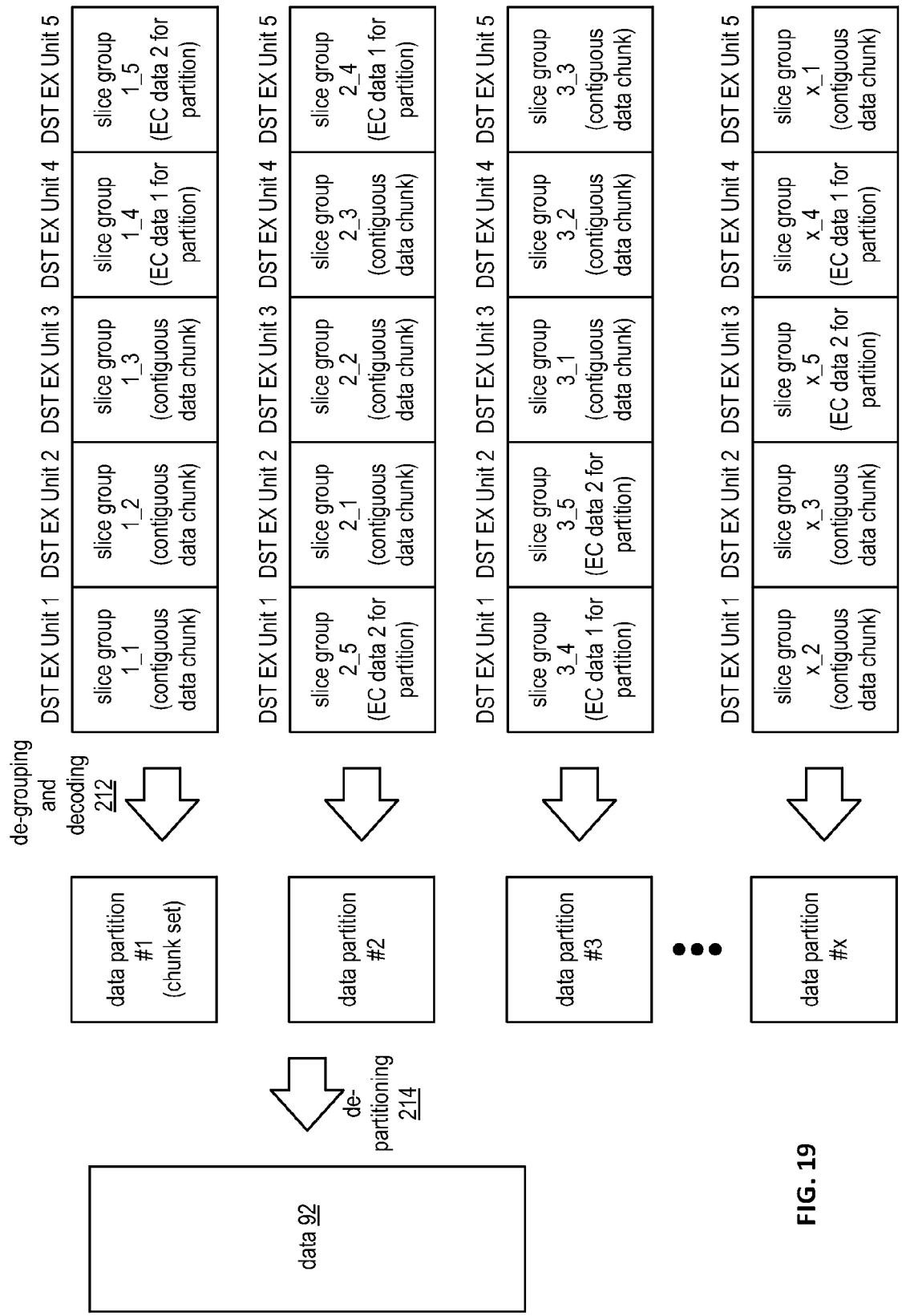
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1–x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
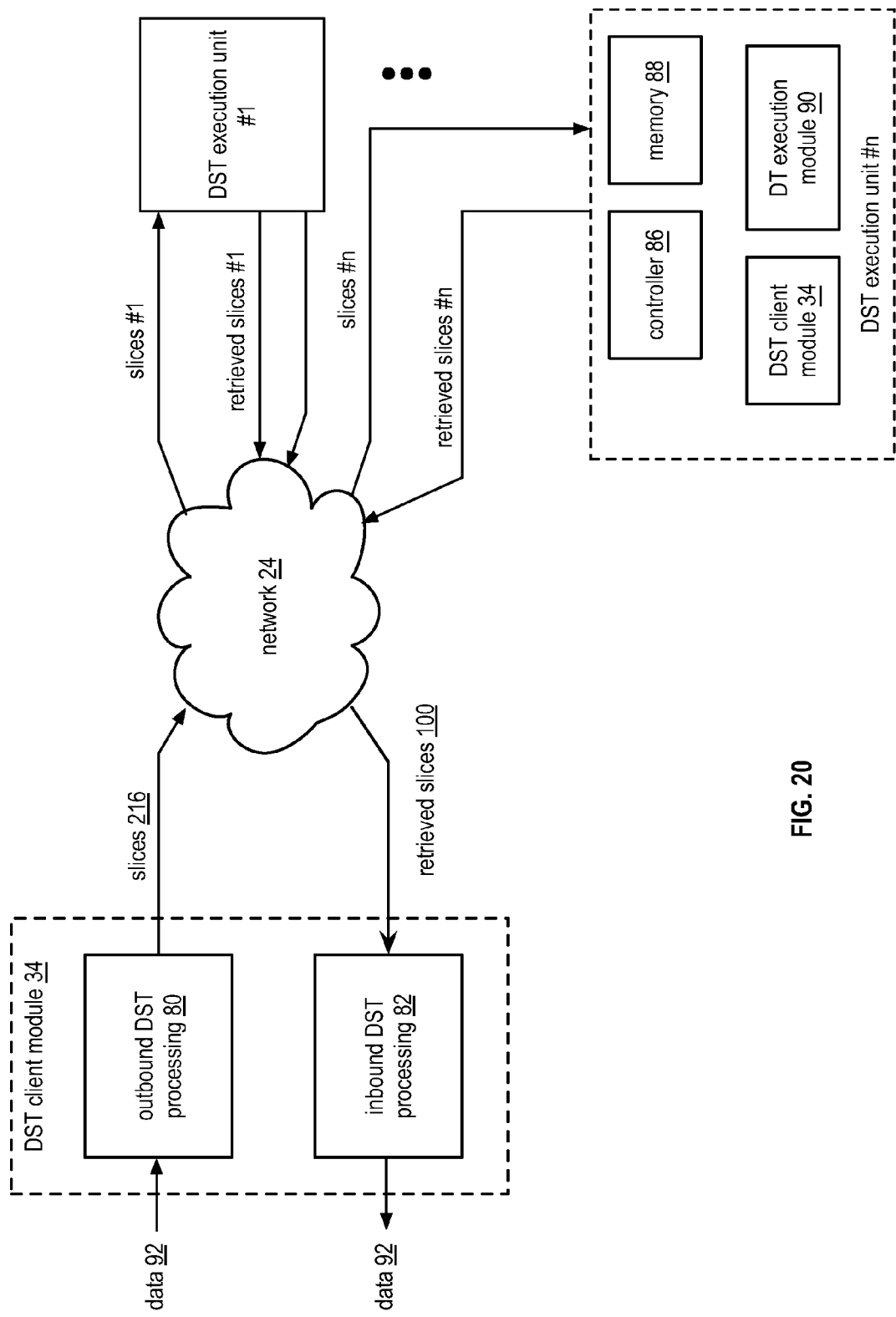
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
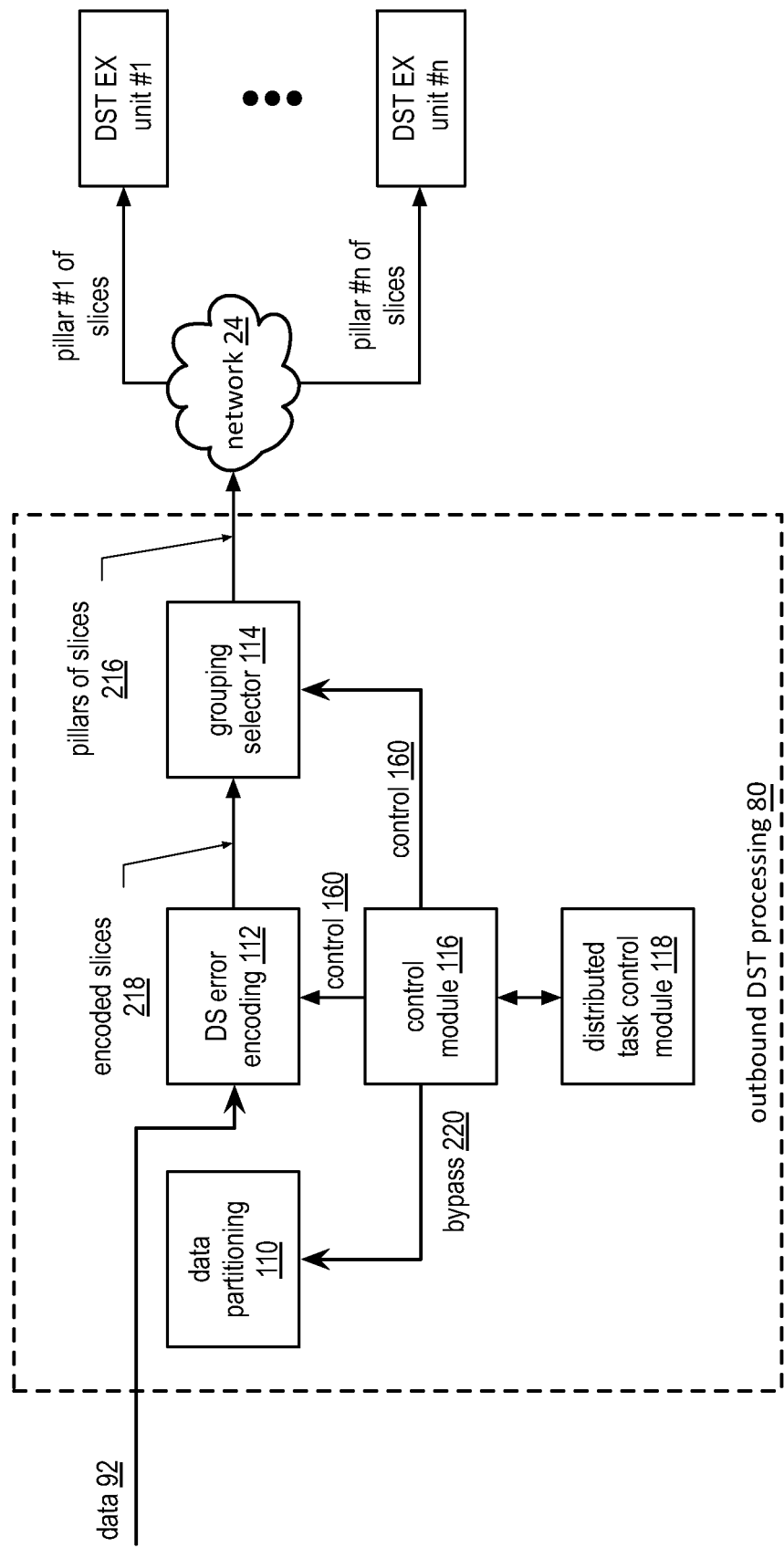
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
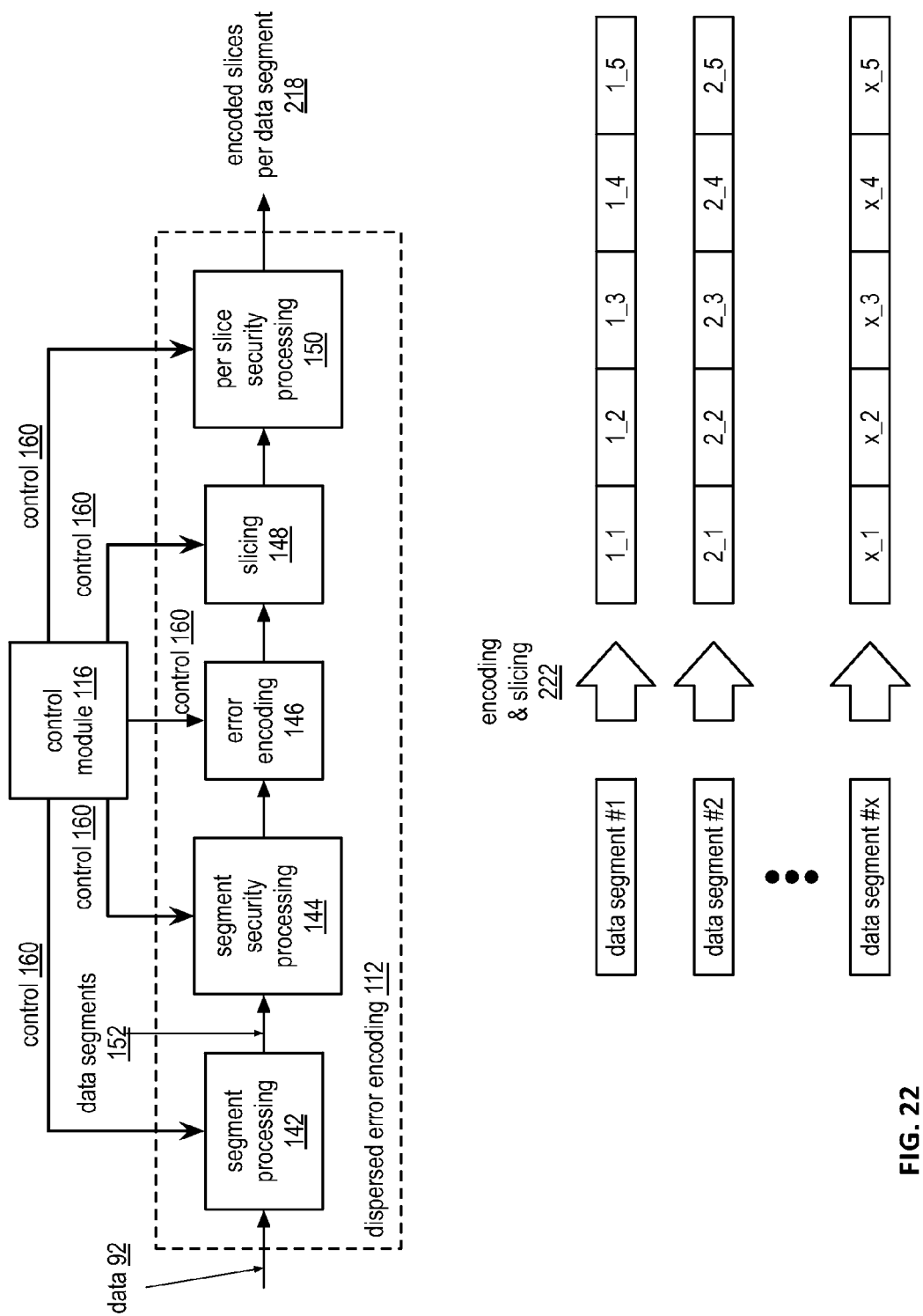
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
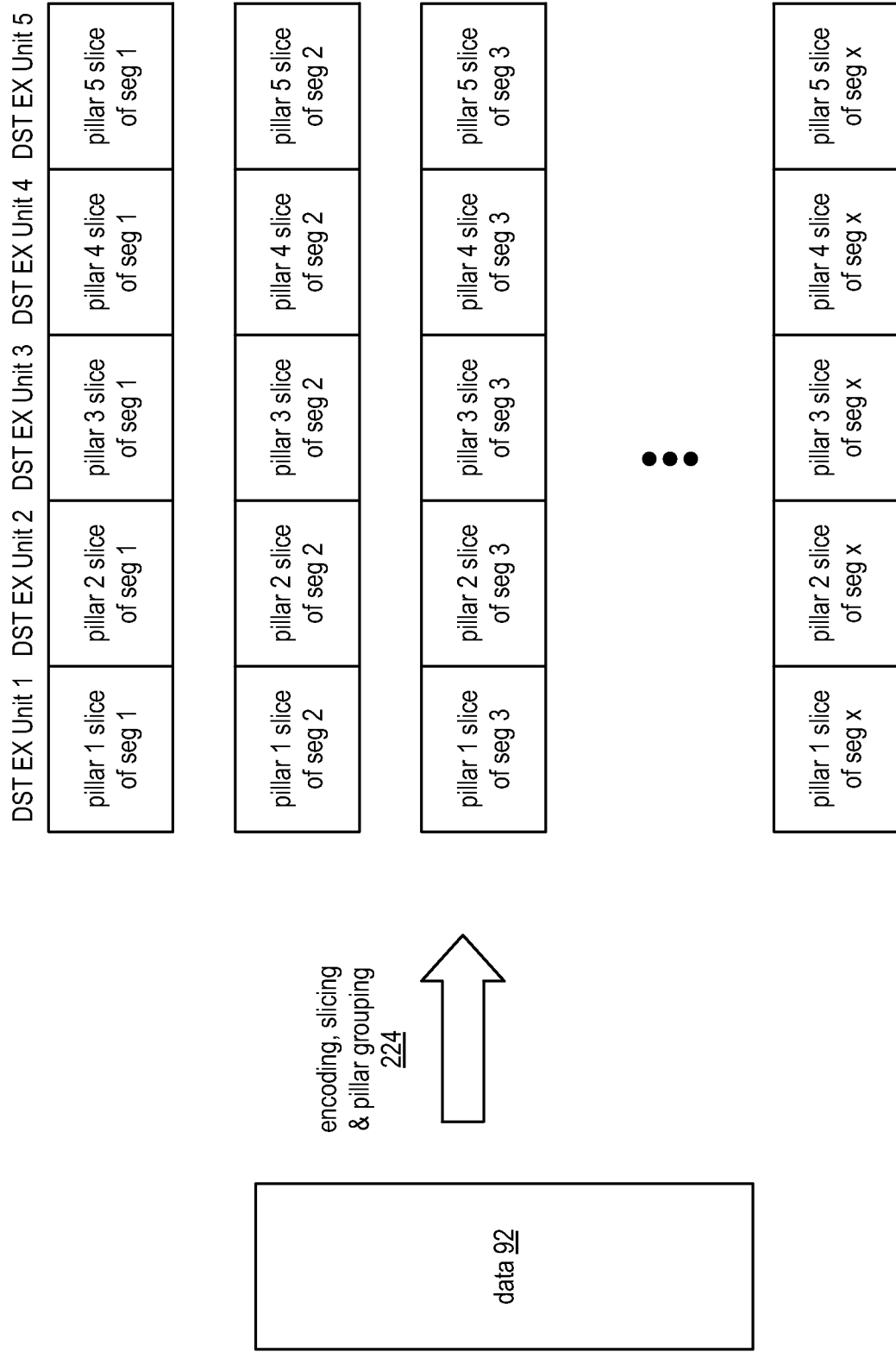
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
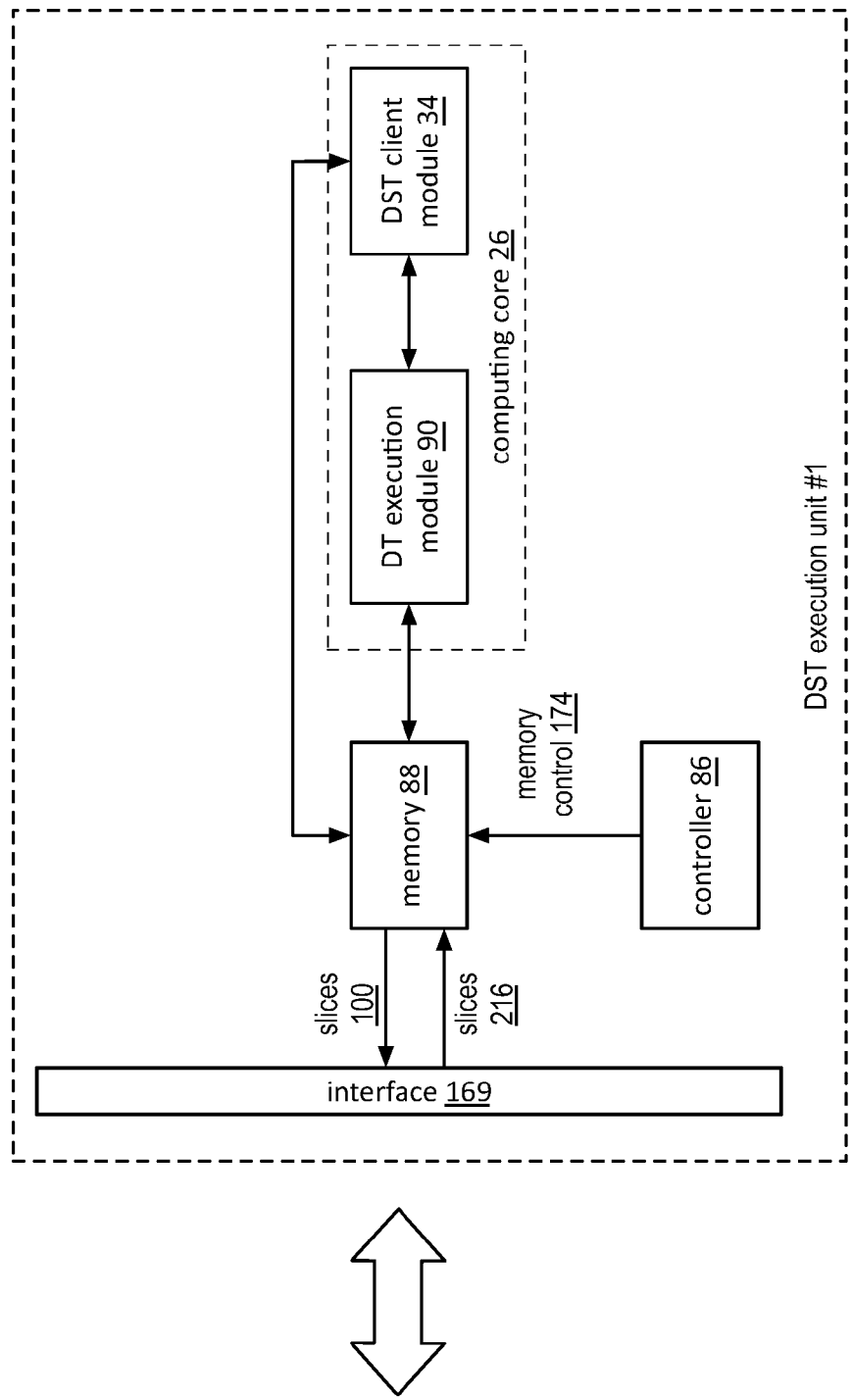
FIG. 24 is a diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
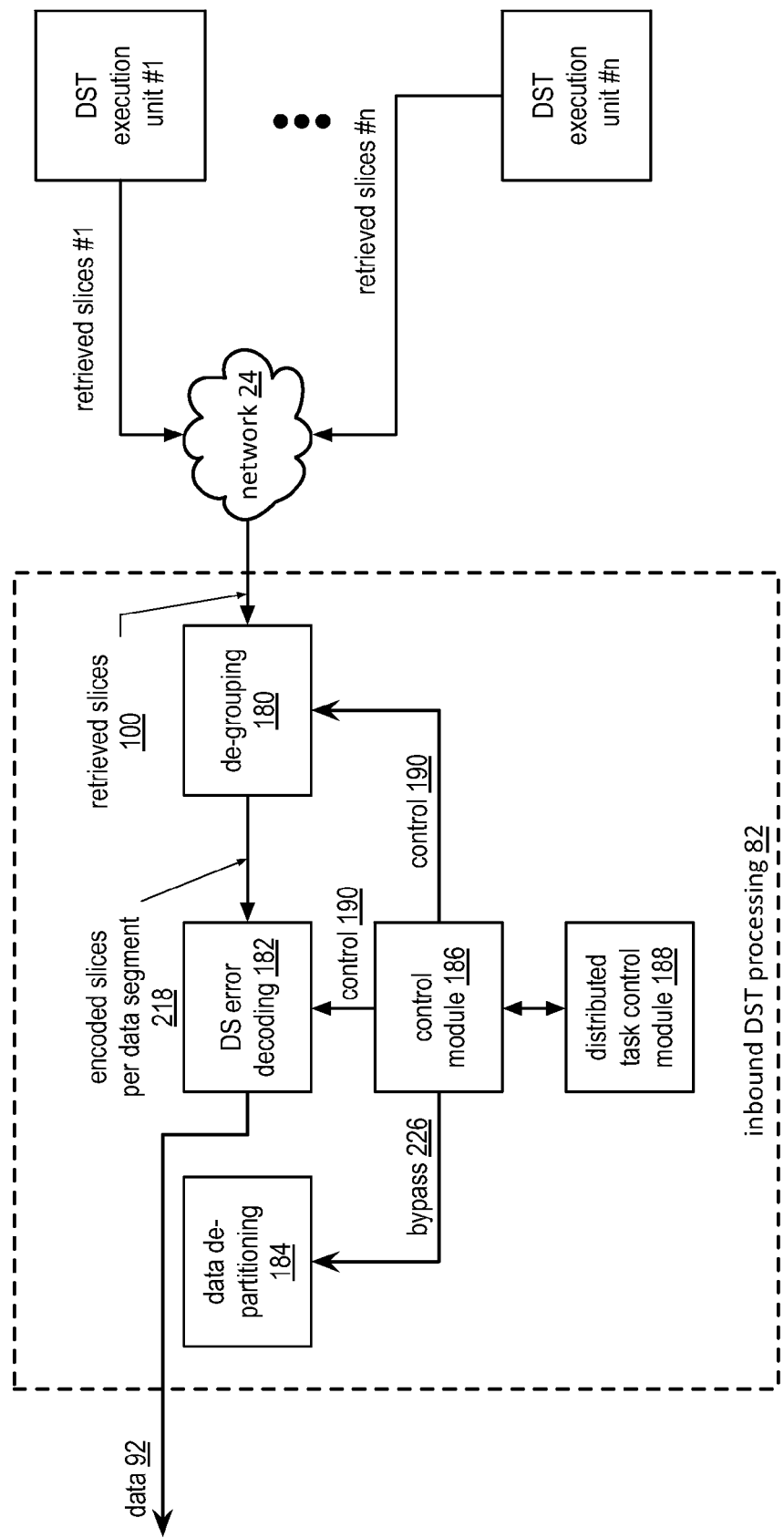
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
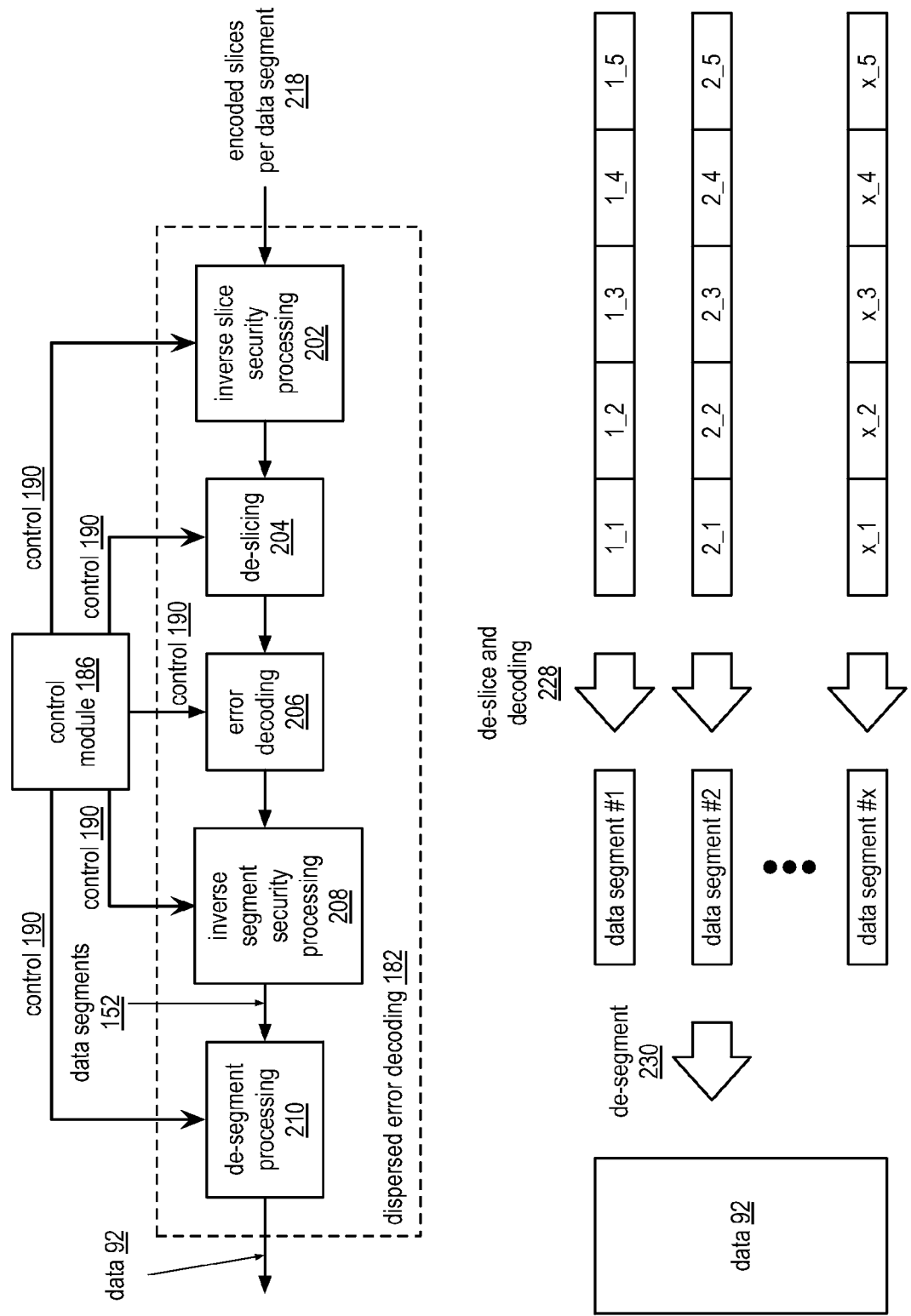
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
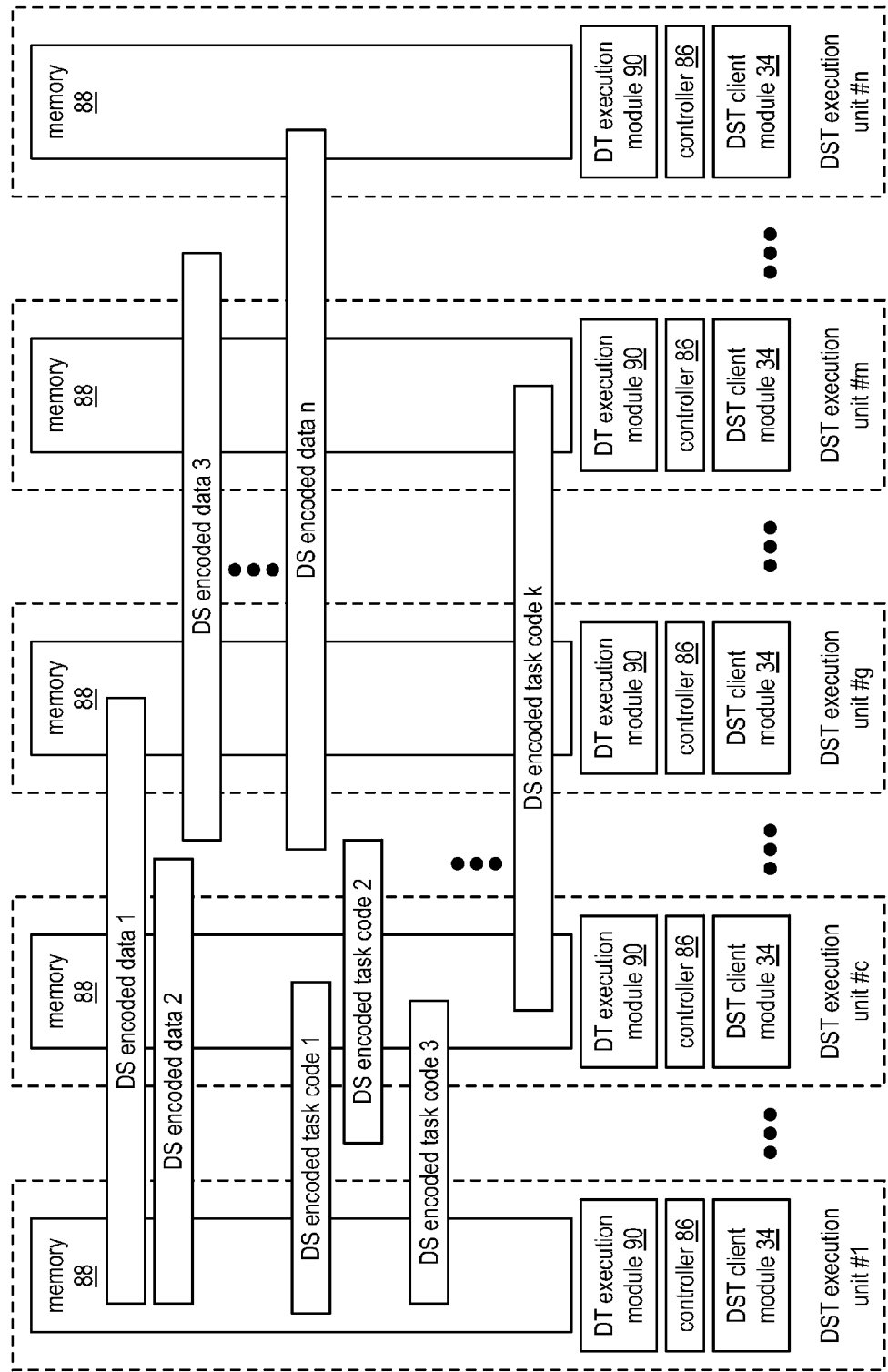
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
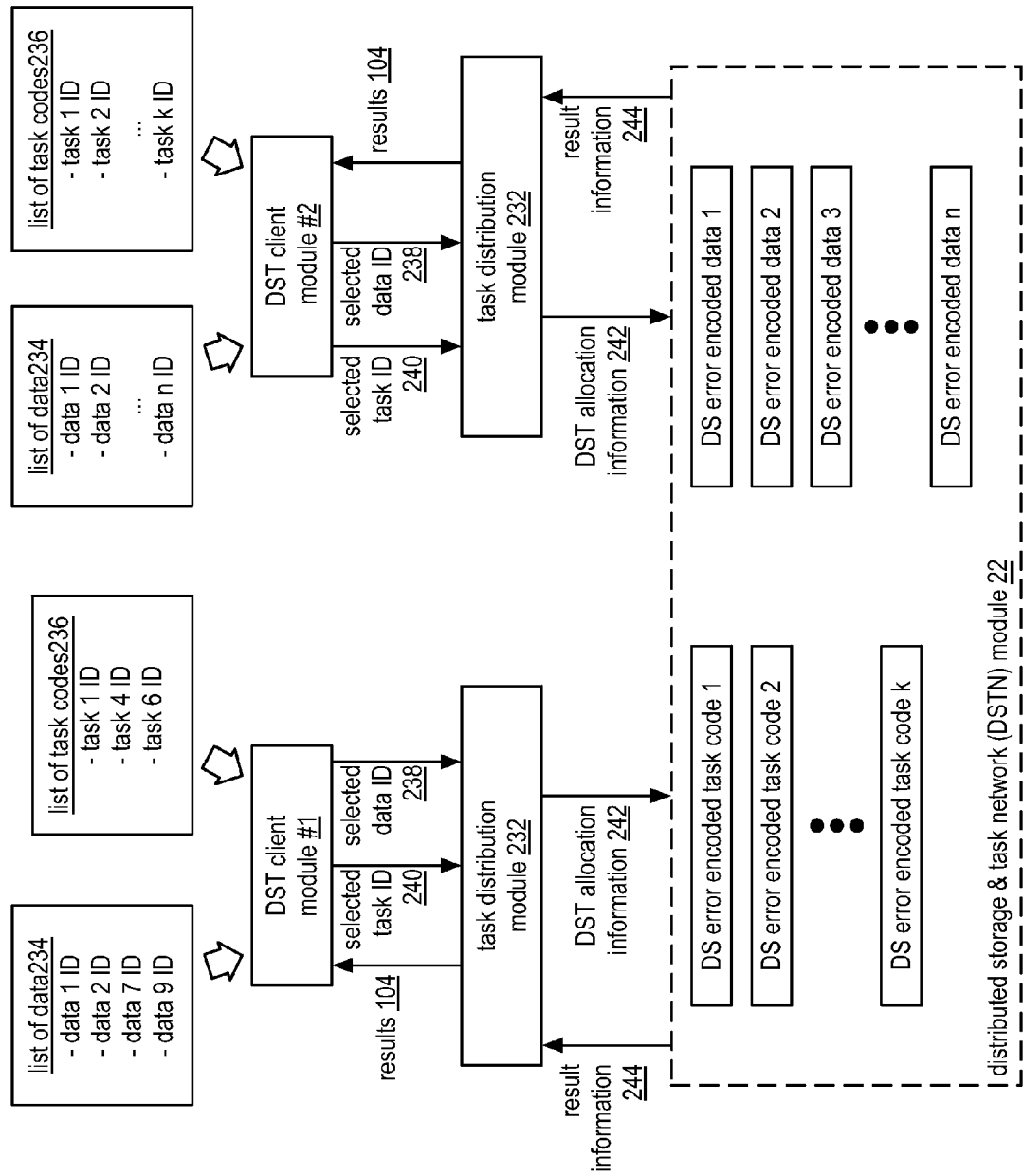
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
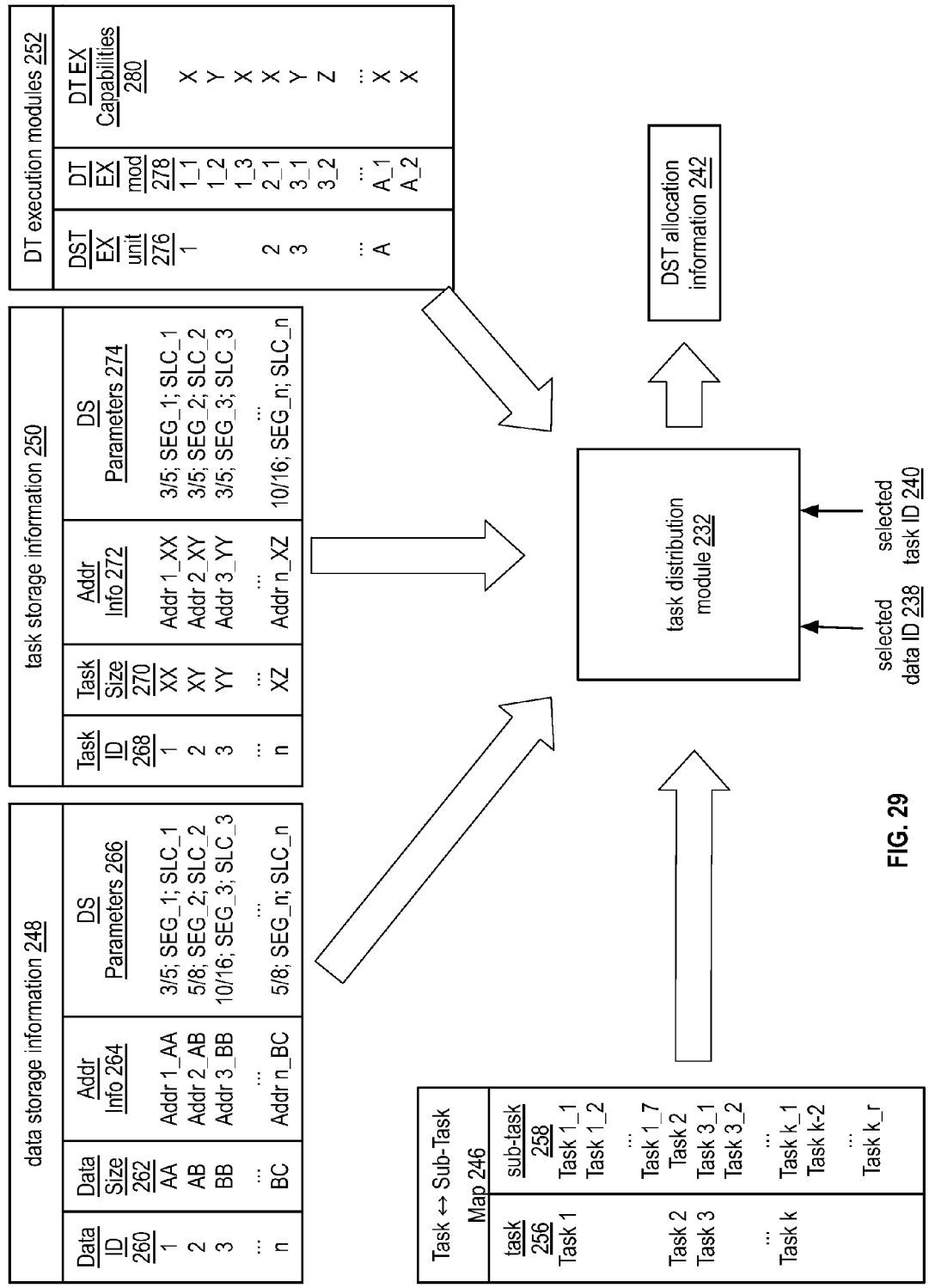
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
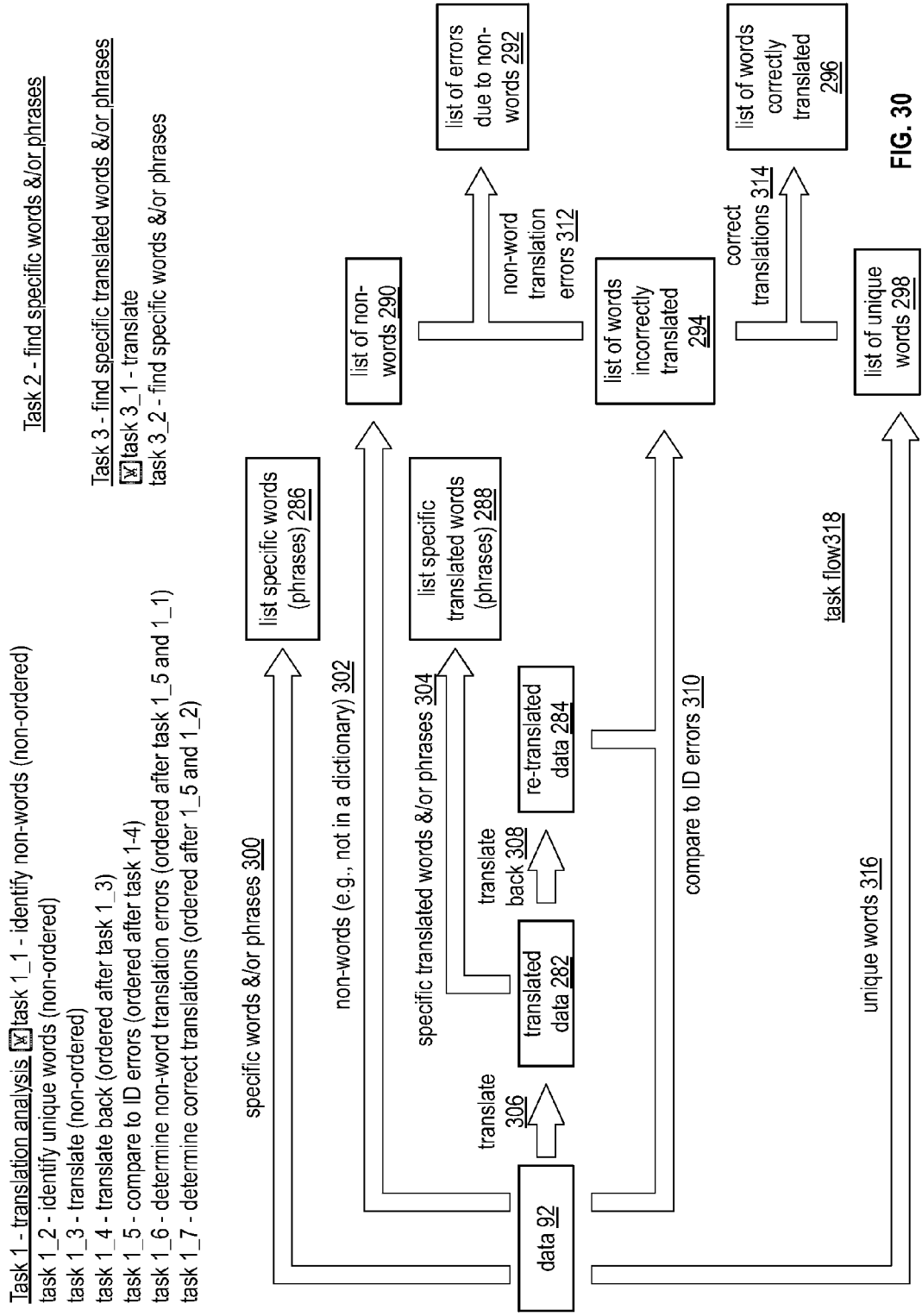
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.) may include the word and/or phrase, how many times it is used, where in the data it is used, and/or any other information requested regarding a word and/or phrase.

Figure 31:
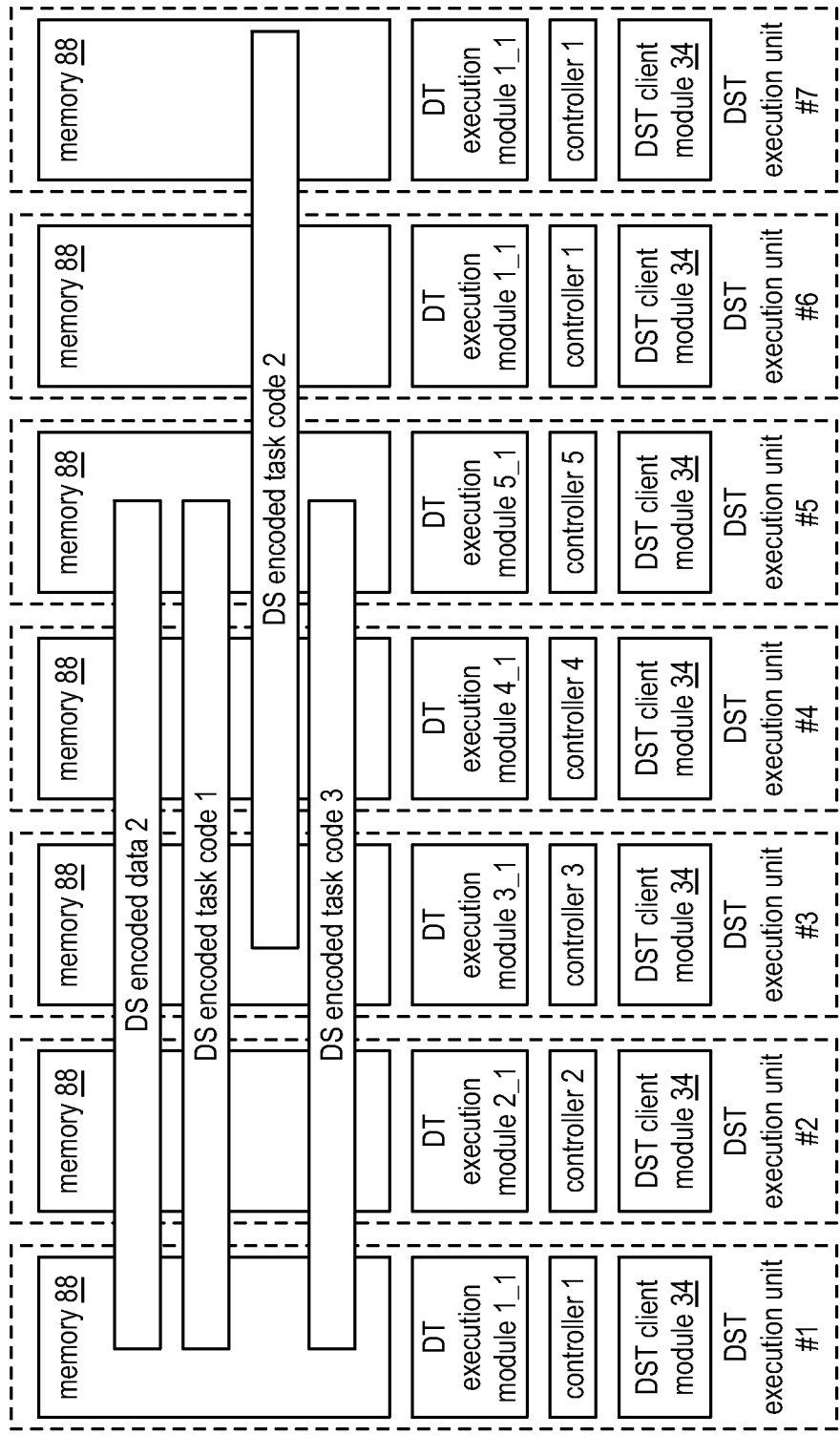
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1_4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 22, 32, 42, and 52. For instance, DT execution modules 12, 22, 32, 42, and 52 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

Figure 33:
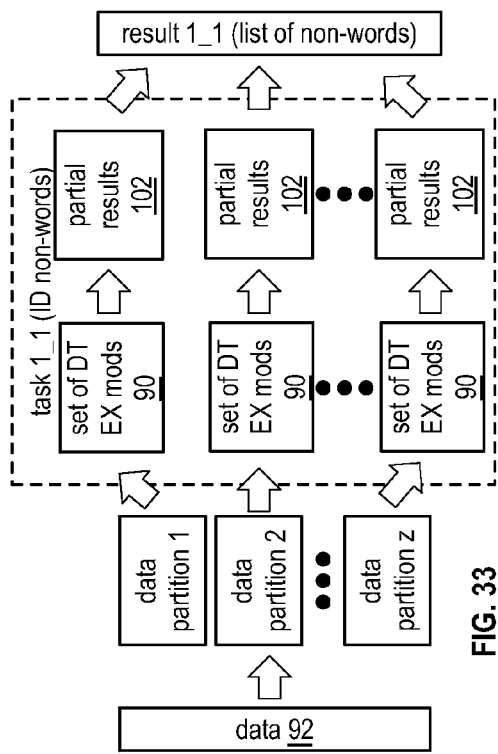

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

Figure 34:
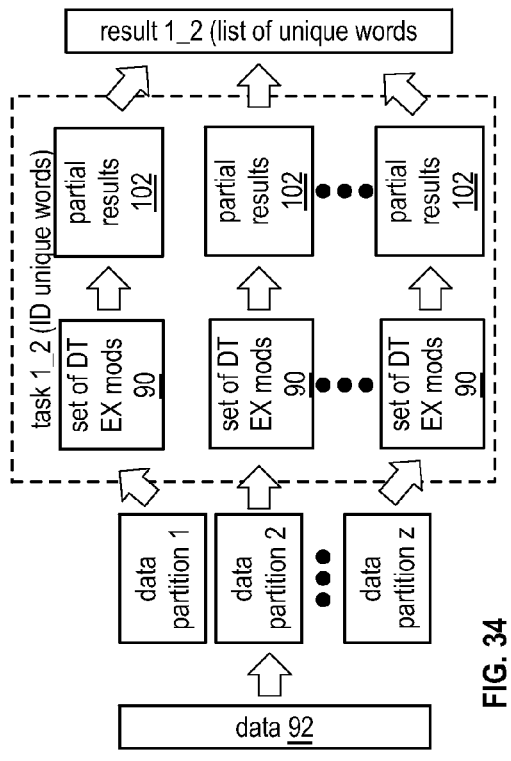

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-5).

Figure 35:
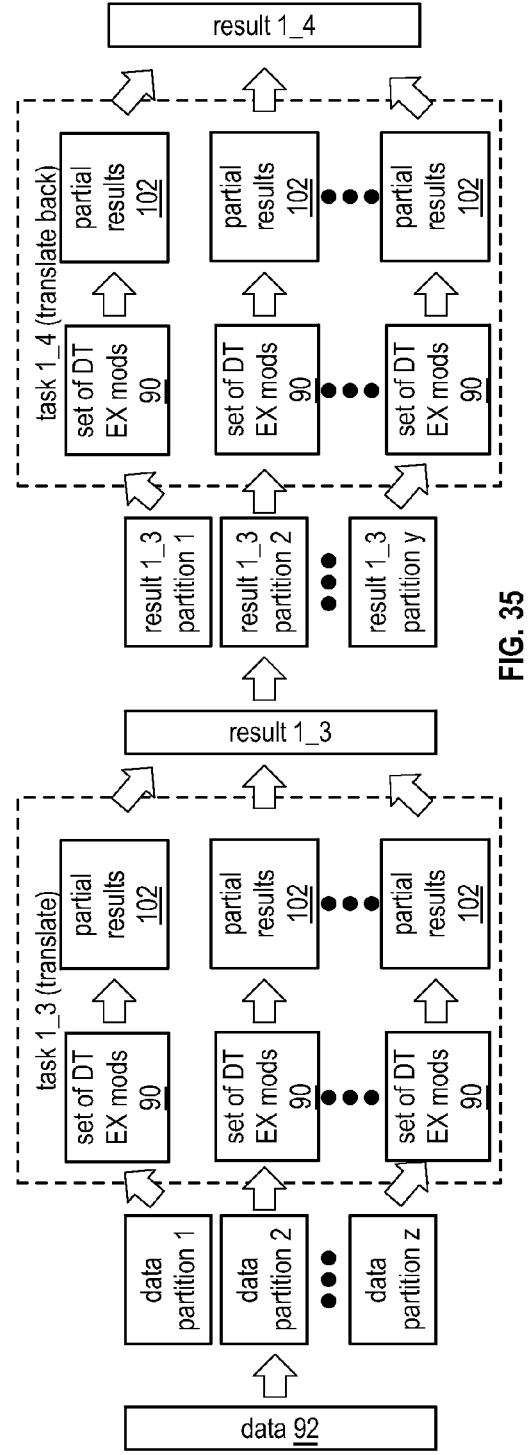

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3)

into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
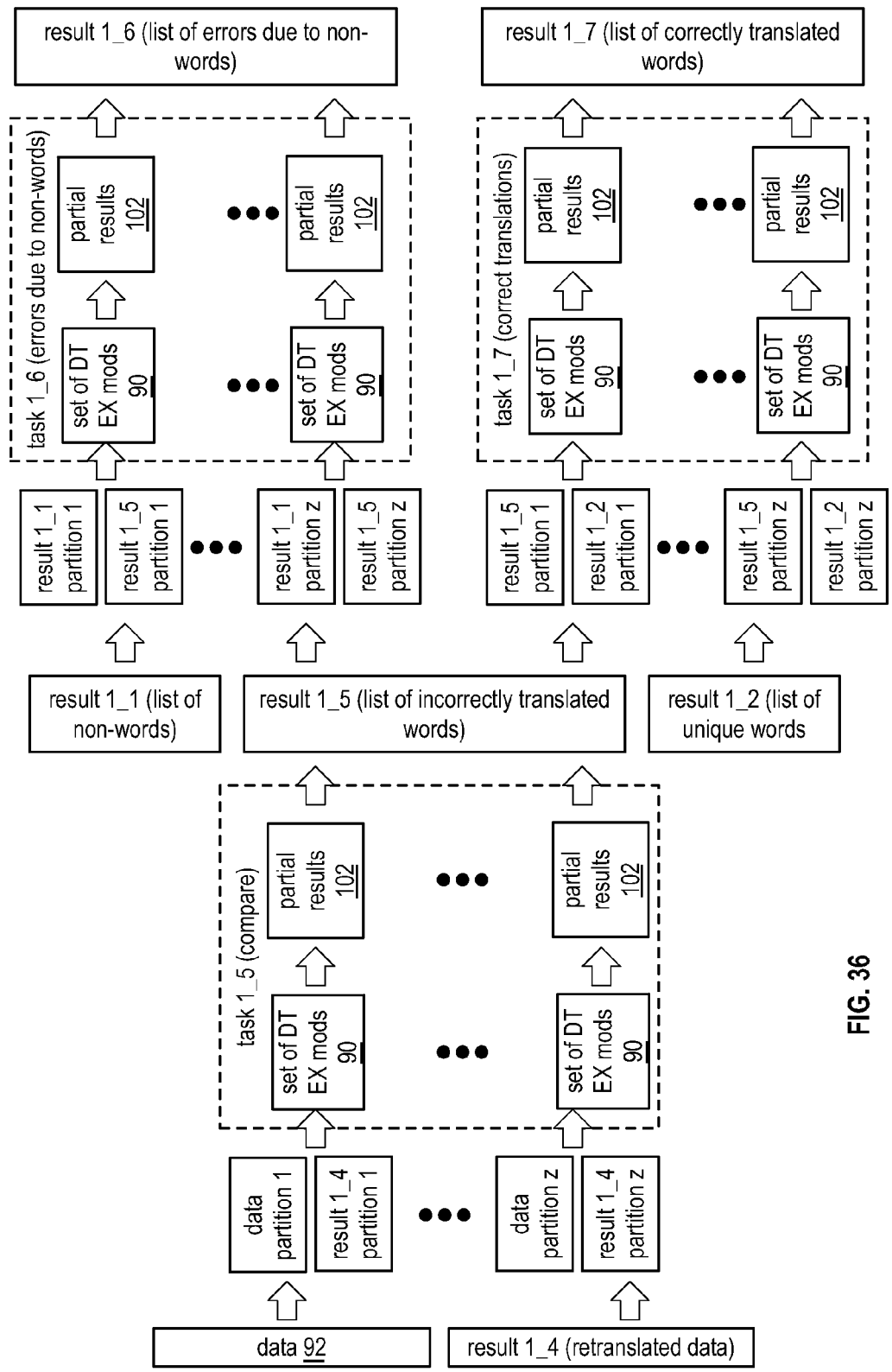

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
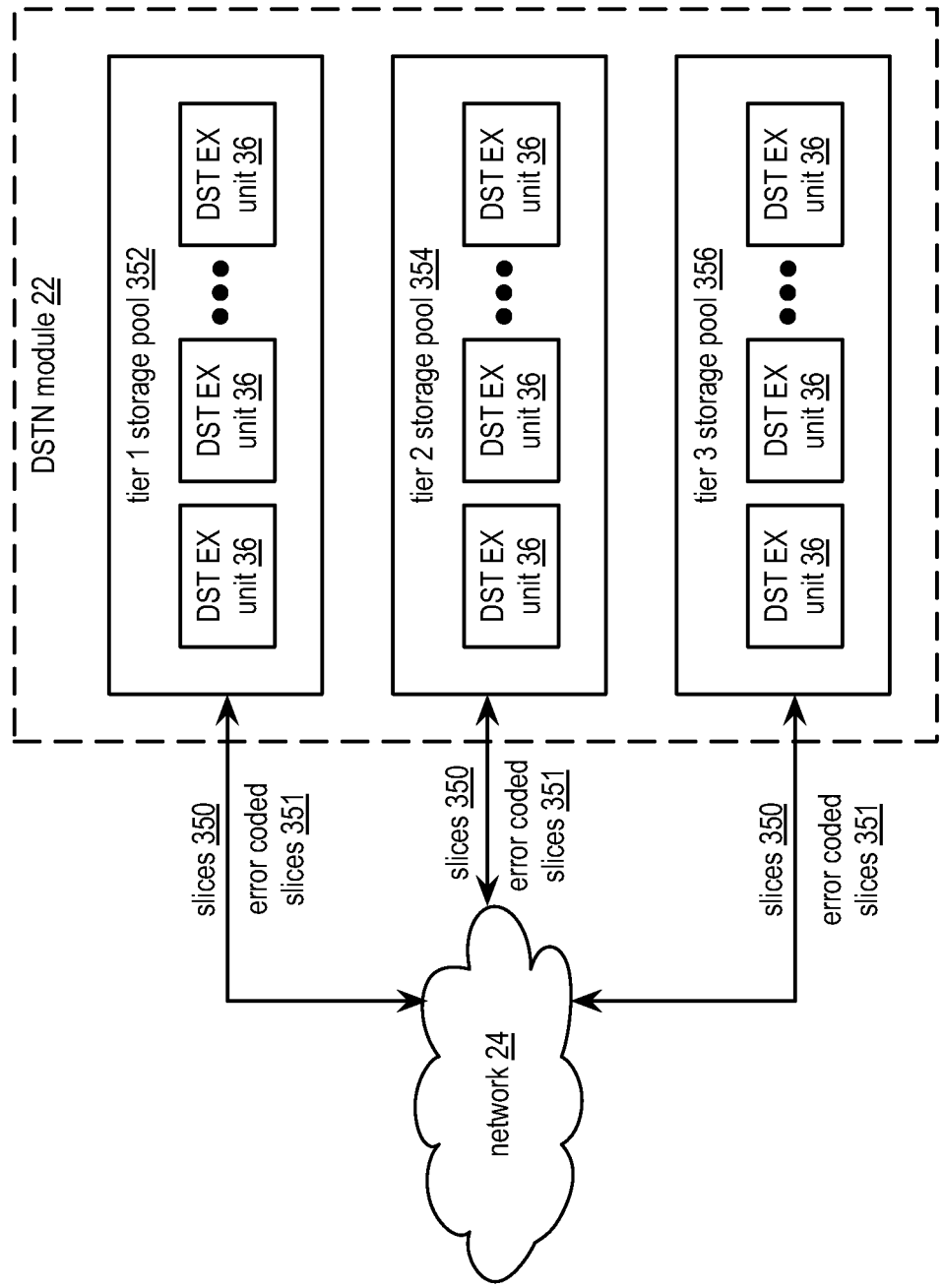
FIG. 40A is a schematic block diagram of another embodiment of a distributed computing system in accordance with the present invention.

FIG. 40A is a schematic block diagram of another embodiment of a distributed computing system. The system includes a network 24 and a distributed storage and task network (DSTN) module 22. The DSTN module 22 includes a plurality of tiered storage pools 352, 354, and 356 (e.g., tiers 1-3). Each storage pool of the plurality of tiered storage pools 352-356 includes a set of distributed storage and task (DST) execution modules 36 utilized to access at least one of slices 350 and error coded slices 351. Each storage pool of the plurality of tiered storage pools 352-356 is operably coupled via the network 24 to the plurality of tiered storage pools 352-356 to facilitate migrating slices 350 and/or error coded slices 351 (e.g., "slices"). The migrating slices may enable a more favorable match of a slice storage performance requirement and an actual slice storage performance when at least one storage pool of the plurality of storage pools 352-356 is associated with an actual slice storage performance level that is different than an actual slice storage performance level associated with at least one other storage pool.

Each storage pool may be associated with a target slice storage performance level, where the target slice storage performance level includes one or more of an access latency level, an access bandwidth level, a cost level, a storage capacity level, a geographic affiliation, a security level, and an availability level. For example, the tier 1 storage pool 352 may be associated with active storage requiring a target slice performance level that includes a lowest access latency performance level and an average reliability level. As another example, the tier 3 storage pool 356 may be associated with inactive storage requiring a target slice performance level that includes allowing a highest access latency performance level and mandating a highest reliability level. As yet another example, the tier 2 storage pool 354 may be associated with near line storage requiring a target slice performance level including an average access latency performance level and an average reliability level.

From time to time, a determination may be made (e.g., by one or more of the DST execution units 36, by a DS processing unit, by a processing module) whether to move slices from a first storage pool to a second storage pool to achieve a better match of required performance and delivered performance when a change is detected in required performance. For example, a determination is made to move slices from a storage pool associated with an active tier level of performance to a storage pool associated with a near line tier level of performance when a frequency of access of the slices falls below an active access threshold level. The detecting the change in required performance may be based on one or more of a vault utilization level, a number of slice accesses per unit of time (e.g., access frequency), a timestamp associated with a last slice access, a slice access quality of service goal, an estimated cost of moving slices, and an actual quality of service level. The detecting a change in required performance may include one or more of initiating a query, performing a performance test, monitoring historical performance information, detecting activity, and receiving a request.

Figure 40B:
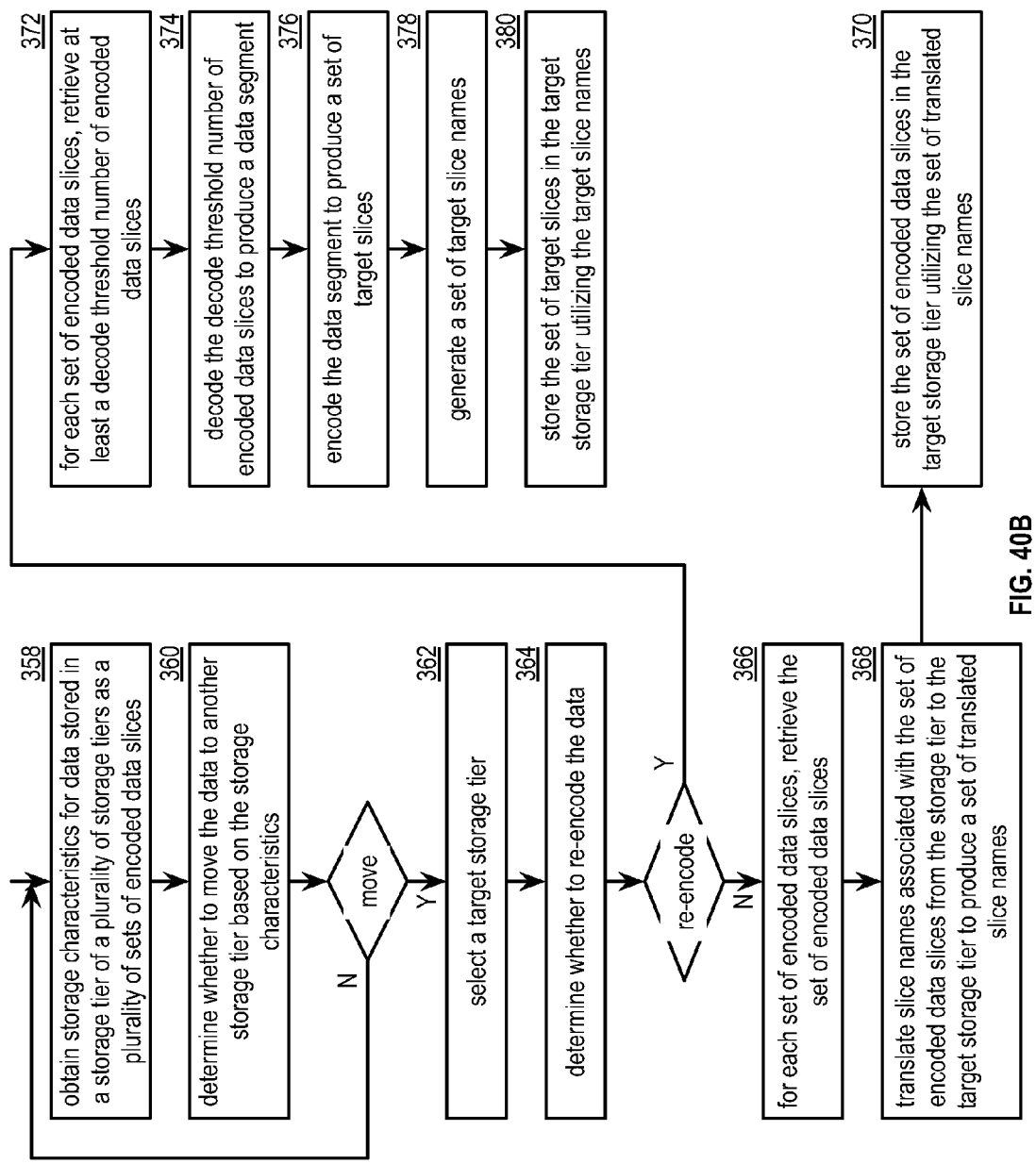
FIG. 40B is a flowchart illustrating an example of migrating slices in accordance with the present invention.

FIG. 40B is a flowchart illustrating an example of migrating slices. The method begins at step 358 where a processing module (e.g., of a distributed storage and task (DST) client module) obtains storage characteristics for data stored in a storage tier of a plurality of storage tiers as a plurality of sets of encoded slices (e.g., slices and/or error coded slices). The storage characteristics includes one or more of a present storage tier level utilized to store the data, a delivered performance level associated with the present storage tier, and a required performance level associated with the data. The obtaining includes one or more of a lookup, a query, a test, and detecting a change in the required performance level. The method continues at step 360 where the processing module determines whether to move the data to another storage tier based on the storage characteristics. The determining includes indicating to move the data when the delivered performance level associated with the present storage tier compares unfavorably to the required performance level associated with the data. The method loops back to step 358 when the processing module determines to not move the data. The method continues to step 362 when the processing module determines to move the data.

The method continues at step 362 where the processing module selects a target storage tier. The selecting includes identifying a storage tier with an associated delivered performance level that more favorably matches the required performance level associated with the data. For example, the processing module identifies an active storage tier when the required performance level associated with the data better matches the active storage tier performance than the storage tier (e.g. previous storage tier). For instance, a change in required performance level is detected when a higher access frequency is detected for the data.

The method continues at step 364 where the processing module determines whether to re-encode the data. The determining may be based on one or more of a storage capacity level of the target storage tier, a utilization level of the target storage tier, and a storage reliability requirement. For example, the processing module determines to re-encode the data when an above-average storage reliability requirement is detected. The method branches to step 372 when the processing module determines to re-encode the data. The method continues to step 366 when the processing module determines not to re-encode the data.

The method continues at step 366, where, for each set of encoded data slices, the processing module retrieves a set of encoded data slices (e.g., generate and send a set of read slice requests to the storage tier). The method continues at step 368 where the processing module translates slice names associated with the set of encoded data slices from the storage tier to the target storage tier to produce a set of translated slice names. The translating may be based on one or more of dispersed storage error coding function parameters of the storage tier and dispersed storage error coding function parameters of the target storage tier. For example, the processing module changes a vault identifier (ID) to align the set of translated slice names with the target storage tier. The method continues at step 370 where the processing module stores the set of encoded data slices in the target storage tier utilizing the set of translated slice names. The storing includes generating a set of write requests that includes the set of translated slice names and the set of encoded data slices and outputting the set of write requests to the target storage tier.

When the processing module determines to re-encode the data, the method continues at step 372, where, for each set of encoded data slices, the processing module retrieves at least a decode threshold number of encoded data slices when the processing module determines to re-encode the data. The retrieving includes generating a set of read slice requests, outputting the set of read slice requests to the storage tier, and receiving the at least the decode threshold number of encoded data slices. The method continues at step 374 where the processing module decodes the decode threshold number of encoded data slices to produce a data segment utilizing a first set of dispersed storage error coding function parameters associated with the storage tier.

The method continues at step 376 where the processing module encodes the data segment to produce a set of target slices utilizing a second set of dispersed storage error coding function parameters associated with the target storage tier. The method continues at step 378 where the processing module generates a set of target slice names in accordance with the second set of dispersed storage error coding function parameters. The generating includes utilizing a vault ID associated with the target storage tier and a slice index associated with a pillar width value of the vault. The method continues at step 380 where the processing module stores the set of target slices in the target storage tier utilizing the target slice names. The storing includes generating a set of write requests that includes the set of target slice names and a set of target slices and outputting the set of write requests to the target storage tier.

Figure 41A:
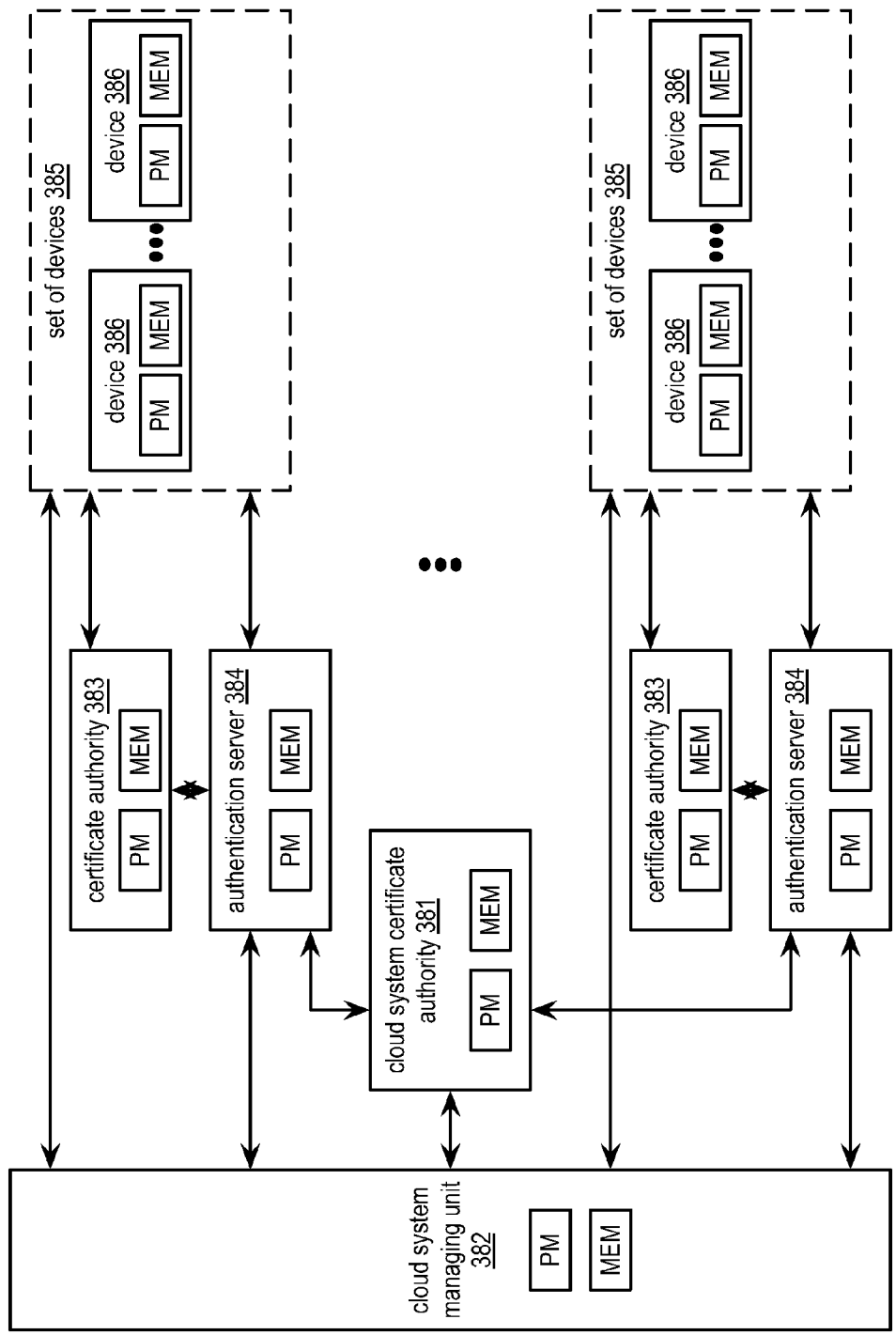
FIG. 41A is a schematic block diagram of an embodiment of a cloud computing system in accordance with the present invention.

FIG. 41A is a schematic block diagram of an embodiment of a cloud computing system that includes a cloud system managing unit 382, a cloud system certificate authority 381, a plurality of certificate authorities 383, a plurality of authentication servers 384, and a plurality of sets of devices 385. The cloud system managing unit 382 includes a processing module (PM) and a memory (MEM). The memory may include one or more memory sections as is discussed in greater detail with reference to FIG. 41D. The memory may include one or more of read-only memory and random access memory. The memory may be implemented utilizing one or more memory devices. Each memory device of the one or more memory devices may be implemented utilizing one or more of solid-state memory, optical disc memory, and a magnetic disk memory. The cloud system managing unit 382 may be implemented utilizing at least one of a server, a computer, a distributed storage (DS) managing unit, a distributed storage and task network (DSTN) managing unit, a DS processing unit, a distributed storage and task (DST) processing unit, a DS integrity processing unit, and a DST integrity processing unit.

The cloud system certificate authority 381 includes the PM and the MEM. The cloud system certificate authority 381 may be implemented utilizing at least one of a server, a computer, a DS managing unit, a DSTN managing unit, a DS processing unit, a DST processing unit, a DS integrity processing unit, a DST integrity processing unit, and a certificate authority 383. Each certificate authority 383 of the plurality of certificate authorities 383 includes the PM and the MEM. Each certificate authority 383 may be implemented utilizing at least one of a server, a computer, a DS managing unit, a DSTN managing unit, a DS processing unit, a DST processing unit, a DS integrity processing unit, a DST integrity processing unit, and the certificate authority 383. Each authentication server 384 of the plurality of authentication servers 384 includes the PM and the MEM. Each authentication server 384 may be implemented utilizing at least one of a server, a computer, a DS managing unit, a DSTN managing unit, a DS processing unit, a DST processing unit, a DS integrity processing unit, a DST integrity processing unit, and the cloud system certificate authority 381. Each set of devices 385 of the plurality of sets of devices 385 includes a plurality of devices 386. Each device 386 of the plurality of devices 386 includes the PM and the MEM. Each device 386 may be implemented utilizing at least one of a storage unit, a storage server, a memory unit, a user device, a computer, a DS unit, and a DST execution unit.

The cloud computing system functions to establish trust and configure the cloud computing system based on established trust. In particular, the cloud computing system functions to establish trust between the plurality of authentication servers 384 and the plurality of sets of devices 385, establish trust between the plurality of authentication servers 384 and the cloud system managing unit 382, establish trust between the cloud system managing unit 382 and the plurality of sets of devices 385, and configures the cloud computing system based on established trust between the cloud system managing unit 382 and the plurality of sets of devices 385.

A set of devices 385 of the plurality of sets of devices 385 includes one or more devices 386 having a common aspect. The common aspect includes at least one of a vendor identifier, a device type identifier, a version identifier, a functionality identifier, and an assigned identifier (e.g., a predetermined, random, assigned to one of the certificate authorities 383, common manufacturing timeframe). For example, the one or more devices 386 were manufactured by a common vendor. An authentication server 384 of the plurality of authentication servers 384 is associated with one of the plurality of sets of devices 385 based on the common aspect. For example, the authentication server 384 is associated with the common vendor. Each authentication server 384 of the plurality of authentication servers 384 has a unique device level server trusted certificate and a unique system level server trusted certificate (e.g., stored in MEM of the authentication server 384).

One certificate authority 383 of the plurality of certificate authorities 383 is affiliated with a corresponding one of the plurality of authentication servers 384 based on the common aspect. For example, the one certificate authority 383 is associated with the common vendor. The one certificate authority 383 of the plurality of certificate authorities 383 generates the unique device level server trusted certificate for the corresponding one of the plurality of authentication servers 384. The cloud system certificate authority 381 generates a system level manager trusted certificate for the cloud system managing unit 382 and generates the unique system level server trusted certificates for each of the plurality of authentication servers 384. The cloud system managing unit 382 has the system level manager trusted certificate (e.g., stores the system level manager trusted certificate in MEM of the cloud system managing unit 382).

Each of the plurality of authentication servers 384 and the one or more devices 386 of each of the plurality of sets of devices 385 establishes trust based on the common aspect and the unique device level server trusted certificate of the each of the plurality of authentication servers 384. The cloud system managing unit 382 and the one or more devices 386 of each of the plurality of sets of devices 385 establish trust based on the trust between each of the plurality of authentication servers 384 and the one or more devices 386 of each of the plurality of sets of devices 385 and the trust between each of the plurality of authentication servers 384 and the cloud system managing unit 382.

The cloud computing system functions to establish the trust by a series of trust establishing steps. In a first trust establishing step, a corresponding one of the plurality of authentication servers 384 and the one or more devices 386 of the one of the plurality of sets of devices 385 establishes trust with each other based on the unique device level server trusted certificate of the corresponding one of the plurality of authentication servers 384. The corresponding one of the plurality of authentication servers 384 and the one or more devices 386 of the one of the plurality of sets of devices 385 establishing trust includes a series of server-device trust steps. A first server-device trust step includes sending, by a device 386 of the one or more devices 386, an authentication request to the corresponding one of the plurality of authentication servers 384, where the device 386 is programmed with the unique device level server trusted certificate of the corresponding one of the plurality of authentication servers 384 and where the authentication request references the unique device level server trusted certificate (e.g., the device 386 that previously received the unique device level server trusted certificate). The authentication request includes at least one of a request that the one of the plurality of authentication servers 384 sign something (e.g., utilizing a private key associated with a public-private key pair where the unique device level server trusted certificate includes a public key of the public-private key pair) and that the one of the plurality of authentication servers 384 decrypt something using the private key. The sending includes outputting the authentication request to the one of the plurality of authentication servers 384 using an Internet protocol (IP) address of the one of the plurality of authentication servers 384 (e.g., extracted from the unique device level server trusted certificate).

A second server-device trust step includes generating, by the corresponding one of the plurality of authentication servers 384, an authentication response based on the authentication request (e.g., using the private key to sign the something or decrypt the something). When the authentication response is verified, a third server-device trust step includes sending, by the device 386, device configuration information to the corresponding one of the plurality of authentication servers 384. The device 386 verifies the authentication response by at least one of verifying a signature of a received signed something using the public key and verifying a received encrypted something using the public key. For example, the device 386 indicates the authentication response is verified when a decrypted received signed something using the public key matches a corresponding previously sent something. As another example, the device 386 indicates the authentication response is verified when a decrypted received encrypted something using the public key matches a corresponding previously sent something. The device configuration information includes one or more of hardware configuration information of the device 386, a universally unique identifier (UUID) of the device 386, a device type indicator of the device 386 (e.g., DS unit), a public key associated with the device 386, and a digest of the public key associated with the device 386. The sending by the device 386 includes outputting the device configuration information to the corresponding one of the plurality of authentication servers 384 using the IP address of the one of the plurality of authentication servers 384. The one of the plurality of authentication servers 384 may forward the device configuration information to the cloud system managing unit 382.

A fourth server-device trust step includes receiving, by the device 386, manager information regarding the cloud system managing unit 382 (e.g., from the cloud system managing unit 382 via the one of the plurality of authentication servers 384). The manager information includes one or more of an IP address of the cloud system managing unit 382, the system level manager trusted certificate, IP address assignment for the device 386, and an IP address for each device 386 of a corresponding set of devices 385.

In a second trust establishing step, the corresponding one of the plurality of authentication servers 384 and the cloud system managing unit 382 establishes trust with each other based on at least one of the unique system level server trusted certificate and the system level manager trusted certificate. For example, each of the cloud system managing unit 382 and the one of the plurality of authentication servers 384 verifies that unique system level server trusted certificate and the system level manager trusted certificate have been signed by the cloud system certificate authority 381.

In a third trust establishing step, the cloud system managing unit 382 and the one or more devices 386 of one of the plurality of sets of devices 385 establish trust with each other based on the trust between the corresponding one of the plurality of authentication servers 384 and the one or more devices 386 of the one of the plurality of sets of devices 385 and the trust between the corresponding one of the plurality of authentication servers 384 and the cloud system managing unit 382. The cloud system managing unit 382 and the one or more devices 386 of one of the plurality of sets of devices 385 establishing trust includes a series of manager-device trust steps. A first manager-device trust step includes sending, by a device 386 of the one or more devices 386, a manager authentication request (e.g., sign something, and/or decrypt something to make sure that the cloud system managing unit 382 has a private key corresponding to the cloud system managing unit 382) to the cloud system managing unit 382 based on manager information where the manager authentication request references the system level manager trusted certificate (e.g., using a previously received public key associated with the cloud system managing unit 382, using a previously received IP address associated with the cloud system managing unit 382).

A second manager-device trust step includes generating, by the cloud system managing unit 382, a manager authentication response based on the manager authentication request (e.g., signing the something, and/or decrypting the something using the private key associated with the cloud system managing unit 382). The generating further includes outputting the manager authentication response to the device 386. The device 386 indicates that the manager authentication response is verified when at least one of a received signed something is verified using the public key of the cloud system managing unit 382 and a received encrypted something is verified using the public key of the cloud system managing unit 382.

A third manager-device trust step includes sending, by the device 386, a certificate signing request to the cloud system managing unit 382. The sending includes generating and outputting the certificate signing request when the manager authentication response is verified. The generating of the certificate signing request includes generating a body of the certificate signing request to include one or more of a device identifier of the device 386, the UUID of the device 386, the device type indicator of the device 386 (e.g., DS unit), the public key associated with the device 386, and the digest of the public key associated with the device 386. The generating of the certificate signing request further includes generating a signature over the body of the certificate signing request using a private key of the device 386, and outputting the body of the certificate signing request and the signature over the body of the signature signing request to the cloud system managing unit 382 using the IP address of the cloud system managing unit 382. A fourth manager-device trust step includes sending, by the cloud system managing unit 382, a signed certificate to the device 386 in response to the certificate signing request. The sending includes generating the signed certificate by signing at least a portion of the certificate signing request using the private key associated with the cloud system managing unit 382 when the certificate signing request is verified. The verifying the certificate signing request includes indicating that the certificate signing request is verified when a received UUID of the certificate signing request matches a previously received UUID from the one of the plurality of authentication servers 384.

The cloud system managing unit 382 configures the cloud computing system based on the trust between the cloud system managing unit 382 and devices 386 of the plurality of sets of devices 385. The configuring includes facilitating subsequent device 386 operation. The facilitating includes the device 386 accessing another entity of the cloud computing system using the signed certificate from the cloud system managing unit 382 and the other entity verifying the signed certificate prior to providing a response to the accessing.

Figure 41B:
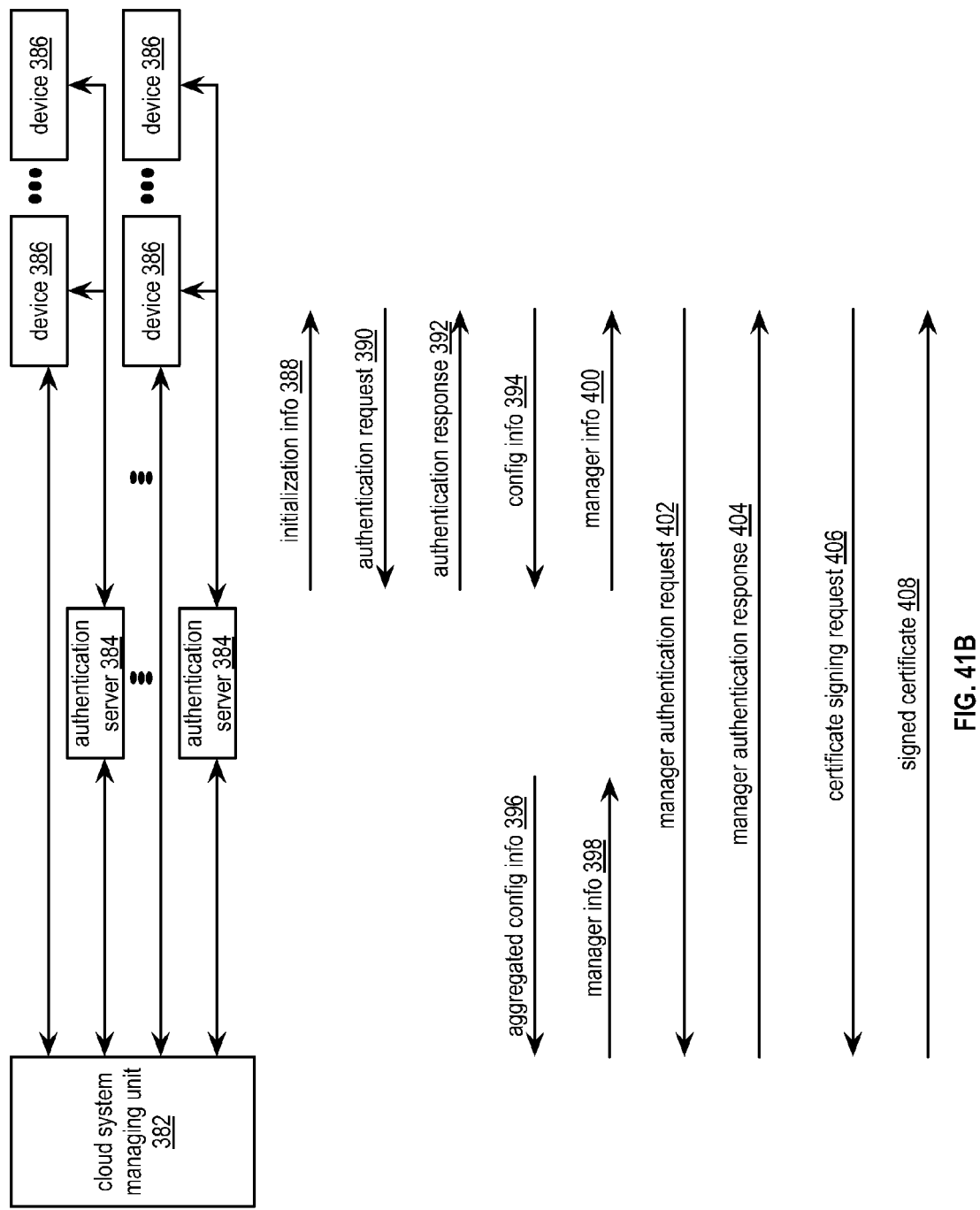
FIG. 41B is a schematic block diagram of authentication system timing in accordance with the present invention.

FIG. 41B is a schematic block diagram of authentication system timing that includes a cloud system managing unit 382, a plurality of authentication servers 384, and a plurality of sets of devices 386. Each authentication server 384 is operable to facilitate initialization and authorization of one or more devices 386 of the set of corresponding devices 386 with regards to subsequent utilization of the one or more devices 386 within a cloud computing system. The initialization and authorization includes a sequence of transactions between one or more of the cloud system managing unit 382, each authentication server 384 of the plurality of authentication servers 384, and the plurality of sets of devices 386.

In an example of operation, an authentication server 384 of the plurality of sets of authentication servers 384 issues initialization information 388 to one or more devices 386 of a corresponding set of devices 386 of the plurality of sets of devices 386. Alternatively, the initialization information 388 may be hardcoded into the one or more devices 386 at a time of initial configuration during manufacture. The initialization information 388 includes one or more of the authentication server 384 internet protocol (IP) address and a vendor certificate authority signed certificate (e.g., a unique device level server trusted certificate) when the authentication server 384 and the one or more devices 386 are associated with a common vendor (e.g., associated by a common aspect). A device 386 of the one or more devices 386 receives initialization information 388, generates an authentication request 390, and outputs the authentication request 390 to the authentication server 384 (e.g. a common vendor server). The authentication request 390 includes at least one of a request for the authentication server 384 to sign information to be signed and a request for the authentication server 384 to decrypt information to be decrypted (e.g., to verify that the vendor server has a proper vendor certificate authority signed certificate).

The authentication server 384 receives the authentication request 390, generates an authentication response 392 based on the authentication request 390, and outputs the authentication response 392 to the device 386. The authentication response 392 includes at least one of a signature for the information to be signed and a decryption of the information to be decrypted. The device 386 receives the authentication response 392 and validates the authentication response 392 to verify that authentication server 384 has the vendor certificate authority signed certificate. The device 386 generates configuration information 394 and outputs the configuration information 394 to the authentication server 384 when the authentication response 392 is validated. The configuration information 394 includes one or more of hardware configuration information of the device 386, a universally unique identifier (UUID) of the device 386, a device type indicator of the device 386, a device 386 public-key of a public-private key pair, and a public-key hash digest of the device 386 public-key. The authentication server 384 receives the configuration information 394 from the device 386 and other configuration information 394 from other devices 386. The authentication server 384 aggregates configuration information 394 from devices 386 to produce aggregated configuration information 396. The authentication server 384 outputs the aggregated configuration information 396 to the cloud system managing unit 382. Such outputting may provide a system configuration enhancement as UUIDs of the plurality of sets of devices 386 do not have to be entered manually into the cloud system managing unit 382.

The cloud system managing unit 382 receives the aggregated configuration information 396 and establishes a list of the plurality of sets of devices 386 and associated configuration information 394 of each device 386. The cloud system managing unit 382 generates manager information 398 and outputs the manager information 398 to the authentication server 384. The manager information 398 includes one or more of a manager IP address (e.g., of the cloud system managing unit 382), a manager signed certificate, and an IP address assignment of the device 386. Alternatively, the manager information 398 includes IP addresses for each device 386 of a set of devices 386. The authentication server 384 receives the manager information 398 and to outputs the manager information 398 to the device 386 as manager information 400. Alternatively, the authentication server 384 outputs manager information 398 associated with each device 386 of the set of devices as the manager information 400 to each device 386 of the set of devices 386 when each device 386 of the set of devices 386 has successfully authenticated with the authentication server 384 and provided corresponding configuration information 394.

The device 386 generates a manager authentication request 402 and sends the manager authentication request 402 to the cloud system managing unit 382. The sending includes outputting the manager authentication request 402 directly to the cloud system managing unit 382 and sending the manager authentication request 402 to the cloud system managing unit 382 via the authentication server 384. The manager authentication request 402 includes at least one of a request for the cloud system managing unit 382 to sign information to be signed and a request for the cloud system managing unit 382 to decrypt information to be decrypted (e.g., to verify that the cloud system managing unit 382 has a proper manager signed certificate). The cloud system managing unit 382 receives the manager authentication request 402, generates a manager authentication response 404, and outputs the manager authentication response 404 to the device 386. The manager authentication response 404 includes at least one of a signature for the information to be signed and a decryption of the information to be decrypted. The device 386 receives the manager authentication response 404 and validates the manager authentication response 404 to verify that cloud system managing unit 382 has the manager signed certificate.

When the device 386 has validated the manager authentication response 404, the device 386 generates a certificate signing request 406 and outputs the certificate signing request 406 to the cloud system managing unit 382. The certificate signing request 406 includes one or more of a device identifier of device 386 (e.g., the UUID), the device 386 public key, the hash of the public key of the device 386, a signature over the certificate signing request 406, where the signature is generated utilizing the private key of the device 386. The cloud system managing unit 382 receives the certificate signing request 406, validates the certificate signing request 406, generates a signed certificate 408 when the certificate signing request 406 is validated, and outputs the signed certificate 408 to the device 386. The validating includes one or more of verifying that the UUID of the device 386 compares favorably to the aggregated configuration information 396 (e.g., the UUID is included in the aggregated configuration information 396), verifying that the received public-key hash digest is substantially the same as a public-key hash digest of the aggregated configuration information 396, and a signature of the certificate signing request 406 is valid. The generating of the signed certificate 408 includes at least one of signing the certificate signing request 406 utilizing a private key of the cloud system managing unit 382 and appending a root certificate authority signed certificate to the signed certificate. The device 386 receives the signed certificate 408 and utilizes the signed certificate 408 with regards to subsequent access scenarios with the cloud computing system (e.g., accessing other entities of the cloud computing system).

Figure 41C:
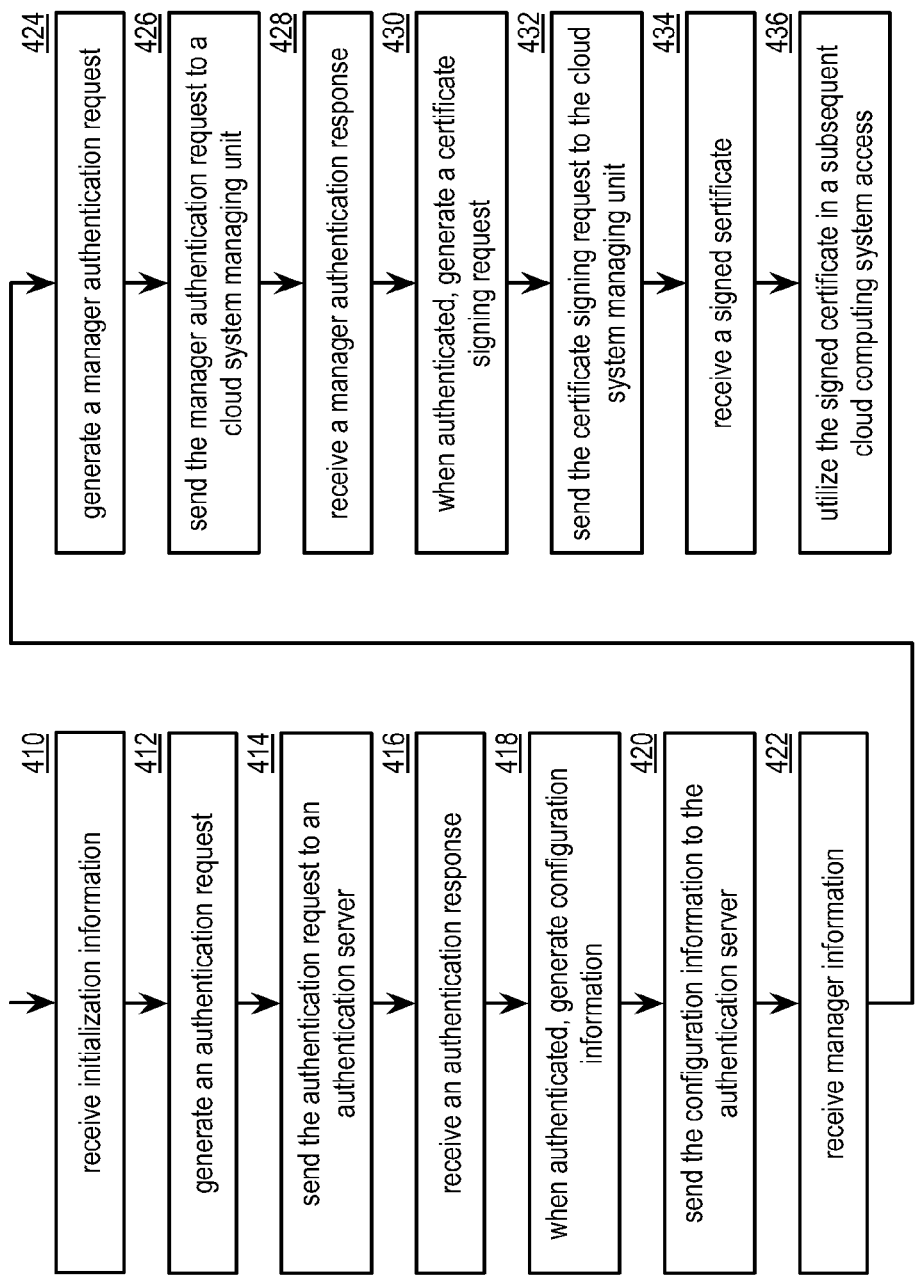
FIG. 41C is a flowchart illustrating an example of authenticating a device in accordance with the present invention.

FIG. 41C is a flowchart illustrating an example of authenticating a device. The method begins at step 410 where a processing module (e.g., of a device) receives initialization information. The method continues at step 412 where the processing module generates an authentication request. The method continues at step 414 where the processing module sends the authentication request to an authentication server. The method continues at step 416 where the processing module receives an authentication response from the authentication server. When the authentication response from the authentication server is authenticated, the method continues at step 418 where the processing module generates configuration information. The method continues at step 420 where the processing module sends the configuration information to the authentication server.

The method continues at step 422 where the processing module receives manager information. The method continues at step 424 where the processing module generates a manager authentication request based on the manager information. The method continues at step 426 where the processing module sends the manager authentication request to a cloud system managing unit. The method continues at step 428 where the processing module receives a manager authentication response. When the manager authentication response is authenticated, the method continues at step 430 where the processing module generates a certificate signing request. The method continues at step 432 where the processing module sends the certificate signing request to the cloud system managing unit. The method continues at step 434 where the processing module receives a signed certificate. The method continues at step 436 where the processing module utilizes the signed certificate in a subsequent cloud computing system access.

Figure 41D:
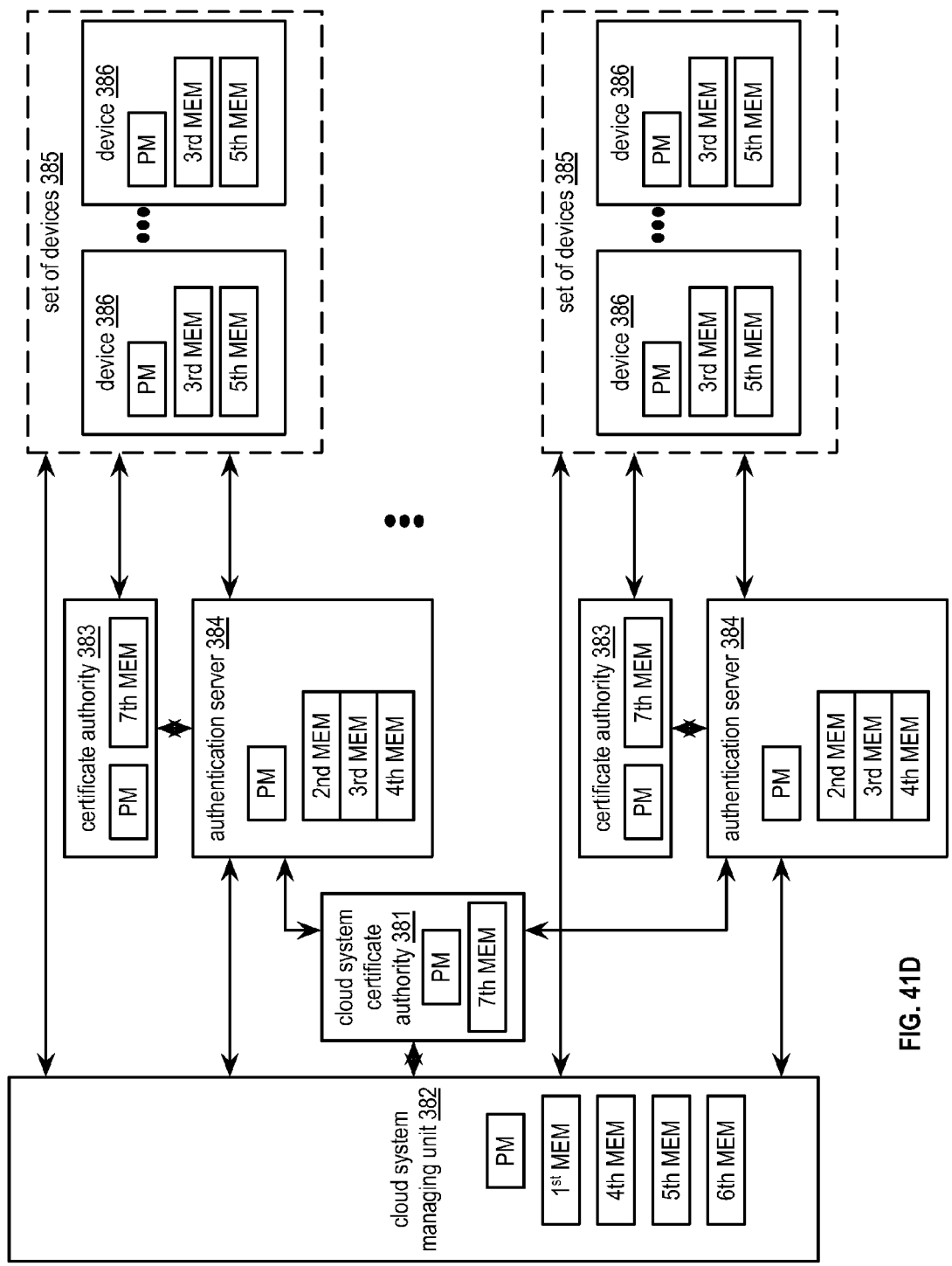
FIG. 41D is a schematic block diagram of another embodiment of a cloud computing system in accordance with the present invention.

FIG. 41D is a schematic block diagram of another embodiment of a cloud computing system that includes a cloud system managing unit 382, a cloud system certificate authority 381, a plurality of certificate authorities 383, a plurality of authentication servers 384, and a plurality of sets of devices 385. The cloud system managing unit 382 includes a processing module (PM) and one or more memory sections. The one or more memory sections of the cloud system managing unit 382 includes a first memory section (1st MEM), a fourth memory section (4th MEM), a fifth memory section (5th MEM), and a sixth memory section (6th MEM). Each memory section may include one or more of read-only memory and random access memory. The memory section may be implemented utilizing one or more memory devices. Each memory device of the one or more memory devices may be implemented utilizing one or more of solid-state memory, optical disc memory, and a magnetic disk memory. The cloud system managing unit 382 may be implemented utilizing at least one of a server, a computer, a distributed storage (DS) managing unit, a distributed storage and task network (DSTN) managing unit, a DS processing unit, a distributed storage and task (DST) processing unit, a DS integrity processing unit, and a DST integrity processing unit.

The cloud system certificate authority 381 includes the PM and a seventh memory section (7th MEM). The cloud system certificate authority 381 may be implemented utilizing at least one of a server, a computer, a DS managing unit, a DSTN managing unit, a DS processing unit, a DST processing unit, a DS integrity processing unit, a DST integrity processing unit, and a certificate authority 383. Each certificate authority 383 of the plurality of certificate authorities 383 includes the PM and a seventh memory section (7th MEM). Each certificate authority 383 may be implemented utilizing at least one of a server, a computer, a DS managing unit, a DSTN managing unit, a DS processing unit, a DST processing unit, a DS integrity processing unit, a DST integrity processing unit, and the certificate authority 383. Each authentication server 384 of the plurality of authentication servers 384 includes the PM, a second memory section (2nd MEM), a third memory section (3rd MEM), and the fourth memory section (4th MEM). Each authentication server 384 may be implemented utilizing at least one of a server, a computer, a DS managing unit, a DSTN managing unit, a DS processing unit, a DST processing unit, a DS integrity processing unit, a DST integrity processing unit, and the cloud system certificate authority 381. Each set of devices 385 of the plurality of sets of devices 385 includes a plurality of devices 386. Each device 386 of the plurality of devices 386 includes the PM, the third memory section (3rd MEM), and the fifth memory section (5th MEM). Each device 386 may be implemented utilizing at least one of a storage unit, a storage server, a memory unit, a user device, a computer, a DS unit, and a DST execution unit.

The cloud computing system functions to establish trust and configure the cloud computing system based on established trust. In particular, the cloud computing system functions to establish trust between the plurality of authentication servers 384 and the plurality of sets of devices 385, establish trust between the plurality of authentication servers 384 and the cloud system managing unit 382, establish trust between the cloud system managing unit 382 and the plurality of sets of devices 385, and configures the cloud computing system based on established trust between the cloud system managing unit 382 and the plurality of sets of devices 385.

A set of devices 385 of the plurality of sets of devices 385 includes one or more devices 386 having a common aspect. The common aspect includes at least one of a vendor identifier, a device type identifier, a version identifier, a functionality identifier, and an assigned identifier (e.g., a predetermined, random, assigned to one of the certificate authorities 383, common manufacturing timeframe). For example, the one or more devices 386 were manufactured together in a common manufacturing timeframe. An authentication server 384 of the plurality of authentication servers 384 is associated with one of the plurality of sets of devices 385 based on the common aspect. For example, the authentication server 384 is associated with the common manufacturing timeframe.

One certificate authority 383 of the plurality of certificate authorities 383 is affiliated with a corresponding one of the plurality of authentication servers 384 based on the common aspect. For example, the one certificate authority 383 is associated with the common manufacturing timeframe. The one certificate authority 383 of the plurality of certificate authorities 383 generates a unique device level server trusted certificate for the corresponding one of the plurality of authentication servers 384. The cloud system certificate authority 381 generates a system level manager trusted certificate for the cloud system managing unit 382 and generates a unique system level server trusted certificate for each of the plurality of authentication servers 384.

In particular, cloud system certificate authority 381 and the plurality of certificate authorities 383 includes a plurality of seventh memory sections. A seventh memory section of the plurality of seventh memory sections stores operational instructions that, when executed by the one or more processing modules (e.g. of the cloud system certificate authority 381, of a certificate authority 383), causes the one or more processing modules to generate the unique device level server trusted certificate for the corresponding one of the plurality of authentication servers 384 based on the common aspect. Alternatively, or in addition to, the seventh memory section stores operational instructions that, when executed by the one or more processing modules, causes the one or more processing modules to generate the system level manager trusted certificate for the cloud system managing unit 382 and generate the unique system level server trusted certificates for each of the plurality of authentication servers 384.

The first memory section stores the system level manager trusted certificate for the cloud system managing unit 382. The plurality of authentication servers 384 includes a plurality of second memory sections. A second memory section of the plurality of second memory sections stores the unique device level server trusted certificate and the unique system level server trusted certificate for one of the plurality of authentication servers 384.

The plurality of authentication servers 384 and each device 386 of the plurality of sets of devices 385 includes a plurality of third memory sections. A third memory section of the plurality of third memory sections stores operational instructions that, when executed by one or more processing modules (e.g., of the plurality of authentication servers 384 and each device 386 of the plurality of sets of devices 385), causes the one or more processing modules to establish trust between a corresponding one of the plurality of authentication servers 384 and one or more devices 386 of one of a plurality of sets of devices 385 based on the unique device level server trusted certificate of the corresponding one of the plurality of authentication servers 384, where a set of devices 385 of the plurality of sets of devices 385 includes the one or more devices 386 having a common aspect.

The third memory section further stores operational instructions that, when executed by one or more processing modules, causes the one or more processing modules to perform a series of server-device authentication steps. In a first server-device authentication step, the processing module of a device 386 of the one or more devices 386 sends an authentication request to the corresponding one of the plurality of authentication servers 384, where the device 386 is programmed with the unique device level server trusted certificate of the corresponding one of the plurality of authentication servers and where the authentication request references the unique device level server trusted certificate. In a second server-device authentication step, the processing module of the corresponding one of the plurality of authentication servers 384 generates an authentication response based on the authentication request. In a third server-device authentication step, when the authentication response is verified by the processing module of the device 386, the processing module of the device 386 sends device configuration information to the corresponding one of the plurality of authentication servers 384. In a fourth server-device authentication step, the processing module of the device 386 receives manager information regarding the cloud system managing unit 382 (e.g., the one of the plurality of authentication servers 384 issues the manager information regarding the cloud system managing unit 382).

The cloud system managing unit 382 and the plurality of authentication servers 384 includes a plurality of fourth memory sections. A fourth memory section of the plurality of fourth memory sections stores operational instructions that, when executed by the one or more processing modules (e.g., of the cloud system managing unit 382 and the plurality of authentication servers 384), causes the one or more processing modules to establish trust between the corresponding one of the plurality of authentication servers 384 and the cloud system managing unit 382 based on at least one of the unique system level server trusted certificate and the system level manager trusted certificate.

The cloud system managing unit 382 and each device 386 of the plurality of sets of devices 385 includes a plurality of fifth memory sections. A fifth memory section of the plurality of fifth memory sections stores operational instructions that, when executed by the one or more processing modules (e.g., of the cloud system managing unit 382 and each device 386), causes the one or more processing modules to establish trust between the cloud system managing unit 382 and the one or more devices 386 of one of the plurality of sets of devices 385 based on the trust between the corresponding one of the plurality of authentication servers 384 and the one or more devices 386 of the one of the plurality of sets of devices 385 and the trust between the corresponding one of the plurality of authentication servers 384 and the cloud system managing unit 382.

The fifth memory section further stores operational instructions that, when executed by one or more processing modules, causes the one or more processing modules to perform a series of manager-device authentication steps. In a first manager-device authentication step, the processing module of the device 386 of the one or more devices 386 sends a manager authentication request to the cloud system managing unit 382 based on the manager information, where the manager authentication request references the system level manager trusted certificate. In a second manager-device authentication step, the processing module of the cloud system managing unit 382 generates a manager authentication response based on the manager authentication request. In a third manager-device authentication step, the processing module of the device 386 sends a certificate signing request to the cloud system managing unit 382. In a fourth manager-device authentication step, the processing module of the cloud system managing unit 382 sends a signed certificate to the device 386 in response to the certificate signing request. The cloud system managing unit 382 includes the sixth memory section which stores operational instructions that, when executed by one or more processing modules (e.g., of the cloud system managing unit 382), causes the one or more processing modules to configure a cloud computing system based on the trust between the cloud system managing unit 382 and devices 386 of the plurality of sets of devices 385.

Figure 41E:
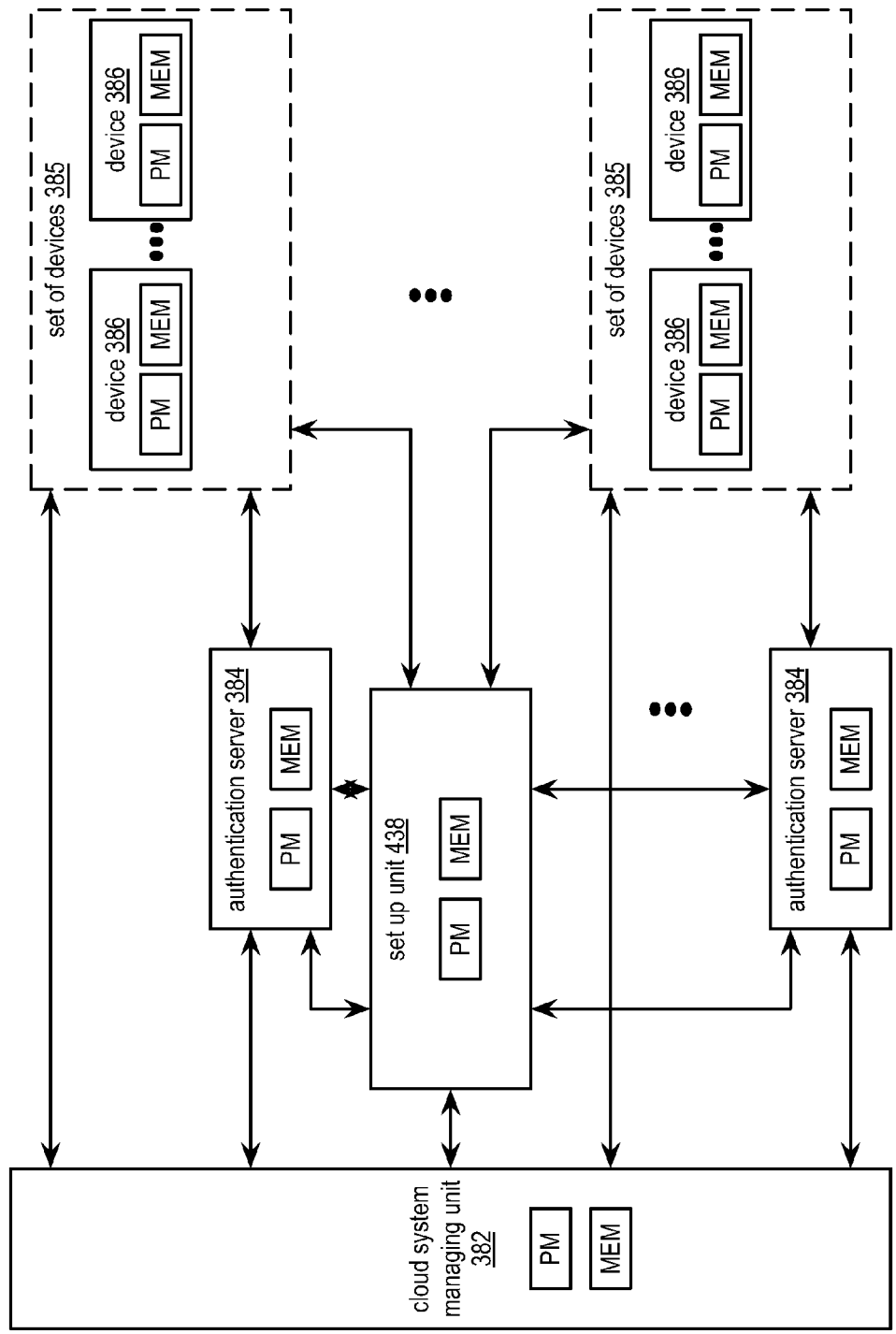
FIG. 41E is a schematic block diagram of another embodiment of a cloud computing system in accordance with the present invention.

FIG. 41E is a schematic block diagram of another embodiment of a cloud computing system that includes a cloud system managing unit 382, a set up unit 438, a plurality of authentication servers 384, and a plurality of sets of devices 385. The cloud system managing unit 382 includes a processing module (PM) and a memory (MEM). The memory may include one or more of read-only memory and random access memory. The memory may be implemented utilizing one or more memory devices. Each memory device of the one or more memory devices may be implemented utilizing one or more of solid-state memory, optical disc memory, and a magnetic disk memory. The cloud system managing unit 382 may be implemented utilizing at least one of a server, a computer, a distributed storage (DS) managing unit, a distributed storage and task network (DSTN) managing unit, a DS processing unit, a distributed storage and task (DST) processing unit, a DS integrity processing unit, and a DST integrity processing unit.

The set up unit 438 includes the PM and the MEM. The set up unit 438 may be implemented utilizing one or more of a cloud system certificate authority, a certificate authority, a server, a computer, a DS managing unit, a DSTN managing unit, a DS processing unit, a DST processing unit, a DS integrity processing unit, a DST integrity processing unit, the cloud system managing unit 382, one or more of the plurality of authentication servers 384, and one or more of the plurality of sets of devices 385. Each authentication server 384 of the plurality of authentication servers 384 includes the PM and the MEM. Each authentication server 384 may be implemented utilizing at least one of a server, a computer, a DS managing unit, a DSTN managing unit, a DS processing unit, a DST processing unit, a DS integrity processing unit, and a DST integrity processing unit. Each set of devices 385 of the plurality of sets of devices 385 includes a plurality of devices 386. Each device 386 of the plurality of devices 386 includes the PM and the MEM. Each device 386 may be implemented utilizing at least one of a storage unit, a storage server, a memory unit, a user device, a computer, a DS unit, and a DST execution unit.

The cloud computing system functions to establish trust and configure the cloud computing system based on established trust. In particular, the cloud computing system functions to establish trust between the plurality of authentication servers 384 and the plurality of sets of devices 385, establish trust between the plurality of authentication servers 384 and the cloud system managing unit 382, establish trust between the cloud system managing unit 382 and the plurality of sets of devices 385, and configures the cloud computing system based on established trust between the cloud system managing unit 382 and the plurality of sets of devices 385.

A set of devices 385 of the plurality of sets of devices 385 includes one or more devices 386 having a common aspect. The common aspect includes at least one of a vendor identifier, a device type identifier, a version identifier, a functionality identifier, and an assigned identifier (e.g., a predetermined, random, common manufacturing timeframe). An authentication server 384 of the plurality of authentication servers 384 is associated with one of the plurality of sets of devices 385 based on the common aspect.

Each authentication server 384 of the plurality of authentication servers 384 is associated with a unique device level server trusted certificate and is associated with a unique system level server trusted certificate. The cloud system managing unit 382 is associated with another system level manager trusted certificate. The memory of the set up unit 438 stores the system level manager trusted certificate of the cloud system managing unit 382, a unique device level server trusted certificate for each of a plurality of authentication servers 384, and a unique system level server trusted certificate for each of the plurality of authentication servers 384. The processing module of the set up unit 438 may generate one or more certificates. The generating may include generating the unique device level server trusted certificate for a corresponding one of the plurality of authentication servers 384 based on the common aspect, generating the system level manager trusted certificate for the cloud system managing unit 382, and generating the unique system level server trusted certificates for each of the plurality of authentication servers 384.

The processing module of the set up unit 438 establishes trust by performing a series of trust establishing steps. In a first trust establishing step, the processing module establishes trust between the corresponding one of the plurality of authentication servers 384 and one or more devices 386 of one of the plurality of sets of devices 385 based on the unique device level server trusted certificate of the corresponding one of the plurality of authentication servers 384, where a set of devices 385 of the plurality of sets of devices 385 includes one or more devices having a common aspect.

The processing module establishes trust between the corresponding one of the plurality of authentication servers 384 and one or more devices 386 of one of the plurality of sets of devices 385 by a series of server-device authentication steps. In a first server-device authentication step, the processing module causes a device 386 of the one or more devices 386 to send an authentication request to the corresponding one of the plurality of authentication servers 384, where the device 386 is programmed with the unique device level server trusted certificate of the corresponding one of the plurality of authentication servers 384 and where the authentication request references the unique device level server trusted certificate. In a second server-device authentication step, the processing module causes the corresponding one of the plurality of authentication servers 384 to generate an authentication response based on the authentication request. In a third server-device authentication step, the processing module causes, when the authentication response is verified, the device 386 to send device configuration information to the corresponding one of the plurality of authentication servers 384. In a fourth server-device authentication step, the processing module causes the device 386 to receive manager information regarding the cloud system managing unit 382 (e.g., includes causing the one of the plurality of authentication servers 384 to issue the manager information to the device 386).

In a second trust establishing step, the processing module establishes trust between the corresponding one of the plurality of authentication servers 384 and the cloud system managing unit 382 based on at least one of the unique system level server trusted certificate and the system level manager trusted certificate. For example, the processing module causes the corresponding one of the plurality of authentication servers 384 to verify trust with the cloud system managing unit 382. As another example, the processing module causes the cloud system managing unit 382 to verify trust with the corresponding one of the plurality of authentication servers 384.

In a third trust establishing step, the processing module establishes trust between the cloud system managing unit 382 and the one or more devices 386 of the one of the plurality of sets of devices 385 based on the trust between the corresponding one of the plurality of authentication servers 384 and the one or more devices 386 of the one of the plurality of sets of devices 385 and the trust between the corresponding one of the plurality of authentication servers 384 and the cloud system managing unit 382. The processing module establishes trust between the cloud system managing unit 382 and the one or more devices 386 of the one of the plurality of sets of devices 385 by a series of manager-device authentication steps. In a first manager-device authentication step, the processing module causes the device 386 of the one or more devices 386 to send a manager authentication request to the cloud system managing unit based on the manager information, where the manager authentication request references the system level manager trusted certificate. In a second manager-device authentication step, the processing module causes the cloud system managing unit 382 to generate a manager authentication response based on the manager authentication request (e.g., generating includes sending the manager authentication response to the device 386). In a third manager-device authentication step, the processing module causes the device 386 to send a certificate signing request to the cloud system managing unit 382. In a fourth manager-device authentication step, the processing module causes the cloud system managing unit 382 to send a signed certificate to the device in response to the certificate signing request. When the trust has been established, the processing module configures the cloud computing system based on the trust between the cloud system managing unit 382 and devices 386 of the plurality of sets of devices 385.

Figure 42B:
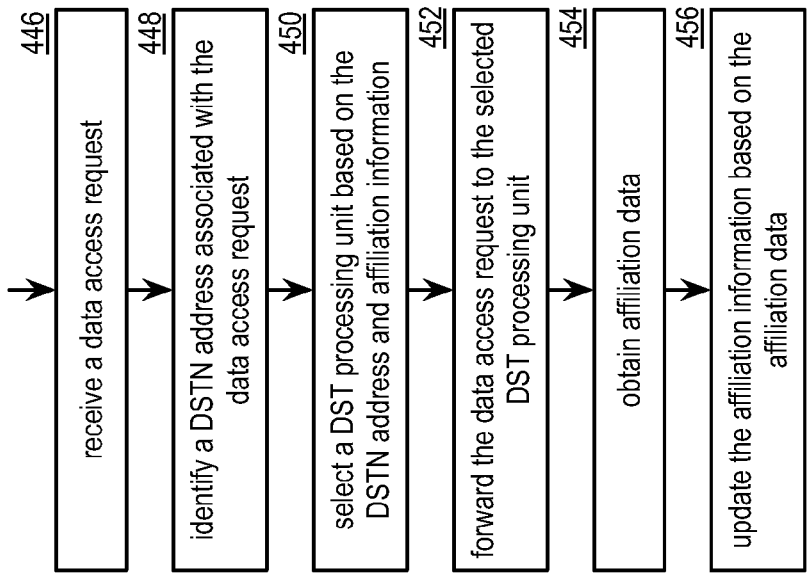
FIG. 42B is a flowchart illustrating an example of load-balancing in accordance with the present invention.
Figure 42A:
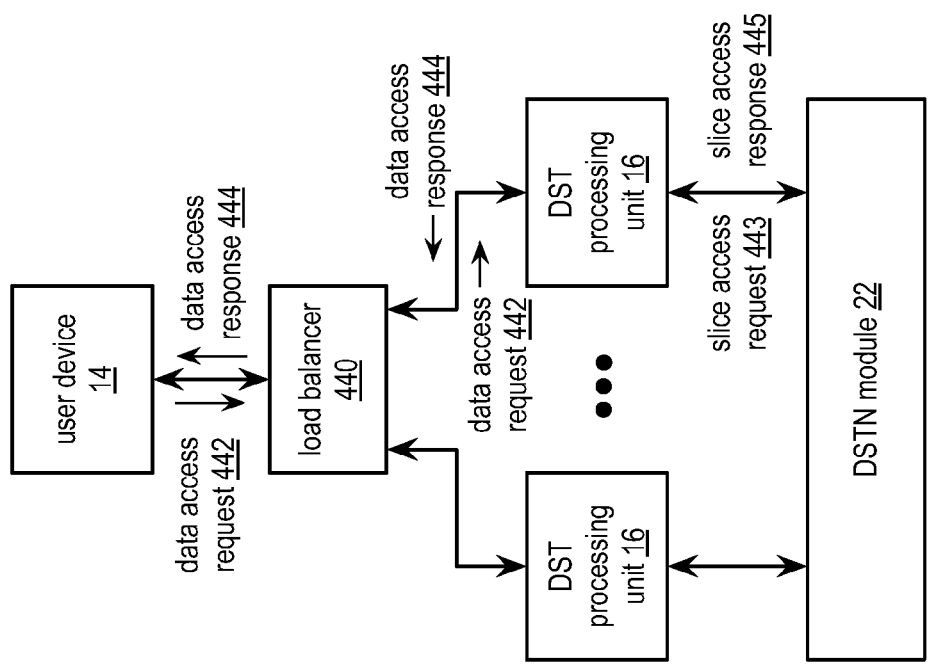
FIG. 42A is a schematic block diagram of another embodiment of a distributed computing system in accordance with the present invention.

FIG. 42A is a schematic block diagram of another embodiment of a distributed computing system that includes a user device 14, a load balancer 440, a plurality of distributed storage and task (DST) processing units 16, and a distributed storage and task network (DSTN) module 22. Alternatively, one or more dispersed storage (DS) processing units may substitute for one or more DST processing units 16. Further alternatively, a dispersed storage network (DSN) memory may substitute for the DSTN module 22. The user device 14 is operable to generate and send a data access request 442 to the load balancer 440 to facilitate accessing data stored as a plurality of sets of encoded data slices in the DSTN module 22. The data access request 442 includes at least one of a data identifier (ID), data, a requesting entity ID (e.g., associated with the user device 14), and a preferred DST processing unit ID. The load balancer 440 is operable to receive the data access request 442, identify a DST processing unit 16 of the plurality of DST processing units 16 based on the data access request 442, and forward the data access request 442 to the identified DST processing unit 16. The identifying includes identifying a DST processing unit identifier (ID) of the DST processing unit based on one or more of a requesting entity ID, a data ID, a DST processing unit performance indicator, a cached data indicator, and affiliation information. The affiliation information includes a list of associations between one or more of the requesting entity ID, the data ID, and the DST processing unit ID. For example, the list includes an association between a second DST processing unit and a data ID of 457.

The DST processing unit 16 is operable to receive the data access request 442 and process the request. The processing the request includes generating a data access response 444 when data affiliated with the data access request 442 is available in a cache memory of the DST processing unit 16. The processing the request further includes generating a plurality of sets of slice access requests 443 and sending the plurality of sets of slice access requests 443 to the DSTN module 22 when the data affiliated with the data access request 442 is not available in the cache memory of the DST processing unit 16. The DSTN module 22 is operable to receive the plurality of sets of slice access requests 443, access the plurality of sets of encoded data slices based on the plurality of sets of slice access requests 443, generate one or more slice access responses 445, and output the one or more slice access responses 445 to the DST processing unit 16. The DST processing unit 16 is further operable to receive the one or more slice access responses 445, further process the one or more slice access responses 445 to generate at least one of a response indicator and data, generate a data access response 444 that includes at least one of the response indicator and the data, and to send the data access response 444 to the user device 14. The sending of the data access response 444 includes outputting the data access response 444 directly to the user device 14 and sending the data access response 444 to the user device 14 via the load balancer 440.

The DST processing unit 16 is further operable to modify the affiliation information based on one or more of a DST processing unit performance level, a request, and a predetermination. For example, the DST processing unit modifies the affiliation information to disassociate an unfavorably performing DST processing unit from a affiliation (e.g., to a data ID) and to associate a more favorably performing DST processing unit in the affiliation. The DST processing unit 16 is further operable to update the cached data indicator based on a status of cached data within the DST processing unit 16. The updating includes indicating that data is included when data is stored in the cache memory of the DST processing unit 16 and indicating that data is excluded when the data is deleted from the cache memory. The indicating includes generating and sending the cached data indicator to at least one of the load balancer and at least one other DST processing unit 16.

FIG. 42B is a flowchart illustrating an example of load-balancing. The method begins at step 446 where a processing module (e.g., of a distributed storage and task (DST) client module of a load balancer) receives a data access request. The method continues at step 448 where the processing module identifies a distributed storage and task network (DSTN) address associated with the data access request. The identifying includes at least one of accessing a DSTN directory, accessing a DSTN index, and generating the DSTN address based on the data ID. The DSTN address includes at least one of a source name and a plurality of sets of slice names. The processing module may generate a null address when the data access request is to store new data.

The method continues at step 450 where the processing module selects a DST processing unit based on the DSTN address and affiliation information. The selecting includes at least one of identifying a DST processing unit affiliated with the DSTN address when a DSTN address is not null and assigning a DST processing unit when the DSTN address is null. For example, the processing module assigns a DST processing unit 16 based on a requesting entity ID when the DSTN address is null. As another example, the processing module selects DST processing unit 16 when affiliation information indicates that DST processing unit 16 is affiliated with a data address of the request.

The method continues at step 452 where the processing module forwards the data access request to the selected DST processing unit. The method continues at step 454 where the processing module obtains affiliation information. The obtaining includes at least one of generating the affiliation data based on a pattern of requests and retrieving the fleet should data from one or more DST system units. For example, the processing module generates the affiliation data to affiliate DST processing unit 16 with data ID of 457 when a previous access request to data of data ID of 457 has favorably utilized a DST processing unit 16. The method continues at step 456 where the processing module updates the affiliation information based on the affiliation data. The updating includes at least one of adding new affiliations for new data stored in cache memory for current requesting entities or current data stored in cache memory for new requesting entities and deleting old affiliations when data is deleted from a cache memory of a DST processing unit.

Figure 43A:
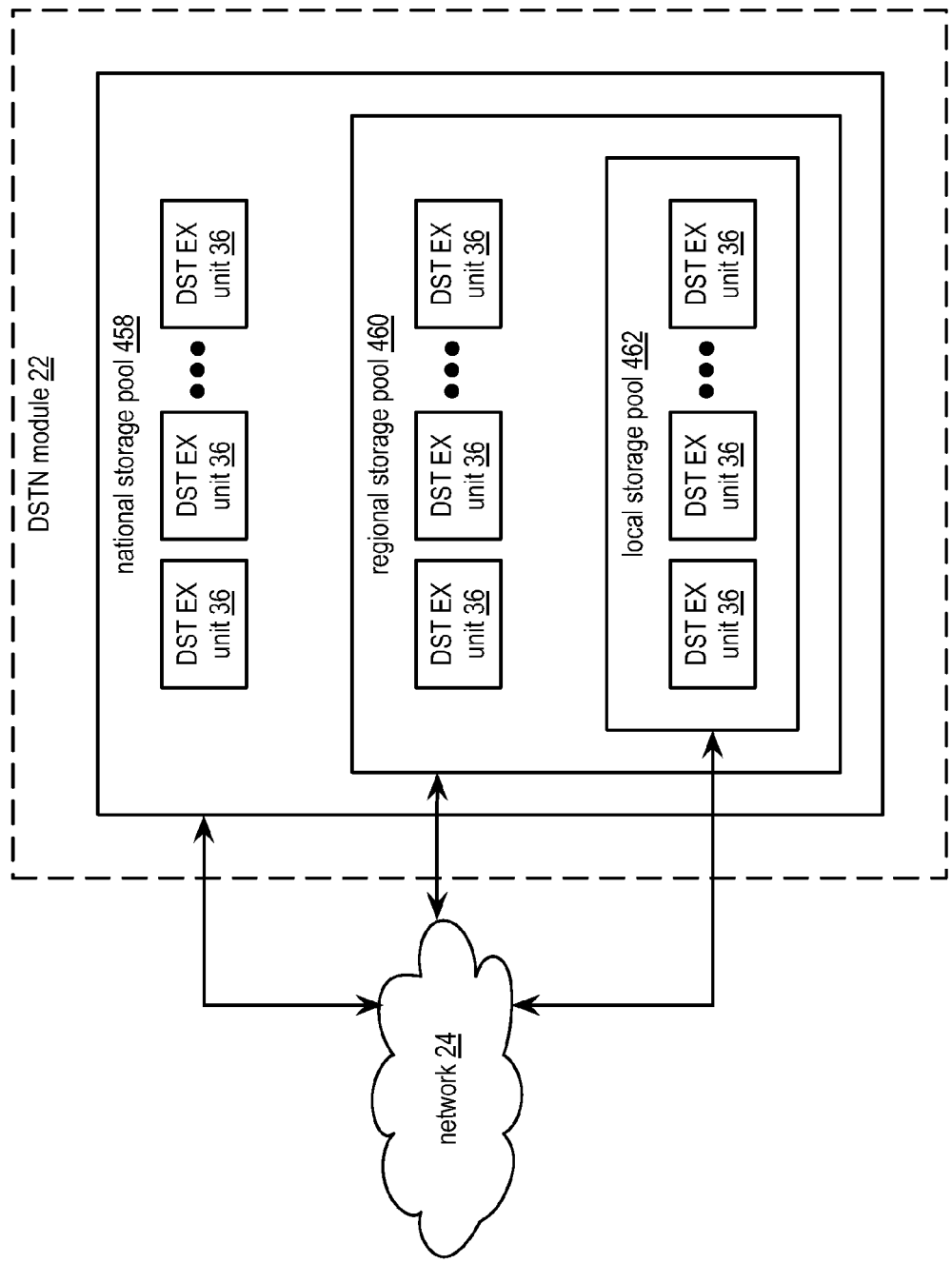
FIG. 43A is a schematic block diagram of another embodiment of a distributed computing system in accordance with the present invention.

FIG. 43A is a schematic block diagram of another embodiment of a distributed computing system. The system includes a network 24 and a distributed storage and task network (DSTN) module 22. Alternatively, a dispersed storage network (DSN) memory may be substituted for the DSTN module 22. The DSTN module 22 includes a plurality of concentric storage pools 458-462. For example, a national storage pool 458 includes a regional storage pool 460 and a local storage pool 462, and the regional storage pool 460 includes the local storage pool 462. Each storage pool of the plurality of concentric storage pools 458-462 includes a set of distributed storage and task (DST) execution modules 36 utilized to access at least one set of slices (e.g., including the encoded data slices, error coded slices, and data slices). Alternatively, one or more dispersed storage (DS) units may substitute for one or more DST execution units 36. Each storage pool of the plurality of concentric storage pools 458-462 is operably coupled via the network 24 to the plurality of concentric storage pools 458-462 to facilitate migrating slices from one storage pool to another. The migrating of slices may enable a more favorable match of a slice storage performance requirement and an actual slice storage performance level when at least one storage pool of the plurality of concentric storage pools 458-462 is associated with an actual slice storage performance level that is different (e.g., more favorable) than an actual slice storage performance level associated with at least one other storage pool.

Each storage pool may be associated with a target slice storage performance level, where the target slice storage performance level includes one or more of an access latency level, an access bandwidth level, a cost level, a storage capacity level, a geographic affiliation, a security level, and an availability level. For example, the local storage pool 462 may be associated with active storage requiring a target slice performance level that includes a lowest access latency performance level and an average reliability level. As another example, the national storage pool 458 may be associated with inactive storage requiring a target slice performance level that includes allowing a highest access latency performance level while mandating a highest reliability level. As yet another example, the regional storage pool 460 may be associated with near line storage requiring a target slice performance level including an average access latency performance level and an average reliability level.

A set of slices may be accessed in at least one storage pool of the plurality of concentric storage pools 458-462. For example, a set of slices are generated and initially stored in the plurality of DST execution units 36 of the local storage pool 462 such that frequent accessing of a set of slices may benefit from a storage performance level associated with the local storage pool. As time goes on a storage requirement may change. For example, a frequency of access requirement may lower as time goes on. When the requirement changes, the set of slices may be transferred to a storage pool in line with a lowered frequency of access requirement. For example, the set of slices are transferred from the local storage pool 462 to the regional storage pool 460. As more time goes on, a similar process may repeat such that the set of slices are transferred from the regional storage pool 460 to the national storage pool 458. A similar process is utilized in a reverse direction. For example, the set of slices may be transferred from the national storage pool 458 to the regional storage pool 460 when the frequency of access requirement increases. As more time goes on, the set of slices may be transferred from the regional storage pool 460 to the local storage pool 462 as the frequency of access requirement further increases.

Resources associated with a storage pool contained within another storage pool may be utilized for storage of slices with the storage pool. For example, any of the DST execution units 36 of the local storage pool 462 may be utilized in addition to DST execution units 36 associated with the regional storage pool 460 (e.g., and not the national storage pool 458) when storing a set of slices in the regional storage pool 460. Resources may be associated with multiple storage pools based on multiple associations. For example, a plurality of DST execution units 36 associated with a first local storage pool 462 may also be associated with a second local storage pool 462. As another example, a plurality of DST execution units 36 associated with a regional storage pool 460 and a second local storage pool 462 may not be associated with the first local storage pool 462.

FIG. 43B is a flowchart illustrating an example of writing data. The method begins at step 464 where a processing module (e.g., of a distributed storage and task (DST) client module) receives data for storage. The receiving may include receiving one or more of the data, a data identifier (ID), and a requesting entity ID. The method continues at step 466 where the processing module stores the data as a plurality of sets of encoded data slices in an affiliated local storage pool of distributed storage and task (DST) execution units. The storing includes encoding the data utilizing a dispersed storage error coding function in accordance with dispersed storage error coding function parameters associated with the local storage pool to produce the plurality of sets of encoded data slices, generating a plurality of sets of slice names associated with the plurality of sets of encoded data slices, generating a plurality of sets of write slice requests that includes the plurality of sets of encoded data slices and the plurality of sets of slice names, identifying a set of DST execution units of the local storage pool, initializing a frequency of access indicator corresponding to the data ID (e.g., a timestamp, a number of accesses=1), and outputting the plurality of sets of write slice requests to the identified set of DST execution units where each DST execution unit of the identified set of DST execution units stores one or more encoded data slices of the plurality of sets of encoded data slices.

When no modifications have been received for the data within a time period, the method continues at step 468 where the processing module stores the data as another plurality of sets of encoded data slices in an affiliated next level storage pool of DST execution units. The processing module may indicate that no modifications have been received for the data within the time period when a real-time clock is greater than a timestamp of the frequency of access indicator corresponding to the data ID by a time period threshold. The storing the data includes at least one of generating and storing the other plurality of sets of encoded data slices and retrieving the plurality of sets of encoded data slices from the local storage pool and storing the plurality of sets of encoded data slices in the next level storage pool.

The generating and storing the other plurality of sets of encoded data slices includes obtaining the data, encoding the data utilizing the dispersed storage error coding function in accordance with dispersed storage error coding function parameters of the next level storage pool to produce the other plurality of sets of encoded data slices, selecting a set of DST execution units of the next level storage pool, and outputting the other plurality of sets of encoded data slices to selected set of DST execution units of the next level storage pool. The obtaining includes retrieving the plurality of sets of encoded data slices from the local storage pool and decoding the plurality of sets of encoded data slices utilizing the dispersed storage error coding function in accordance with the dispersed storage error coding parameters of the local storage pool to reproduce the data.

The method continues at step 470 where the processing module determines whether to delete the data from a storage pool. The determination may be based on one or more of a storage pool identifier associated with storage of the data, a storage pool level (e.g., never delete from the national storage pool when utilizing the national storage pool as a long-term reliable backup), a value of the frequency of access indicator, a current timestamp, a storage pool memory utilization level, a time threshold, a storage pool memory utilization threshold, and a cost of storage estimate. For example, the processing module indicates to delete the data from the local storage pool when the frequency of access indicator indicates that a time period since a last data access is greater than a time threshold. The method loops back to at least one of steps 464, 468, and 470 when the processing module determines not to delete the data from the storage pool. For example, the method loops back to step 464 when new data has been received, loops back to step 468 when no new data has been received, and loops back to step 470 when a memory capacity indicator compares unfavorably to a low memory capacity threshold level. The method continues to step 472 when the processing module determines to delete the data from storage pool. The method continues at step 472 where the processing module deletes the data from storage pool. The deleting includes one or more of verifying that the data is currently stored in another higher-level storage pool and requesting deletion of the data from the storage pool when the data is verified to be stored in the other higher-level storage pool.

FIG. 43C is a flowchart illustrating an example of reading data. The method begins at step 474 where a processing module (e.g., of a distributed storage and task (DST) client module) receives a data retrieval request. The receiving includes receiving one or more of a requesting entity identifier (ID), a data ID, a mandatory storage pool ID, and a preferred storage pool ID. The method continues at step 476 where the processing module determines whether the data is available from an affiliated local storage pool. The determining may be based on at least one of outputting a read request, outputting a list request, outputting a list digest request, accessing a list, and receiving a response. The method branches to step 480 when the processing module determines that the data is not available from the affiliated local storage pool. The method continues to step 478 when the processing module determines that the data is available from the affiliated local storage pool.

The method continues at step 478 where the processing module retrieves the data from the affiliated local storage pool. The retrieving includes generating a plurality of sets of read slice requests that include a plurality of sets of slice names associated with the data, outputting the plurality of sets of read slice requests to a set of DST execution units of the affiliated local storage pool, receiving a plurality of at least a decode threshold number of encoded data slices, and decoding the plurality of the at least the decode threshold number of encoded data slices to reproduce the data. The method branches to step 484.

The method continues at step 480 where the processing module retrieves the data from another storage pool when the data is not available from the affiliated local storage pool. The retrieving includes identifying the other storage pool, retrieving the plurality of sets of encoded data slices, and decoding the plurality of sets of encoded data slices to reproduce the data. The identifying may be based on at least one of accessing a data to storage pool identifier list, sending a read request, sending a list request, sending a list digest request, and receiving a response. For example, the processing module identifies a higher-level storage pool that includes the data, retrieves the slices, and decodes the slices to reproduce the data. The method continues at step 482 where the processing module stores the data in the affiliated local storage pool (e.g., since frequency of access has increased). The storing includes storing the plurality of sets of encoded data slices in the affiliated local storage pool and re-encoding the data to produce a second plurality of encoded data slices for storage in the affiliated local storage pool. The method continues at step 484 where the processing module sends the data to the requesting entity.

Figure 44:
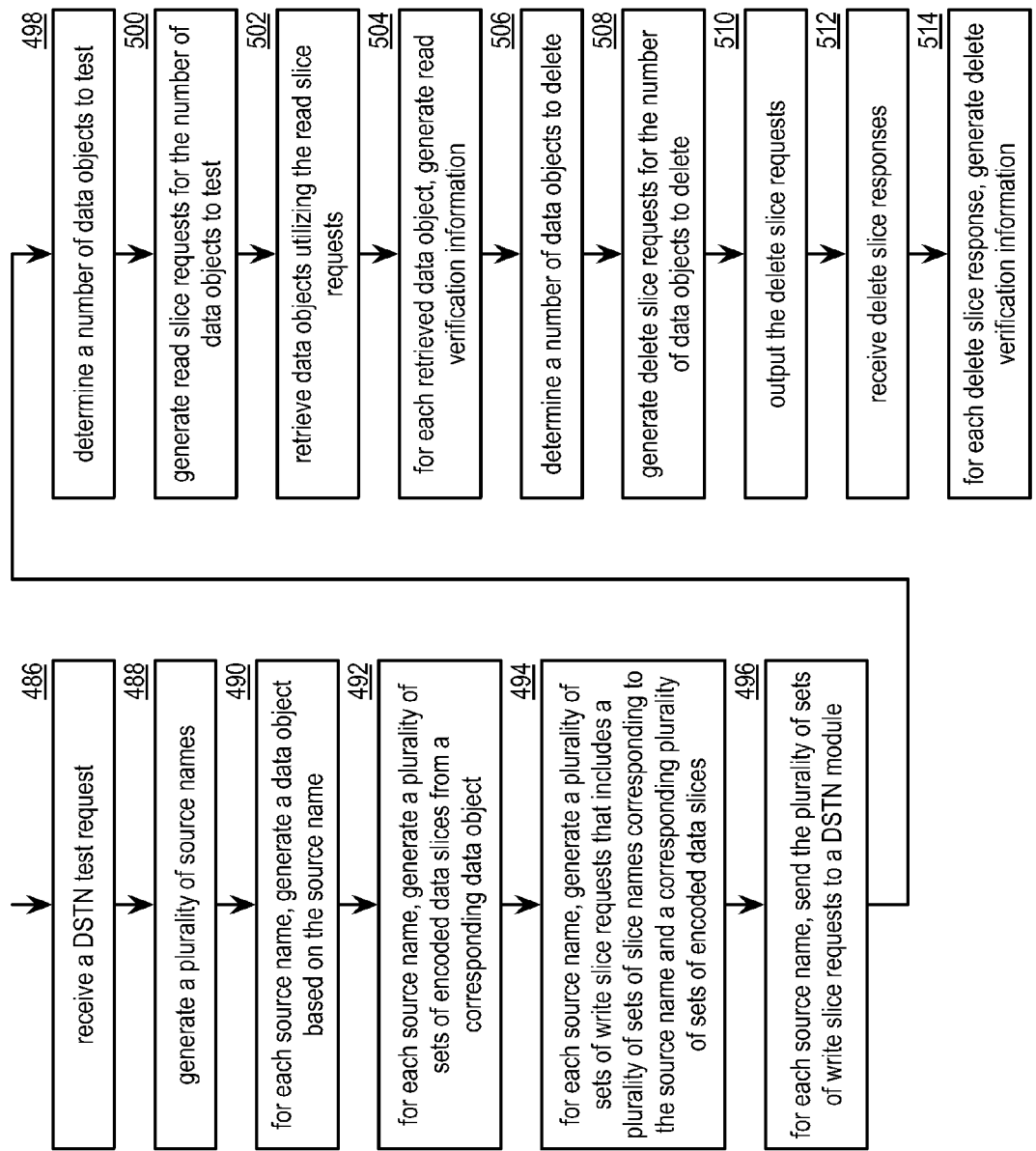
FIG. 44 is a flowchart illustrating an example of testing a distributed storage and task network (DSTN) in accordance with the present invention.

FIG. 44 is a flowchart illustrating an example of storing a slice, The method begins at step 486 where a processing module (e.g., of a distributed storage and task (DST) client module) receives a distributed storage and task network (DSTN) test request. Alternatively, the processing module receives a dispersed storage network (DSN) test request. The receiving includes at least one of detecting an error condition, receiving an error message, receiving a test request from a requesting entity, receiving a number of source names to test, receiving a number of slices to test, and receiving a test type indicator. The method continues at step 488 where the processor module generates a plurality of source names. The generating includes determining a number of source names to generate as "s" and generating source names in accordance with the number to generate. The processing module may determine the number of source names to generate based on at least one of the test request, a predetermination, a number generated in a previous test, a number remaining from a previous suspended test, and a random number. For example, the processing module generates the plurality of source names in accordance with a formula of: source name=hash (i), where i is a prime number from 1 to s.

For each source name, the method continues at step 490 where the processing module deterministically generates a data object based on the source name. For example, the processing module generates the data object in accordance with a formula of: data object i=data object i appended with hash (n appended with i), for n=1 to j, where j is a number of desired bytes. For each source name, the method continues at step 492 where the processing module generates a plurality of sets of encoded data slices from a corresponding data object (e.g., corresponding to the source name). For example, the processing module encodes the corresponding data object utilizing a dispersed storage error coding function to produce the plurality of sets of encoded data slices. For each source name, the method continues at step 494 where the processing module generates a plurality of sets of write slice requests that includes a plurality of sets of slice names corresponding to the source name and a corresponding plurality of sets of encoded data slices. The generating includes transforming the corresponding source name into the plurality of sets of slice names based on a vault identifier (ID) and dispersed storage error coding function parameters associated with the test.

For each source name, the method continues at step 496 where the processing module sends the plurality of sets of write slice requests to a DSTN module, or DSN memory, to facilitate storing the corresponding plurality of sets of encoded data slices. The method continues at step 498 where the processing module determines a number of data objects to test. The determining may be based on at least one of a last test, a predetermination, and the test request. The method continues at step 500 where the processing module generates read slice requests for the number of objects to test. The generating includes generating a source name for each of the data objects to test and generating a plurality of sets of read slice requests for each source name, wherein each read slice request includes a slice name corresponding to a corresponding source name. The generating of each source name may be in accordance with a formula of: source name=hash (g^a mod p), a=1 to p−1 for the number of data objects to test, g is a primitive root polynomial, p is a prime, and g and p are related such that for every number "a" between 1 and (p−1), there is some integer exponent (e) such that gAe mod p=a. The generating of each source name further includes identifying the values of a and p associated with the read test to reduce subsequent retesting of a same range of source names. The generating of each source name further includes excluding values of a and p associated with source names of data objects that have been deleted in a previous test.

The method continues at step 502 where the processing module retrieves data objects utilizing the read slice requests. The retrieving includes outputting the read slice requests to the DSTN module, receiving slices, and decoding slices to reproduce the data objects. For each retrieved data object, the method continues at step 504 where the processing module generates read verification information. The generating includes comparing the retrieved data object to a regenerated data object corresponding to the retrieved data object (e.g., regenerated in accordance with the a formula of: data object i=data object i appended with hash (n appended with i), for n=1 to j, where j is a number of desired bytes). The generating further includes indicating that the data object is verified when the retrieved data object is substantially the same as the regenerated data object.

The method continues at step 506 where the processing module determines a number of data objects to delete. The determining may be based on at least one of a last test, a predetermination, and the test request. The method continues at step 508 where the processing module generates delete slice requests for the number of data objects to delete. The generating includes generating a source name for each of the data objects to delete and generating a plurality of sets of delete slice requests for each source name, where each delete slice request includes a slice name corresponding to a corresponding source name. The generating of each source name may be in accordance with a formula of: source name=hash (g^a mod p), a=1 to p−1 for the number of data objects to delete, g is a primitive root polynomial, p is a prime, and g and p are related such that for every number "a" between 1 and (p−1), there is some integer exponent (e) such that g^e mod p=a. The generating of each source name further includes identifying the values of a and p associated with the deleting to reduce subsequent reading of a same range of source names. The generating of each source name further includes excluding values of a and p associated with source names of data objects that have been deleted in a previous test.

The method continues at step 510 where the processing module outputs the delete slice requests to the DSTN module. The method continues at step 512 where the processing module receives delete slice responses. Each response of the responses includes an indicator indicating whether an associated delete operation was favorably executed. For each delete slice response, the method continues at step 514 where the processing module generates delete verification information. The generating includes one or more of indicating which slices were successfully deleted, indicating which slices were not successfully deleted, indicating a number of successfully deleted slices, and indicating a number of unsuccessfully deleted slices.

Figure 45A:
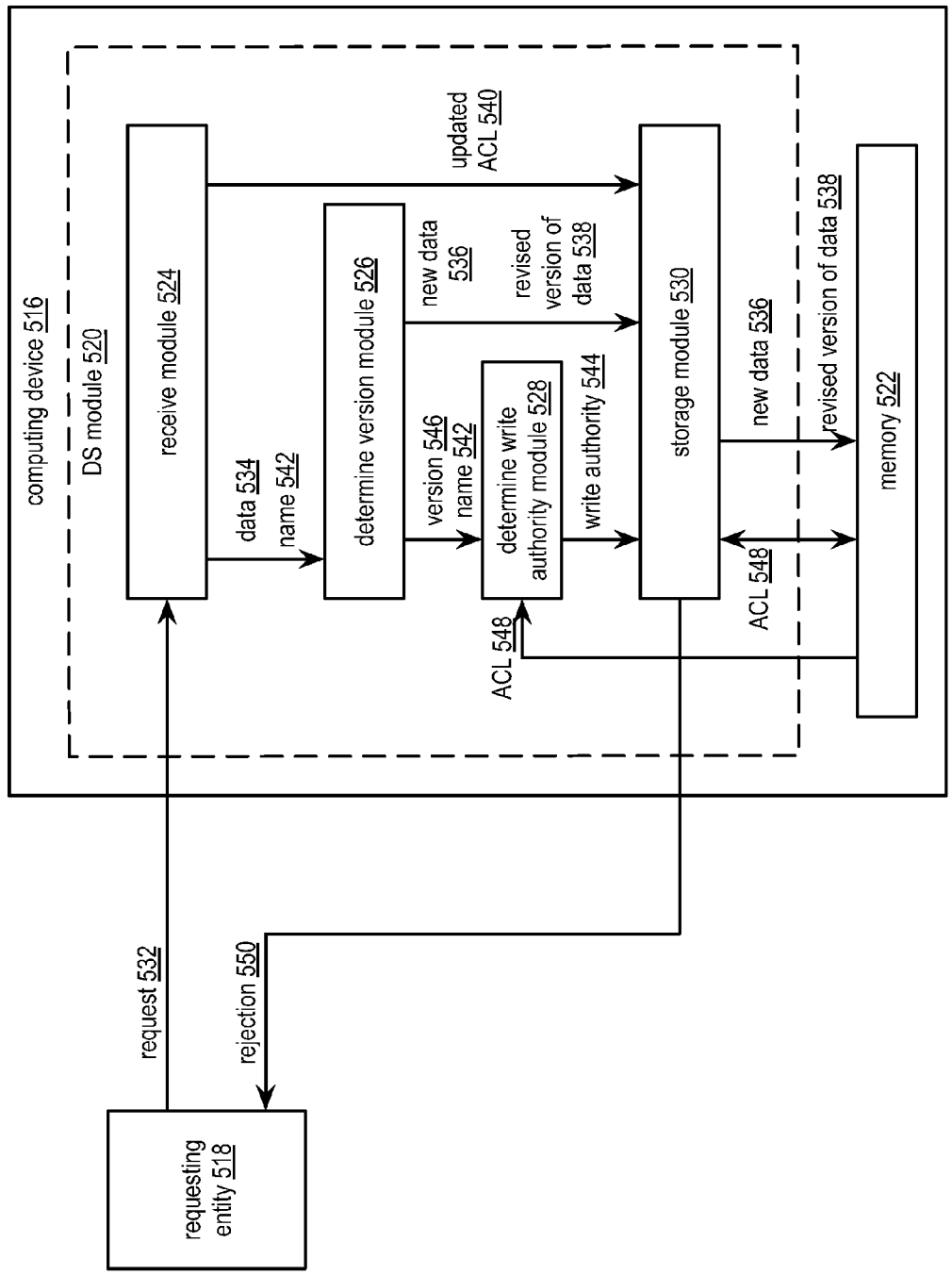
FIG. 45A is a schematic block diagram of an embodiment of a storage unit in accordance with the present invention.

FIG. 45A is a schematic block diagram of an embodiment of a storage unit that includes a computing device 516. The storage unit may be implemented utilizing at least one of a storage unit, a storage server, a memory unit, a user device, a computer, a computing array, a distributed computing computer, a dispersed storage (DS) unit, and a distributed storage and task (DST) execution unit. The computing device 516 includes a dispersed storage module 520 and a memory 522. The memory may include one or more of read-only memory and random access memory. The memory may be implemented utilizing one or more memory devices. Each memory device of the one or more memory devices may be implemented utilizing one or more of solid-state memory, optical disc memory, and a magnetic disk memory. The DS module 520 includes a receive module 524, a determine version module 526, a determine write authority module 528, and a storage module 530.

The storage unit functions to receive a write request 532 for storing a data object 534, determine whether the data object 534 is a new data object 536 or a revised version 538 of an existing data object, determine a write authority 544, and process the write request 532 for storing the data object 534 in accordance with the write authority 544. The data object 534 may include an encoded data slice of a set of encoded data slices, where a data segment is encoded using a dispersed storage error encoding function to produce the set of encoded data slices.

With regards to receiving the write request 532 for storing the data object 534, the receive module 524 receives, from a requesting entity 518 (e.g., a DS processing unit, another storage unit associated with the storage unit), the write request 532 for storing the data object 534, where the write request includes updated access control list (ACL) information 540 regarding the data object 534 and a name 542 identifying the data object 534. The write request may further include one or more of an identifier of the requesting entity 518 and a signed certificate.

With regards to determining whether the data object 534 is the new data object 536 or the revised version 538 of the existing data object, the determine version module 526 determines whether the data object 534 is the new data object 536 or the revised version 538 of the existing data object. The determine version module 526 determines whether the data object 534 is the new data object 536 or the revised version 538 of the existing data object by interpreting a revision number field of the name 542. The determine version number 526 may output a version 546 to indicate whether the data object 534 is the new data object 536 or the revised version 538 of the existing data object. For example, the determine version module 526 outputs the version 546 to indicate that the data object 534 is the new data object 536 when the revision number field indicates a first revision number.

With regards to determining the write authority 544, the determine write authority module 528 determines the write authority 544 of the requesting entity 518 based on information contained in a locally stored ACL 548 (e.g., permissions retrieved from the memory 522 with regards to which types of requests the identity of the requesting entity 518 is allowed to perform), where the write authority 544 includes, at least one of, authorization to issue a write request for the new data object 536, authorization to issue a write request for the revised version 538 of the existing data object, and authorization to issue updated ACL information 540 regarding the new data object 536 or the revised version 538 of the existing data object.

The write authority 544 may further include a range of permissible revisions for the revised version 538 of the existing data object. For example, the requesting entity 518 is authorized to store revised versions 538 within a range of revisions 1-10 and update the ACL information 548 for the same range. The determine write authority module 528 may further determine the write authority 544 to include an indicator that indicates whether a revision number of the revised version 538 of the existing data object is within the range of permissible revisions.

When the write request 532 is regarding the new data object 536 (e.g., as indicated by version 546), the determine write authority module 528 may further determine that the requesting entity is authorized to issue the write request for the new data object 536 and to issue the updated ACL information 540 regarding the new data object 536. The determine write authority module 528 determines that the requesting entity 518 is authorized to issue the write request 532 for the new data object 536 and to issue the updated ACL information 540 regarding the new data object 536 by extracting the signed certificate from the write request 532 and verifying the signed certificate to establish authorization (e.g., generate the write authority 544) to issue the write request 532 for the new data object 536 and to issue the updated ACL information 540 regarding the new data object 536. The write authority generates the write authority 544 to include an indicator that indicates that the requesting entity is authorized to issue the write request for the new data object 536 and to issue the updated ACL information 540 regarding the new data object 536 when the determine write authority module 528 determines that the requesting entity is authorized to issue the write request for the new data object 536 and to issue the updated ACL information 540 regarding the new data object 536.

With regards to processing the write request 532 for storing the data object 534 in accordance with the write authority 544, when the write request 532 is regarding the revised version 538 of the existing data object and the write authority 544 includes the authority to issue the write request for the revised version 538 of the existing data object and authorization to issue updated ACL information regarding the revised version of the existing data object, the storage module 530 stores the revised version 538 of the existing data object in the memory 522 and updates the access control list 548 in the memory 522 based on the updated ACL information 540. The updating includes at least one of appending and replacing. When the write request 532 is regarding the revised version 538 of the existing data object and the write authority 544 does not include the authority to issue the write request for the revised version of the existing data object, the storage module 530 sends the write request rejection message 550 to the requesting entity 518.

When the revision number is within the range of permissible revisions, as indicated by the write authority 544, the storage module 530 stores the revised version 538 of the existing data object in the memory 522 and updates the access control list 548 in the memory 522 based on the updated ACL information 540. When the revision number is not within the range of permissible revisions, the storage module 530 denies the write request (e.g., no storage, issue an error message, output a write request rejection message 550 to the requesting entity 518).

When the write request 532 is regarding the new data object 536 and when the write authority 544 indicates that that the requesting entity 518 is authorized to issue the write request 532 for the new data object 536 and to issue the updated ACL information 540 regarding the new data object 536, the storage module 530 stores the new data object 536 in the memory 522 and updates the access control list 548 in the memory 522 based on the updated ACL information 540 regarding the new data object 536.

When the write request 532 is regarding the revised version 538 of the existing data object and the write authority 544 includes the authority to issue the write request for the revised version 538 of the existing data object but not the authorization to issue updated ACL information 540 regarding the revised version 538 of the existing data object, the storage module 530 stores the revised version 538 of the existing data object in the memory 522 and accesses a trusted source (e.g., a managing unit, a security server, another storage unit, a DS processing unit, etc). The accessing is with regards to authenticating the requesting entity's authority to issue the updated ACL information 540 regarding the revised version 538 of the existing data object or obtaining the updated ACL information 540 regarding the revised version 538 of the existing data object. The storage module 530 updates the ACL information 548 in the memory 522 using the updated ACL information 540 when the accessing the trusted source indicates that the requesting entity has authority to issue the updated ACL information 540. Alternatively, the storage module 530 updates the ACL information 548 in the memory 522 using updated ACL information 540 obtained from the trusted source when obtaining the updated ACL information 540 from the trusted source.

Figure 45B:
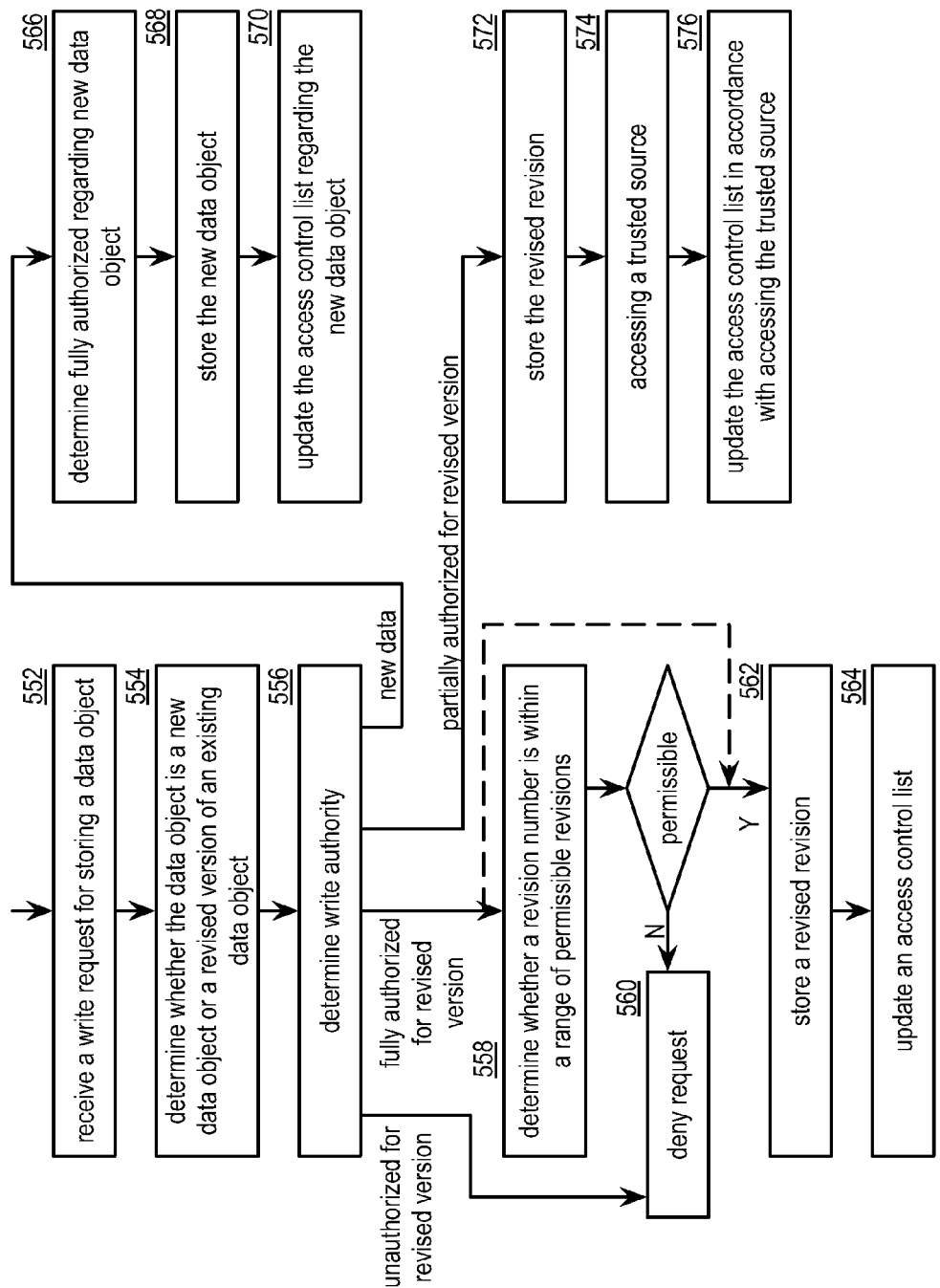
FIG. 45B is a flowchart illustrating an example of storing a slice in accordance with the present invention.

FIG. 45B is a flowchart illustrating an example of storing a slice. The method begins at step 552 where a processing module (e.g., of a storage unit) receives, from a requesting entity, a write request for storing a data object, where the write request includes updated access control list (ACL) information regarding the data object and a name identifying the data object. The data object includes an encoded data slice of a set of encoded data slices, where a data segment is encoded using a dispersed storage error encoding function to produce the set of encoded data slices. The method continues at step 554 where the processing module determines whether the data object is a new data object or a revised version of an existing data object. The determining whether the data object is the new data object or the revised version of the existing data object includes interpreting a revision number field of the name.

The method continues at step 556 where the processing module determines write authority of the requesting entity based on information contained in a locally stored access control list. The write authority includes at least one of authorization to issue a write request for the new data object, authorization to issue a write request for the revised version of the existing data object, and authorization to issue updated ACL information regarding the new data object or the revised version of the existing data object. The write authority may include a range of permissible revisions for the revised version of the existing data object.

When the write request is regarding the revised version of the existing data object and the write authority includes the authority to issue the write request for the revised version of the existing data object and authorization to issue updated ACL information regarding the revised version of the existing data object, the method continues at step 558 where the processing module determines whether a revision number of the revised version of the existing data object is within the range of permissible revisions. Alternatively, when not checking a revision number, the method branches to step 562. When the revision number is within the range of permissible revisions, the method branches to step 562. When the revision number is not within the range of permissible revisions, the method continues to step 560. When the revision number is not within the range of permissible revisions, the method continues at step 560 where the processing module denies the write request. The denying of the write request includes sending a write request rejection message to the requesting entity to deny the request. When the write request is regarding the revised version of the existing data object and the write authority does not include the authority to issue the write request for the revised version of the existing data object, the method continues at step 560 to deny the request.

When the revision number is within the range of permissible revisions, the method continues at step 562 where the processing module stores the revised version of the existing data object (e.g., in a local memory). The method continues at step 564 where the processing module updates an access control list based on the updated ACL information (e.g., overwrites the access control list with the updated ACL information in the local memory).

When the write request is regarding the new data object, the method continues at step 566 where the processing module determines that the requesting entity is authorized to issue the write request for the new data object and to issue the updated ACL information regarding the new data object. The determining that the requesting entity is authorized to issue the write request for the new data object and to issue the updated ACL information regarding the new data object includes extracting a signed certificate from the write request and verifying the signed certificate to establish authorization to issue the write request for the new data object and to issue the updated ACL information regarding the new data object. When fully authorized, the method continues at step 568 where the processing module stores the new data object. The method continues at step 570 where the processing module updates the access control list based on the updated ACL information regarding the new data object.

When the write request is regarding the revised version of the existing data object and the write authority includes the authority to issue the write request for the revised version of the existing data object but not the authorization to issue updated ACL information regarding the revised version of the existing data object, the method continues at step 572 where the processing module stores the revised version of the existing data object. The method continues at step 574 where the processing module accesses a trusted source regarding authenticating the requesting entity's authority to issue the updated ACL information regarding the revised version of the existing data object or obtaining the updated ACL information regarding the revised version of the existing data object.

The method continues at step 576 where the processing module updates the access control list in accordance with the accessing of the trusted source. For example, the processing module utilizes updated ACL information from the requesting entity to update the access control list when the trusted source indicates that the requesting entity has authority to issue the updated ACL information regarding the revised version of the existing data object. As another example, the processing module utilizes updated ACL information obtained from the trusted source to update the access control list.

Figure 45C:
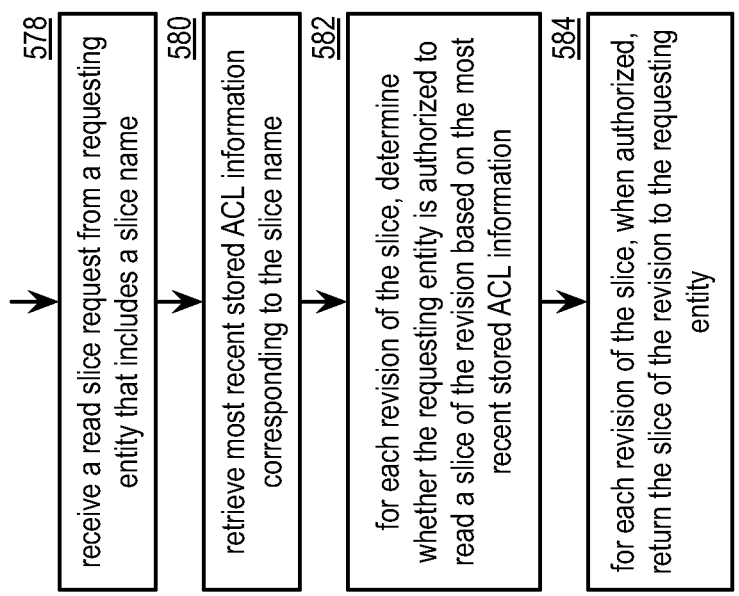
FIG. 45C is a flowchart illustrating an example of retrieving a slice in accordance with the present invention.

FIG. 45C is a flowchart illustrating an example of retrieving a slice. The method begins at step 578 where a processing module (e.g., of a storage unit) receives a read slice request from a requesting entity that includes a slice name. The method continues at step 580 where the processing module retrieves most recent stored ACL information corresponding to the slice name. For each revision of the slice, the method continues at step 582 where the processing module determines whether the requesting entity is authorized to read a slice of the revision based on the most recent stored ACL information. For example, the processing module verifies access permissions of the requesting entity with the ACL information for the slice revision. For each revision of the slice, when authorized, the method continues at step 584 where the processing module returns the slice of the revision to the requesting entity. The returning includes generating a read slice response that includes or more of the slice, the revision number, and a favorable great response indicator. The returning further includes sending the read slice response to the requesting entity.

Figure 46B:
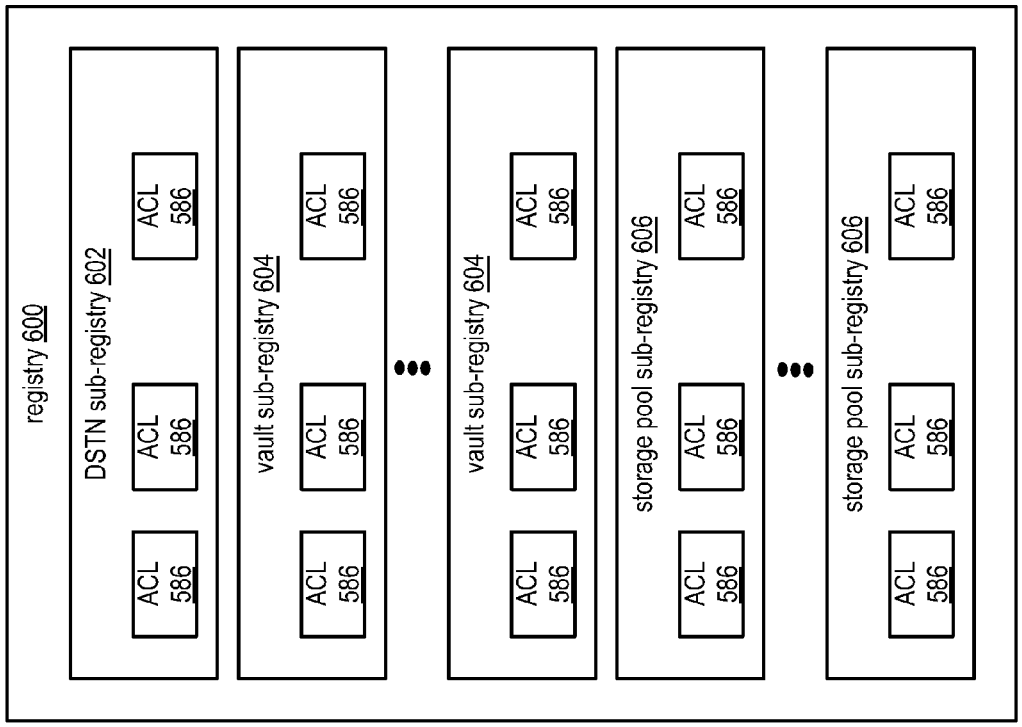
FIG. 46B is a diagram illustrating an example of a registry structure in accordance with the present invention.
Figure 46A:
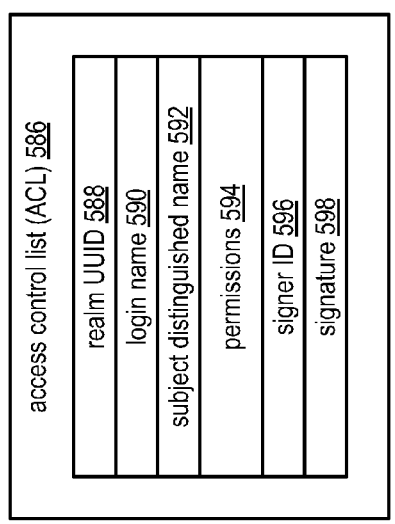
FIG. 46A is a diagram illustrating an example of an access control list (ACL) structure in accordance with the present invention.

FIG. 46A is a diagram illustrating an example of an access control list (ACL) structure 586 that includes a realm universally unique identifier (UUID) field 588, a login name field 590, a subject distinguished name field 592, a permissions field 594, a signer identifier (ID) field 596, and a signature field 598. The realm UUID field 588 includes a realm UUID entry of a plurality of realm UUIDs associated with at least one of a distributed storage and task network (DSTN) and a dispersed storage network (DSN). For example, a realm entry includes www.cleversafe.com. The login name field 590 includes a login name entry corresponding to an identifier of an entity associated with permissions of the ACL. The entity includes at least one of a module, a device, a unit, and a user. The subject distinguished name field 592 includes a subject distinguished name entry of a pathname of a directory and/or index uniquely identifying a directory entry. For example, a distinguished name entry includes www.cleversafe.com/DSTN/media/example.jpg. The permissions field 594 includes at least one permissions entry, where the at least one permissions entry identifies allowed operations and un-allowed operations corresponding to the other entries of the ACL 586. For example, a permissions entry identifies an allowed read operation and not allowing a write operation. The signer ID field 596 includes a signer ID entry, where the signer ID entry corresponds to an entity that signs the ACL 586 to produce a signature entry of the signature field 598. The signature field 598 includes the signature entry, where the signature entry includes a signature over the ACL 586 to enable subsequent verification of the ACL 586.

FIG. 46B is a diagram illustrating an example of a registry structure 600 that includes a distributed storage and task network (DSTN) sub-registry 602, one or more vault sub-registries 604, and one or more storage pool sub-registries 606. The registry structure 600 may correspond to at least one of a DSTN and a dispersed storage network (DSN). Each of the DSTN sub-registry 602, the one or more vault sub-registries 604, and the one or more storage pool sub-registries include one or more access control lists (ACLs) 586. Alternatively, the DSTN sub-registry 602 may correspond to a dispersed storage network (DSN) sub-registry when the registry 600 corresponds to the DSN.

The registry 600 may be utilized to authorize access requests within at least one of the DSTN and the DSN. At least one of the DSTN sub-registry 602, the one or more vault sub-registries 604, and the one or more storage pool sub-registries 606 may be utilized when authorizing a DSTN access request based on one or more of a requesting entity identifier (ID) associated with the DSTN access request and an access type of the DSTN access request. Utilizing the registry 600 includes identifying the registry 600 and utilizing at least one ACL 586 of the registry 600 to authorize the DSTN access request. For example, the DSTN sub-registry 600 to is identified to authorize a DSTN level access request. The DSTN level access request includes at least one of a create vault request, a delete vault request, a create storage pool request, a delete storage pool request, a create realm request, and a delete realm request. Utilizing the at least one ACL 586 includes identifying the at least one ACL 586 based on the requesting entity ID, retrieving the at least one ACL 586, and determining whether the DSTN access request is authorized based on one or more permissions of the ACL 586. As another example, the vault sub-registry 604 is identified to authorize a vault level access request. The vault level access request includes at least one of a delete object request, an add object request, a modify object request, and a modify permissions request. As another example, the storage pool sub-registry 606 is identified to authorize a storage pool level access request. The storage pool level access request includes a modify storage pool request. Methods of generating and utilizing the registry 600 are discussed in greater detail with reference to FIGS. 46C-D.

Figure 46D:
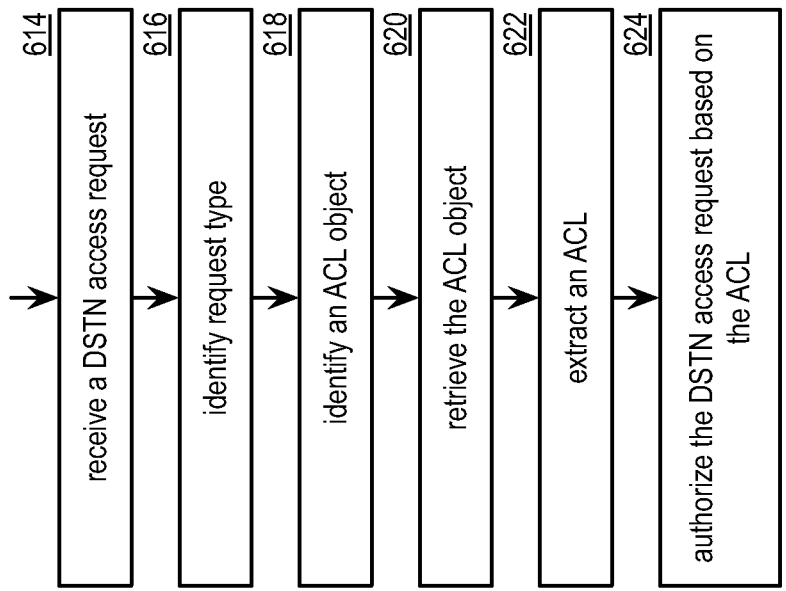
FIG. 46D is a flowchart illustrating an example of utilizing an access control list (ACL) in accordance with the present invention.
Figure 46C:
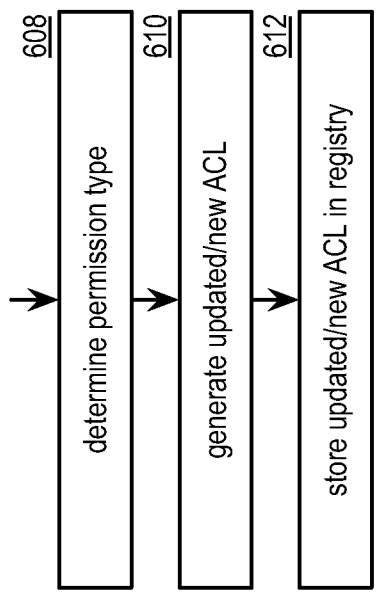
FIG. 46C is a flowchart illustrating an example of generating an access control list (ACL) in accordance with the present invention.

FIG. 46C is a flowchart illustrating an example of generating an access control list (ACL). The method begins at step 608 where a processing module (e.g., of a distributed storage and task (DST) client module) determines a permissions type based on at least one of a request, a predetermination, and a requesting entity. The method continues at step 610 where the processing module generates an updated and/or new ACL. The generating includes generating a realm universally unique identifier (UUID) entry for a realm UUID field, generating a login name entry for a login name field that includes an identifier of the entity of the ACL, generating a subject distinguished name entry of a subject distinguished name field corresponding to an object stored in a distributed storage and task network (DSTN), generating permissions for the permissions type based on a permissions authorization input (e.g., an authorized activity, an unauthorized activity), generating a signer identifier (ID) entry for a signer ID field corresponding to the processing module, and generating a signature entry for a signature field, where the signature is generated over the ACL utilizing a private key associated with the processing module. The method continues at step 612 where the processing module stores the updated and/or new ACL in a registry. The storing includes identifying a sub-registry of the registry based on the permissions type. For example, the processing module identifies a vault sub-registry when the permissions type is with regards to modifying data stored as encoded data slices in the DSTN.

FIG. 46D is a flowchart illustrating an example of utilizing an access control list (ACL). The method begins at step 614 where a processing module (e.g., of a distributed storage and task (DST) client module) receives a distributed storage and task network (DSTN) access request from a requesting entity. The method continues at step 616 where the processing module identifies a request type of the DSTN access request (e.g., extracting a type field). The method continues at step 618 where the processing module identifies an ACL object based on the request type. For example, the processing module identifies an ACL object associated with the requesting entity within a sub registry associated with the request type.

The method continues at step 620 where the processing module retrieves the ACL object. The retrieving includes generating at least a set of read slice requests that includes at least a set of slice names corresponding to the ACL object, outputting the at least the set of read slice requests to the DSTN, retrieving at least a decode threshold number of read slice responses that includes at least a decode threshold number of encoded data slices corresponding to the ACL object, and decoding the at least the decode threshold number of encoded data slices to produce the ACL object.

The method continues at step 622 where the processing module extracts an ACL of one or more ACLs associated with the ACL object. The extracting includes identifying the ACL of the one of more ACLs based on a requesting unit identifier. The method continues at step 624 where the processing module authorizes the DSTN access request based on the ACL. The authorization includes comparing the DSTN access request to permissions of the ACL to determine whether the DSTN access request is authorized.

FIG. 47A is a diagram illustrating an example of a realm object structure 626 that includes a realm name field 628, a realm universally unique identifier (UUID) field 588, an authentication authority field 630, and an access control list (ACL) field 632. The realm name field 628 includes a realm name entry, where the realm name entry includes an alphanumeric name associated with an entry of the realm UUID field 588. For example, a realm name entry of "Cleversafe" refers to a realm of one or more realms associated with at least one of a distributed storage and task network (DSTN) and a dispersed storage network (DSN). The realm UUID field 588 includes a realm UUID entry associated with the realm. The authentication authority field 630 includes an authentication authority entry, where the authentication authority entry includes one or more of an authentication protocol, a location of an authority (e.g., a certificate authority), a name of the authority, and an internet protocol (IP) address of the authority. The ACL field 632 includes at least one ACL entry, where the at least one ACL entry includes an access control list associated with the realm.

FIG. 47B is a flowchart illustrating an example of generating a realm object. The method begins at step 634 where a processing module (e.g., of a distributed storage and task (DST) client module) verifies distributed storage and task network (DSTN) permissions. The verifying includes verifying that a requesting entity creating the realm object has DSTN level permissions. For example, the processing module accesses a DSTN level sub-registry to retrieve an access control list (ACL) associated with the requesting entity and verifies that the requesting entity has the DSTN level permissions based on permissions of the ACL.

The method continues at step 636 where the processing module generates a new universally unique identifier (UUID) as a realm UUID entry. The generating may include one or more of generating a random UUID and verifying that UUID has not been used previously (e.g., checking a UUID tombstone list). The method continues at step 638 where the processing module obtains a new realm name as a realm name entry. The obtaining includes at least one of receiving the new realm name, requesting the new realm name, and generating the new realm name as a random name. The method continues at step 640 where the processing module identifies an associated authentication authority as a authentication authority entry. The identifying includes at least one of accessing a certificate authority list, receiving a certificate authority chain, and initiating a query. The method continues at step 642 where the processing module generates an ACL entry to include one or more of the realm UUID entry, a login name, a subject distinguished name, permissions, a signer identifier, and a signature. The login name may include at least one of an identifier associated with a entity of a distributed storage and task network (DSTN) and an anonymous identifier (e.g., wildcard).

The method continues at step 644 where the processing module generates and stores a realm object. The generating includes generating the realm object to include the realm name entry, the realm UUID entry, the authentication authority entry, and the ACL entry. The storing includes encoding the realm object utilizing a dispersed storage error coding function to produce at least one set of encoded data slices and sending the at least one set of encoded data slices to at least one of a distributed storage and task network (DSTN) module and a dispersed storage network memory for storage therein.

FIG. 47C is a flowchart illustrating an example of the deleting a realm object. The method begins at step 646 where a processing module (e.g., of a distributed storage and task (DST) client module) verifies realm access control list (ACL) permissions to delete a realm ACL. The verifying includes accessing a realm sub-registry ACL to verify that a requesting entity deleting the realm object has sufficient permissions to delete the realm ACL of the realm object. When verified, the method continues at step 648 where the processing module verifies distributed storage and task network (DSTN) permissions to delete the entire realm object. The verifying includes accessing a DSTN level sub-registry ACL to verify that the requesting entity deleting the realm object has sufficient permissions to delete the entire realm object. The method branches to step 652 when the processing module verifies the DSTN permissions to delete the realm object. The method continues to step 650 when the processing module does not verify the DSTN permissions to delete the realm object. The method continues at step 650 where the processing module indicates failure. The indicating includes generating an indication of failure and outputting indication of failure to at least one of the requesting entity and a DSTN managing unit.

The method continues at step 652 in where the processing module indicates that the realm has been deleted when the processing module verifies DSTN permissions to delete the realm object. The indicating includes at least one of marking the realm object as deleted in at least one of a list and the realm object, deleting the realm object (e.g., generating and sending delete slice requests to a DSTN module), and indicating a tombstone status associated with a realm UUID such that the UUID is not reused.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A cloud computing system comprises:
  a cloud system managing unit having a system level manager trusted certificate;
  a plurality of sets of devices, wherein a set of devices of the plurality of sets of devices includes one or more devices having a common aspect; and
  a plurality of authentication servers, wherein an authentication server of the plurality of authentication servers is associated with one of the plurality of sets of devices based on the common aspect, wherein each of the plurality of authentication servers has a unique device level server trusted certificate and a unique system level server trusted certificate; wherein:
    a corresponding one of the plurality of authentication servers and the one or more devices of one of the plurality of sets of devices establishes trust therebetween based on the unique device level server trusted certificate of the corresponding one of the plurality of authentication servers;
    the corresponding one of the plurality of authentication servers and the cloud system managing unit establishes trust therebetween based on at least one of the unique system level server trusted certificate and the system level manager trusted certificate;
    the cloud system managing unit and the one or more devices of one of the plurality of sets of devices establish trust therebetween based on the trust between the corresponding one of the plurality of authentication servers and the one or more devices of the one of the plurality of sets of devices and the trust between the corresponding one of the plurality of authentication servers and the cloud system managing unit; and
    the cloud system managing unit configures the cloud computing system based on the trust between the cloud system managing unit and devices of the plurality of sets of devices, wherein the configuring includes facilitating subsequent operation of a device of the plurality of sets of devices in accessing another of the plurality of sets of devices of the cloud computing system using a signed certificate from the cloud system managing unit.

2. The cloud computing system of claim 1, wherein the common aspect comprises at least one of:
  a vendor identifier;
  a device type identifier;

a version identifier;

a functionality identifier; and an assigned identifier.

3. The cloud computing system of claim 1 further comprises:

a plurality of certificate authorities, wherein one of the plurality of certificate authorities is affiliated with the corresponding one of the plurality of authentication servers based on the common aspect and wherein the one of the plurality of certificate authorities generates the unique device level server trusted certificate for the corresponding one of the plurality of authentication servers.

4. The cloud computing system of claim 1 further comprises:

a cloud system certificate authority operable to:

generate the system level manager trusted certificate for the cloud system managing unit; and generate the unique system level server trusted certificates for each of the plurality of authentication servers.

5. The cloud computing system of claim 1, wherein the corresponding one of the plurality of authentication servers and the one or more devices of the one of the plurality of sets of devices establishing trust therebetween comprises:

sending, by a device of the one or more devices, an authentication request to the corresponding one of the plurality of authentication servers, wherein the device is programmed with the unique device level server trusted certificate of the corresponding one of the plurality of authentication servers and wherein the authentication request references the unique device level server trusted certificate;

generating, by the corresponding one of the plurality of authentication servers, an authentication response based on the authentication request;

when the authentication response is verified, sending, by the device, device configuration information to the corresponding one of the plurality of authentication servers; and receiving, by the device, manager information regarding the cloud system managing unit.

6. The cloud computing system of claim 1, wherein the cloud system managing unit and the one or more devices of the one of the plurality of sets of devices establishing trust therebetween comprises:

sending, by a device of the one or more devices, a manager authentication request to the cloud system managing unit based on manager information, wherein the manager authentication request references the system level manager trusted certificate;

generating, by the cloud system managing unit, a manager authentication response based on the manager authentication request;

sending, by the device, a certificate signing request to the cloud system managing unit; and sending, by the cloud system managing unit, a signed certificate to the device in response to the certificate signing request.

7. The cloud computing system of claim 1 further comprises:

each of the plurality of authentication servers and the one or more devices of each of the plurality of sets of devices establishes trust therebetween based on the common aspect and the unique device level server trusted certificate of the each of the plurality of authentication servers.

8. The cloud computing system of claim 1 further comprises:

the cloud system managing unit and the one or more devices of each the plurality of sets of devices establish trust therebetween based on the trust between each of the plurality of authentication servers and the one or more devices of each of the plurality of sets of devices and the trust between each of the plurality of authentication servers and the cloud system managing unit.

9. A computer readable storage medium comprises:

a first memory section that stores a system level manager trusted certificate for a cloud system managing unit;

a plurality of second memory sections, where a second memory section of the plurality of second memory sections stores a unique device level server trusted certificate and a unique system level server trusted certificate for one of a plurality of authentication servers;

a plurality of third memory sections, where a third memory section of the plurality of third memory sections stores operational instructions that, when executed by one or more processing modules, causes the one or more processing modules to:

establish trust between a corresponding one of the plurality of authentication servers and one or more devices of one of a plurality of sets of devices based on the unique device level server trusted certificate of the corresponding one of the plurality of authentication servers, wherein a set of devices of the plurality of sets of devices includes the one or more devices having a common aspect;

a plurality of fourth memory sections, where a fourth memory section of the plurality of fourth memory sections stores operational instructions that, when executed by the one or more processing modules, causes the one or more processing modules to:

establish trust between the corresponding one of the plurality of authentication servers and the cloud system managing unit based on at least one of the unique system level server trusted certificate and the system level manager trusted certificate;

a plurality of fifth memory sections, where a fifth memory section of the plurality of fifth memory sections stores operational instructions that, when executed by the one or more processing modules, causes the one or more processing modules to:

establish trust between the cloud system managing unit and the one or more devices of the one of the plurality of sets of devices based on the trust between the corresponding one of the plurality of authentication servers and the one or more devices of the one of the plurality of sets of devices and the trust between the corresponding one of the plurality of authentication servers and the cloud system managing unit; and a sixth memory section stores operational instructions that, when executed by the one or more processing modules, causes the one or more processing modules to:

configure a cloud computing system based on the trust between the cloud system managing unit and devices of the plurality of sets of devices, wherein the configuring includes facilitating subsequent operation of a device of the plurality of sets of devices in accessing another of the plurality of sets of devices of the cloud computing system using a signed certificate from the cloud system managing unit.

10. The computer readable storage medium of claim 9, wherein the common aspect comprises at least one of:
a vendor identifier;
a device type identifier;
a version identifier;
a functionality identifier; and
an assigned identifier.

11. The computer readable storage medium of claim 9 further comprises:
a plurality of seventh memory sections, where a seventh memory section of the plurality of seventh memory sections stores operational instructions that, when executed by the one or more processing modules, causes the one or more processing modules to:
generate the unique device level server trusted certificate for the corresponding one of the plurality of authentication servers based on the common aspect.

12. The computer readable storage medium of claim 9 further comprises:
a seventh memory section that stores operational instructions that, when executed by the one or more processing modules, causes the one or more processing modules to:
generate the system level manager trusted certificate for the cloud system managing unit; and
generate the unique system level server trusted certificates for each of the plurality of authentication servers.

13. The computer readable storage medium of claim 9, wherein the third memory section further stores operational instructions that, when executed by the one or more processing modules, causes the one or more processing modules to:
send, as a processing module of a device of the one or more devices, an authentication request to the corresponding one of the plurality of authentication servers, wherein the device is programmed with the unique device level server trusted certificate of the corresponding one of the plurality of authentication servers and wherein the authentication request references the unique device level server trusted certificate;
generate, as a processing module of the corresponding one of the plurality of authentication servers, an authentication response based on the authentication request;
when the authentication response is verified, send, as the processing module of the device, device configuration information to the corresponding one of the plurality of authentication servers; and
receive, as the processing module of the device, manager information regarding the cloud system managing unit.

14. The computer readable storage medium of claim 9, wherein the fifth memory section further stores operational instructions that, when executed by the one or more processing modules, causes the one or more processing modules to:
send, as a processing module of a device of the one or more devices, a manager authentication request to the cloud system managing unit based on manager information, wherein the manager authentication request references the system level manager trusted certificate;
generate, as a processing module of the cloud system managing unit, a manager authentication response based on the manager authentication request;
send, as the processing module of the device, a certificate signing request to the cloud system managing unit; and
send, as the processing module of the cloud system managing unit, a signed certificate to the device in response to the certificate signing request.

15. A cloud computing system set up unit comprises:
memory for storing:
a system level manager trusted certificate of a cloud system managing unit;
a unique device level server trusted certificate for each of a plurality of authentication servers; and
a unique system level server trusted certificate for the each of the plurality of authentication servers; and
a processing module operable to:
establish trust between a corresponding one of the plurality of authentication servers and one or more devices of one of a plurality of sets of devices based on the unique device level server trusted certificate of the corresponding one of the plurality of authentication servers, wherein a set of devices of the plurality of sets of devices includes one or more devices having a common aspect;
establish trust between the corresponding one of the plurality of authentication servers and the cloud system managing unit based on at least one of the unique system level server trusted certificate and the system level manager trusted certificate;
establish trust between the cloud system managing unit and the one or more devices of the one of the plurality of sets of devices based on the trust between the corresponding one of the plurality of authentication servers and the one or more devices of the one of the plurality of sets of devices and the trust between the corresponding one of the plurality of authentication servers and the cloud system managing unit; and
configure the cloud computing system based on the trust between the cloud system managing unit and devices of the plurality of sets of devices wherein the configuring includes facilitating subsequent operation of a device of the plurality of sets of devices in accessing another of the plurality of sets of devices of the cloud computing system using a signed certificate from the cloud system managing unit.

16. The cloud computing system set up unit of claim 15, wherein the common aspect comprises at least one of:
a vendor identifier;
a device type identifier;
a version identifier;
a functionality identifier; and
an assigned identifier.

17. The cloud computing system set up unit of claim 15, wherein the processing module is further operable to:
generate the unique device level server trusted certificate for the corresponding one of the plurality of authentication servers based on the common aspect.

18. The cloud computing system set up unit of claim 15, wherein the processing module is further operable to:
generate the system level manager trusted certificate for the cloud system managing unit; and
generate the unique system level server trusted certificates for the each of the plurality of authentication servers.

19. The cloud computing system set up unit of claim 15, wherein the processing module is further operable to:
send, as a device of the one or more devices, an authentication request to the corresponding one of the plurality of authentication servers, wherein the device is programmed with the unique device level server trusted certificate of the corresponding one of the plurality of authentication servers and wherein the authentication request references the unique device level server trusted certificate;

generate, as the corresponding one of the plurality of authentication servers, an authentication response based on the authentication request;

when the authentication response is verified, send, as the device, device configuration information to the corresponding one of the plurality of authentication servers; and receive, as the device, manager information regarding the cloud system managing unit.

20. The cloud computing system set up unit of claim 15, wherein the processing module is further operable to:

send, as a device of the one or more devices, a manager authentication request to the cloud system managing unit based on manager information, wherein the manager authentication request references the system level manager trusted certificate;

generate, as the cloud system managing unit, a manager authentication response based on the manager authentication request;

send, as the device, a certificate signing request to the cloud system managing unit; and send, as the cloud system managing unit, a signed certificate to the device in response to the certificate signing request.

\* \* \* \* \*